US008555089B2

(12) United States Patent
Ito et al.

(10) Patent No.: US 8,555,089 B2
(45) Date of Patent: Oct. 8, 2013

(54) PROGRAM EXECUTION APPARATUS, CONTROL METHOD, CONTROL PROGRAM, AND INTEGRATED CIRCUIT

(75) Inventors: Takayuki Ito, Osaka (JP); Manabu Maeda, Osaka (JP); Tomoyuki Haga, Nara (JP); Hideki Matsushima, Osaka (JP); Yuichi Futa, Osaka (JP); Kouji Kobayashi, Osaka (JP)

(73) Assignee: Panasonic Corporation, Osaka (JP)

( * ) Notice: Subject to any disclaimer, the term of this patent is extended or adjusted under 35 U.S.C. 154(b) by 438 days.

(21) Appl. No.: 12/652,256

(22) Filed: Jan. 5, 2010

(65) Prior Publication Data

US 2010/0174919 A1 Jul. 8, 2010

(30) Foreign Application Priority Data

Jan. 8, 2009 (JP) ................................ 2009-002479

(51) Int. Cl.
*G06F 11/00* (2006.01)
(52) U.S. Cl.
USPC ............................ 713/194; 713/168; 713/178
(58) Field of Classification Search
USPC .......................................... 713/194, 168, 178
See application file for complete search history.

(56) References Cited

U.S. PATENT DOCUMENTS

| | | | | |
|---|---|---|---|---|
| 4,652,998 | A * | 3/1987 | Koza et al. ...................... | 463/26 |
| 6,526,491 | B2 * | 2/2003 | Suzuoki et al. ................ | 711/164 |
| 2001/0025311 | A1 | 9/2001 | Arai et al. | |
| 2004/0210764 | A1 * | 10/2004 | McGrath et al. .............. | 713/200 |
| 2005/0021954 | A1 * | 1/2005 | Kung ............................. | 713/168 |
| 2005/0033969 | A1 * | 2/2005 | Kiiveri et al. ................. | 713/189 |
| 2006/0230277 | A1 * | 10/2006 | Trinkel ......................... | 713/178 |
| 2007/0079090 | A1 * | 4/2007 | Rajagopal et al. ............ | 711/163 |
| 2007/0094719 | A1 * | 4/2007 | Scarlata ........................... | 726/9 |
| 2007/0204166 | A1 * | 8/2007 | Tome et al. .................... | 713/182 |
| 2007/0255966 | A1 * | 11/2007 | Condorelli et al. ........... | 713/194 |
| 2008/0005029 | A1 * | 1/2008 | Ando .............................. | 705/51 |
| 2009/0083520 | A1 * | 3/2009 | Kanemura ...................... | 712/43 |
| 2009/0193293 | A1 * | 7/2009 | Stolfo et al. .................... | 714/26 |
| 2010/0049906 | A1 * | 2/2010 | Tao ............................... | 711/103 |
| 2010/0174919 | A1 * | 7/2010 | Ito et al. ........................ | 713/192 |

FOREIGN PATENT DOCUMENTS

| | | |
|---|---|---|
| JP | 2004-240699 | 8/2004 |
| JP | 2008-204468 | 9/2008 |
| WO | WO 2006126686 A1 * | 11/2006 |

* cited by examiner

*Primary Examiner* — Beemnet Dada
*Assistant Examiner* — Sayed Beheshti Shirazi
(74) *Attorney, Agent, or Firm* — Wenderoth, Lind & Ponack, L.L.P.

(57) ABSTRACT

Information processing apparatus (100) ensures confidentiality of encryption and reduces overhead associated with processing not directly related to the encryption. The information processing apparatus (100) includes: application program (A158) that includes an instruction for encryption which uses a key; tampering detection unit (135x) that detects tampering of the program; CPU (141) that operates according to instructions and outputs a direction for encryption upon detecting the instruction for encryption; data encryption/decryption function unit (160) that controls switching to the protective mode according to the direction; and protected data operation unit (155) that stores a key in correspondence with the program, outputs the key in the protective mode, and controls switching to the normal mode, and the data encryption/decryption function unit (160) executes the encryption in the normal mode using the received key.

13 Claims, 43 Drawing Sheets

FIG. 4

Normal key table 128

| Key information | | | |
|---|---|---|---|
| Reference hash value of application program | Server key information | | |
| | Server information | Key | |
| 0x 11 22 ⋯ FF | 123.45.78.1 | 0x EE FF ⋯ 00 | |
| | 123.45.67.1:100 | 0x 11 22 ⋯ 11 | |
| | http://www.server.com/ | 0x DD AA ⋯ 22 | |
| | ⋮ | ⋮ | |
| 0x DE AB ⋯ 00 | ⋮ | ⋮ | |
| ⋮ | ⋮ | ⋮ | |
| ⋮ | ⋮ | ⋮ | |
| ⋮ | ⋮ | ⋮ | |

FIG. 35

Normal key table 128d

| Reference hash value of application program | Key information | | | |
|---|---|---|---|---|
| | Server information | Server key information | | |
| | | Key | Maximum use count | Current use count |
| 0x 11 22 ... FF | 123.45.78.1 | 0x EE FF ... 00 | 1000 | 10 |
| | 123.45.67.1:100 | 0x 11 22 ... 11 | 1000 | 0 |
| | http://www.server.com/ | 0x DD AA ... 22 | 30000 | 10 |
| 0x DE AB ... 00 | ...... | ...... | ... | ... |
| | ...... | ...... | ... | ... |
| | ...... | ...... | ... | ... |
| | ...... | ...... | ... | ... |
| | ...... | ...... | ... | ... |

Normal key table

| Reference hash value of application program | Key information | | |
|---|---|---|---|
| | Server information | Server key information | |
| | | Key | Final time |
| 0x 11 22 ⋯ FF | 123.45.78.1 | 0x EE FF ⋯ 00 | 2000/12/03 12:30:00 |
| | 123.45.67.1:100 | 0x 11 22 ⋯ 11 | 2007/01/01 00:00:00 |
| | http://www.server.com/ | 0x DD AA ⋯ 22 | 2010/12/03 12:30:00 |
| 0x DE AB ⋯ 00 | ⋯⋯ | ⋯⋯ | ⋯ |
| ⋯⋯ | ⋯⋯ | ⋯⋯ | ⋯ |
| ⋯⋯ | ⋯⋯ | ⋯⋯ | ⋯ |
| ⋯⋯ | ⋯⋯ | ⋯⋯ | ⋯ |
| ⋯⋯ | ⋯⋯ | ⋯⋯ | ⋯ |

FIG. 41

Decrypted data storage position table 297

| Data ID | Encrypted data storage file name | Decryption information | | |
|---|---|---|---|---|
| | | Hash value of destination application program | Decrypted data storage address | Decrypted data size |
| 0 | DATA1. DAT | 0x 11 22 ... FF | 0x 1000 | 100 |
| 1 | DATA2. DAT | 0X DE AA ... 00 | 0x 20000 | 1000 |
| NULL | NULL | NULL | NULL | NULL |
| 3 | DATA3. DAT | 0X DE AA ... 00 | 0x 1100 | 128 |
| ... | ... | ... | ... | ... |

PROGRAM EXECUTION APPARATUS, CONTROL METHOD, CONTROL PROGRAM, AND INTEGRATED CIRCUIT

This application is based on an application No. 2009-002479filed in Japan the contents of which is hereby incorporated by reference.

BACKGROUND OF THE INVENTION (1) Field of the Invention

The present invention relates to a technique for executing information security processing such as encryption of data, decryption of encrypted data, generation of a digital signature, and verification of a digital signature, securely and at high-speed in a program execution apparatus which executes a computer program with switching between a secure software execution environment and a normal software execution environment.

(2) Description of the Related Art

In recent years, theft of data (e.g. personal information) stored in information processing apparatuses such as personal computers (Personal Computer, PC) and mobile phones has become a widespread problem.

Such theft is sometimes committed by an unauthorized computer program. This computer program is illicitly downloaded from an open network such as Internet to an information processing apparatus such as a PC or a mobile phone. The computer program operates illicitly in the information processing apparatus against the will of the user of the information processing apparatus. For example, the computer program reads data stored in a storage device of the PC or the mobile phone, and sends the read data to an attacker or the like via a network. This is how the attacker achieves his/her aim of stealing data. Hereinafter, the unauthorized computer program is also referred to as a malicious computer program.

In order to prevent such data theft, Patent Documents 1 and 2 (Patent Document 1 (Japanese publication) and Patent Document 2 (US publication) disclose the same contents) discloses the following technique, with an aim to provide an access control system by which illegal access can be inhibited, even if any intruder from a network attempts illegal readout or writing on files by abusing a user's authority.

Multiple OSs operate simultaneously on a server information processing apparatus. One of the OSs is a service OS, and another is a security OS. Multiple OS control programs operating on the server information processing apparatus perform various controls to enable the service OS and the security OS to operate on the server information processing apparatus. A server program operates on the service OS, and an access control program operates on the security OS. An I/O manager and a file I/O hooking program operate in the service OS. An inter-OS communication processor operates in the multiple OS control programs.

When the server program requests a file access, the request reaches the file I/O hooking program via the I/O manager. The file I/O hooking program requests the access control program via the inter-OS communication processor to perform check on the access authority and the like with respect to the file access request. The access control program checks the received request against the policy file, and transmits the result of the check as a response to the file I/O hooking program via the inter-OS communication processor. The file I/O hooking program judges the validity of the access request based on the received response, and sets an error code if the request is against the policy. When the error code is set, the I/O manager returns an error to the server program.

As described above, by judging the validity of the requested access to the data on the security OS which is a secure execution environment, unauthorized data access can be prevented.

Next, Patent Document 3 discloses the following technique in order to solve the problem that unencrypted data remain on a cache in an encryption system operating integrally with a computer system.

A computer system including an operating system and a storage apparatus (hard disk) has a function of automatically encrypting a file to be saved in a predetermined folder. Cache data attached to a file to be encrypted, which is held on a cache memory managed by the computer system, is invalidated or rewritten in accordance with the switching between ON and OFF of the encryption processing function.

With this structure, no unencrypted data remain on the cache, thereby preventing unauthorized use of the data.

Patent Document 1: Japanese Laid-Open Patent Application Publication 2008-204468

Patent Document 2: US Patent Application Publication 2001/0025311A1

Patent Document 3:, Japanese Laid-Open Patent Application Publication 2004-240699

SUMMARY OF THE INVENTION

The technique disclosed by Patent Documents 1 and 2 requires inter-OS communication processing between the service OS and the security OS each time data is accessed, incurring a large overhead.

Meanwhile, according to the technique disclosed by Patent Document 3, the key needs to be read into a cache again when data encryption/decryption is to be performed after data encryption/decryption ends.

In order to solve the stated problems, the present invention aims to provide a program execution apparatus, a control method, a control program, and an integrated circuit that are able to reduce an overhead associated with processing that is not directly related to information security processing such as encryption or decryption while at the same time securing confidentiality of the information security processing.

In order to solve the stated conventional problems, one aspect of the present invention is a program execution apparatus that operates with switching between a normal mode and a protective mode, the program execution apparatus comprising: a tampering detection unit operable to detect tampering of a program that includes an instruction to execute information security processing which uses a key; an execution unit operable, in the normal mode, to execute the program when the tampering is not detected, and upon detecting the instruction, output a direction to execute the information security processing; a normal security processing unit operable, in the normal mode, upon receiving the direction, to control switching from the normal mode to the protective mode; and a protective security processing unit that securely stores the key in correspondence with the program and that is operable, in the protective mode, to read the stored key, output the read key, and control switching from the protective mode to the normal mode, wherein the normal security processing unit receives the output key and executes the information security processing which uses the received key, in the normal mode.

With this structure, the information security processing is executed in the normal mode in accordance with a program that has been confirmed to be not tampered, using a key acquired from the protective mode. Accordingly, confidentiality is ensured for the information security processing executed in the normal mode.

Although switching is made from the normal mode to the protective mode and further to the normal mode when acquiring the key, once the key is acquired, there is no need to switch again to the protective mode during execution of the information security processing. Consequently, the overhead associated with processing that is not directly related to the information security processing such as encryption and decryption can be alleviated, thereby achieving an advantageous effect.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 4 shows an example of a data structure of a normal key table 128;

FIG. 6 is a flowchart showing operations performed by the information processing apparatus 100 when power is turned ON;

FIG. 35 shows a data structure of a normal key table 128d of a fourth embodiment;

FIG. 38 shows a data structure of a normal key table 128e of the fifth embodiment;

FIG. 41 shows a data structure of a decrypted data storage position table 297 in the sixth embodiment;

DESCRIPTION OF THE PREFERRED EMBODIMENT

Figure 1:
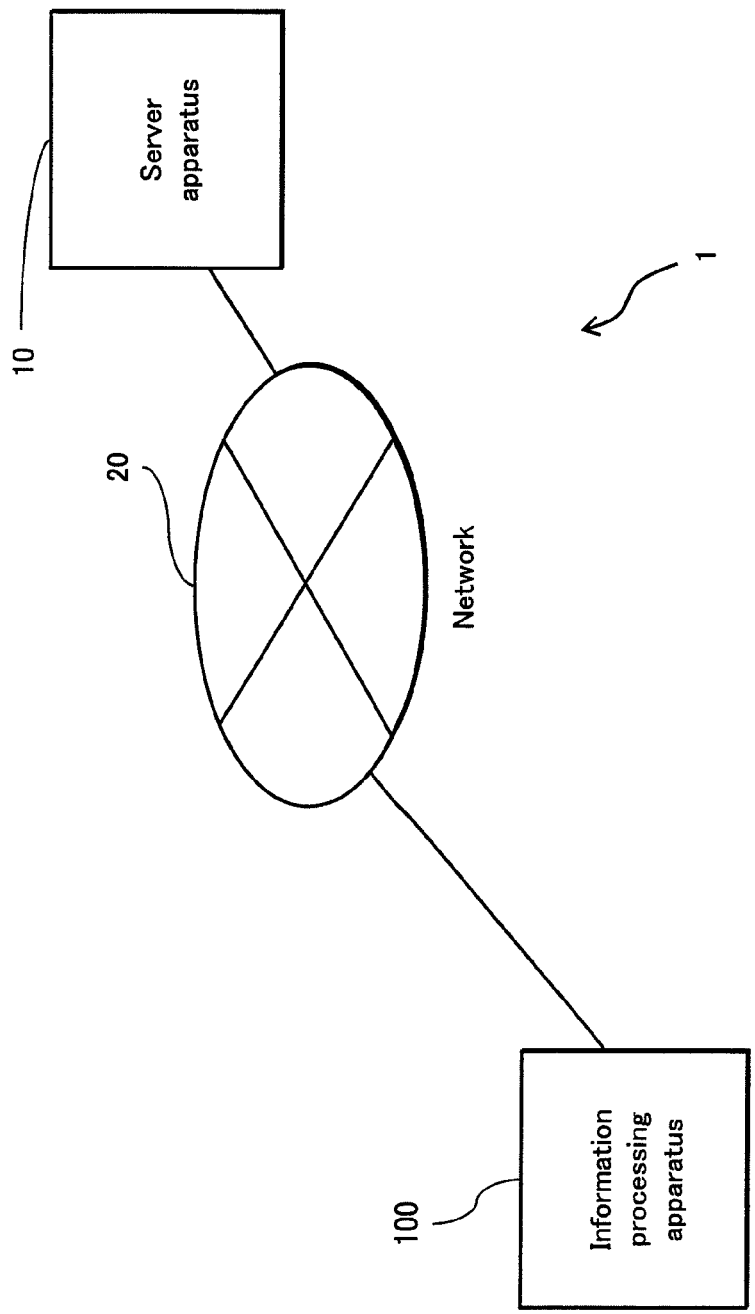
FIG. 1 shows a structure of an information processing system 1 of a first embodiment.

One aspect of the present invention is a program execution apparatus which operates with switching between a normal mode and a protective mode, the program execution apparatus comprising: a tampering detection unit operable to detect tampering of a program that includes an instruction to execute information security processing which uses a key; an execution unit operable, in the normal mode, to execute the program when the tampering is not detected, and upon detecting the instruction, output a direction to execute the information security processing; a normal security processing unit operable, in the normal mode, upon receiving the direction, to control switching from the normal mode to the protective mode; and a protective security processing unit that securely stores the key in correspondence with the program and that is operable, in the protective mode, to read the stored key, output the read key, and control switching from the protective mode to the normal mode, wherein the normal security processing unit receives the output key and executes the information security processing which uses the received key, in the normal mode.

Here, the normal security processing unit may further store therein the received key in the normal mode, the tampering detection unit further detects tampering of the program, and when the tampering is not detected, the normal security processing unit further executes, in the normal mode, the information security processing which uses the received key.

Here, the normal security processing unit may further store therein the received key in the normal mode, the tampering detection unit further detects tampering of the program, when the tampering is detected, the normal security processing unit, in the normal mode, further deletes the stored key and controls switching to the protective mode, and the protective security processing unit further executes the information security processing which uses the stored key, in the protective mode.

Here, the normal security processing unit may further store therein the received key in the normal mode, the tampering detection unit further detects tampering of another program that runs in the normal mode, when the tampering of the another program is detected, the normal security processing unit, in the normal mode, further deletes the stored key and controls switching to the protective mode, and the protective security processing unit, in the protective mode, further executes the information security processing which uses the stored key.

Here, upon receiving a request to execute the program, the normal security processing unit, in the normal mode, may further output a direction to generate a key of the program and control switching to the protective mode, and upon receiving the direction to generate the key, the protective security processing unit, in the protective mode, further generates the key of the program and stores therein the generated key in correspondence with the program.

Here, the protective security processing unit, in the protective mode, may further generate a hash value of the program and store the generated hash value and the key in correspondence with each other.

Here, the protective security processing unit, in the protective mode, may further read the hash value along with the key and output the read hash value along with the read key, and the normal security processing unit, in the normal mode, further receives the output hash value along with the output key and stores the received key in correspondence with the received hash value.

Here, the normal security processing unit, in the normal mode, may further receive a direction from another program to execute information security processing, calculate a hash value of the another program, judge whether the calculated hash value matches the stored hash value, and when judging negatively, delete the stored key.

Here, upon receiving the request to execute the program, the normal security processing unit, in the normal mode, may further judge whether a key corresponding to the program is retained therein or not, and when judging negatively, output the direction to generate the key of the program, and control switching to the protective mode, upon receiving the direction to generate the key, the protective security processing unit, in the protective mode, further judges whether the key corresponding to the program is retained therein or not, and when judging affirmatively, reads the key, outputs the read key, and controls switching to the normal mode.

Here, the protective security processing unit may further securely store a maximum use count corresponding to the key and, in the protective mode, output the maximum use count, the maximum use count indicating a maximum number of times the key is permitted to be used, the normal security processing unit, in the normal mode, further receives the maximum use count along with the key, stores therein the received maximum use count, judges whether a current use count exceeds the maximum use count or not, and when judging affirmatively, outputs a direction that instructs new generation, and controls switching to the protective mode, the current use count indicating a number of times the key has been actually used, upon receiving the direction that instructs the new generation, the protective security processing unit, in the protective mode, further generates a new key and a new maximum use count, outputs the generated new key and new maximum use count, and controls switching to the normal mode, and the normal security processing unit, in the normal mode, further receives the new key and the new maximum use count, deletes the stored key and maximum use count, and stores the received new key and new maximum use count in correspondence with each other.

Here, the protective security processing unit may further securely store a final time in correspondence with the key, and output the final time in the protective mode, the final time indicating an ending time for use of the key, the normal security processing unit, in the normal mode, further receives the final time along with the key, stores the received final time, judges whether a current time is past the stored final time, and when judging affirmatively, outputs a direction that instructs new generation, and controls switching to the protective mode, the protective security processing unit, in the protective mode, upon receiving the direction that instructs the new generation, further generates a new key and a new final time, outputs the generated new key and new final time, and controls switching to the normal mode, and the normal security processing unit, in the normal mode, further receives the new key and the new final time, deletes the stored key and final time, and stores the received new key and new final time in correspondence with each other.

Here, the information security processing may be one of: encryption, decryption, generation of a digital signature, verification of a digital signature, and generation of a keyed hash value.

Another aspect of the present invention is a control method which is used by a program execution apparatus that operates with switching between a normal mode and a protective mode, control method comprising: a tampering detecting step of detecting tampering of a program that includes an instruction to execute information security processing which uses a key; an executing step of, in the normal mode, executing the program when the tampering is not detected, and upon detecting the instruction, outputting a direction to execute the information security processing; a normal security processing step of, in the normal mode, upon receiving the direction, controlling switching from the normal mode to the protective mode; and a protective security processing step of securely storing the key in correspondence with the program, and in the protective mode, reading the stored key, outputting the read key, and controlling switching from the protective mode to the normal mode, wherein the normal security processing step receives the output key and executes the information security processing which uses the received key, in the normal mode.

Another aspect of the present invention is a control program which is used by a program execution apparatus that operates with switching between a normal mode and a protective mode and which has been recorded on a computer-readable recording medium, control program causing a computer to execute: a tampering detecting step of detecting tampering of a program that includes an instruction to execute information security processing which uses a key; an executing step of, in the normal mode, executing the program when the tampering is not detected, and upon detecting the instruction, outputting a direction to execute the information security processing; a normal security processing step of, in the normal mode, upon receiving the direction, controlling switching from the normal mode to the protective mode; and a protective security processing step of securely storing the key in correspondence with the program, and in the protective mode, reading the stored key, outputting the read key, and controlling switching from the protective mode to the normal mode, wherein the normal security processing step receives the output key and executes the information security processing which uses the received key, in the normal mode.

Another aspect of the present invention is an integrated circuit for executing a program that operates with switching between a normal mode and a protective mode, the integrated circuit comprising: a tampering detection unit operable to detect tampering of a program that includes an instruction to execute information security processing which uses a key; an execution unit operable, in the normal mode, to execute the program when the tampering is not detected, and upon detecting the instruction, output a direction to execute the information security processing; a normal security processing unit operable, in the normal mode, upon receiving the direction, to control switching from the normal mode to the protective mode; and a protective security processing unit that securely stores the key in correspondence with the program and that is operable, in the protective mode, to read the stored key, output the read key, and control switching from the protective mode to the normal mode, wherein the normal security processing unit receives the output key and executes the information security processing which uses the received key, in the normal mode.

In the following, embodiments of the present invention are described with reference to the drawings.

1. First Embodiment

The following describes an information processing system 1 as an embodiment pertaining to the present invention.

1.1 Structure of Information Processing System 1

As shown in FIG. 1, the information processing system 1 includes an information processing apparatus 100 and a server apparatus 10, and the information processing apparatus 100 and the server apparatus 10 are connected via a network 20. The information processing apparatus 100 transmits/receives data to/from the server apparatus 10 via the network 20.

The information processing apparatus 100 encrypts data input by a user and stores the encrypted data into a nonvolatile storage unit 102 (described later) provided therein. Next, the information processing apparatus 100 decrypts the encrypted data as necessary and uploads the resultant data to the server apparatus 10 via the network 20. Also, the information processing apparatus 100 downloads data, programs, and the like from the server apparatus 10 via the network 20, encrypts the downloaded data, programs, and the like, and stores the encrypted downloaded data, programs, and the like into the nonvolatile storage unit 102. Note that encryption and decryption of data will be described later.

Here, the network 20 may be a public communication network such as Internet, or a communication channel constructed ad-hoc.

The information processing apparatus 100 is, for example, a personal computer, a mobile phone, a mobile information terminal, a game machine, a DVD playback apparatus, a DVD recording apparatus, a DVD playback/recording apparatus, a BD playback apparatus, a BD recording apparatus, a BD playback/recording apparatus, a digital broadcast receiving apparatus, a digital broadcast receiving/recording apparatus, or a digital broadcast playback apparatus.

1.2 Structure of Information Processing Apparatus 100

Figure 2:
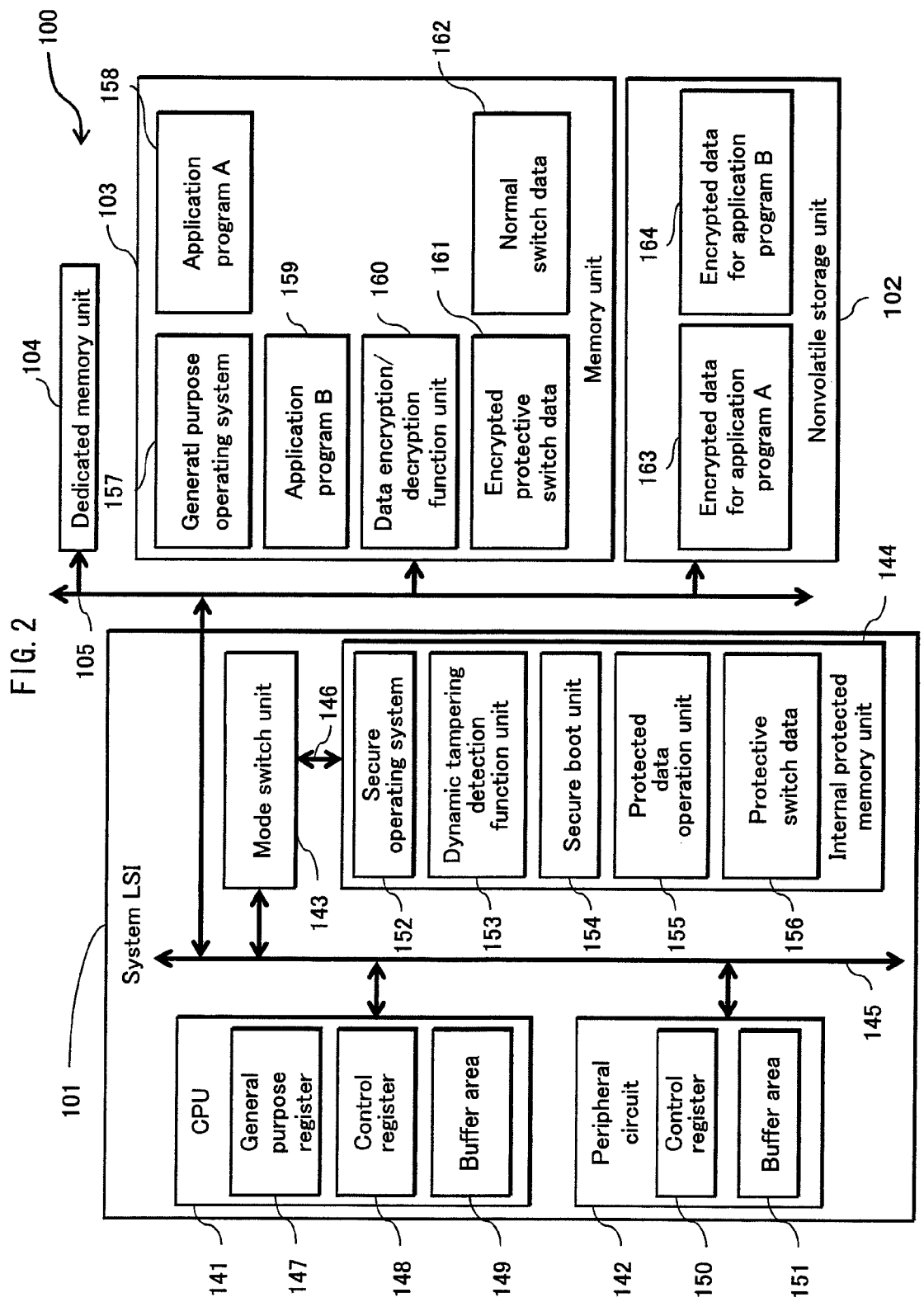
FIG. 2 shows a structure of an information processing apparatus 100.

The information processing apparatus 100 constitutes a computer system, and as shown in FIG. 2, includes: a system LSI 101, the nonvolatile storage unit 102, a memory unit 103, a dedicated memory unit 104, a system bus 105, an I/O unit (not shown), and other components (not shown). The system LSI 101, the nonvolatile storage unit 102, the memory unit 103, and the dedicated memory unit 104 are connected with one another via the system bus 105.

The information processing apparatus 100 is a program execution apparatus that operates with switching between a normal mode and a protective mode.

(1) System LSI 101

The system LSI 101 is composed of a CPU 141, a peripheral circuit 142, a mode switch unit 143, an internal protected memory unit 144, an internal bus 145, and a dedicated bus 146. The CPU 141, the peripheral circuit 142, and the mode switch unit 143 are connected with one another via the internal bus 145. The mode switch unit 143 and the internal protected memory unit 144 are connected with each other via the dedicated bus 146. The system LSI 101 has the normal mode and the protective mode, and operates with switching between the normal mode and the protective mode.

The CPU 141 controls overall operations of the information processing apparatus 100 by operating in accordance with instruction codes included in programs and the like stored in the memory unit 103 and the internal protected memory unit 144. The CPU 141 includes a general purpose register 147 used by software, a control register 148 that controls such as memory management (Memory Management Unit, MMU) and accelerate functions of calculations, and a buffer area 149 used as a cache or the like.

With the CPU 141 operating in accordance with the instruction codes included in the programs and the like stored in the memory unit 103 and the internal protected memory unit 144, it appears as if the programs and the CPU 141 constitute one hardware unit and it is this hardware unit that operates.

The peripheral circuit 142 has fixed functions such as DMA (Direct Memory Access), and is controlled by software. The peripheral circuit 142 includes a control register 150 and a buffer area 151. The control register 150 and the buffer area 151 are used by software to control the peripheral circuit 142.

The mode switch unit 143 switches a mode between the normal mode and the protective mode in the system LSI 101. The mode switch unit 143 also exchanges data between the normal mode and the protective mode using the dedicated memory unit 104. Details thereof will be described later. The mode switch unit 143 also connects/disconnects the internal bus 145 and the internal protected memory unit 144. That is, in the protective mode, the mode switch unit 143 connects the internal protected memory unit 144 and the internal bus 145.

In the normal mode, the mode switch unit 143 disconnects the internal protected memory unit 144 and the internal bus 145.

The internal protected memory unit 144 stores therein a secure operating system 152, a dynamic tampering detection function unit 153, a secure boot unit 154, a protected data operation unit 155 (also referred to as "protective security processing unit"), and protective switch data 156. Each of the secure operating system 152, the dynamic tampering detection function unit 153, the secure boot unit 154, and the protected data operation unit 155 is a computer program, and is composed of multiple instructions. The internal protected memory unit 144 is a memory accessible from the CPU 141 only in the protective mode, and a switch control between states of being accessible and inaccessible is performed by the mode switch unit 143.

(2) Nonvolatile Storage Unit 102

The nonvolatile storage unit 102 has an area for storing encrypted data 163 for application program A and encrypted data 164 for application program B.

(3) Memory Unit 103

The memory unit 103 has an area for storing a general purpose operating system 157, an application program A 158, an application program B 159, the data encryption/decryption function unit 160 (also referred to as "normal security processing unit"), encrypted protective switch data 161 and normal switch data 162.

The general purpose operating system 157, the application program A 158, the application program B 159 and the data encryption/decryption function unit 160 are each a computer program composed of multiple instructions.

The protective switch data is data stored in the general purpose register 147, the control register 148, and the buffer area 149 of the CPU 141, and data stored in the control register 150 and the buffer area 151 of the peripheral circuit 142, immediately prior to a switch from the protective mode to the normal mode.

The normal switch data 162 is data stored in the general purpose register 147, the control register 148, and the buffer area 149 of the CPU 141, and data stored in the control register 150 and the buffer area 151 of the peripheral circuit 142, immediately prior to a switch from the normal mode to the protective mode.

(4) Dedicated Memory Unit 104

The dedicated memory unit 104 stores data to be transferred from the normal mode to the protective mode, or from the protective mode to the normal mode.

1.3 Software Structure of Information Processing Apparatus 100

Figure 3:
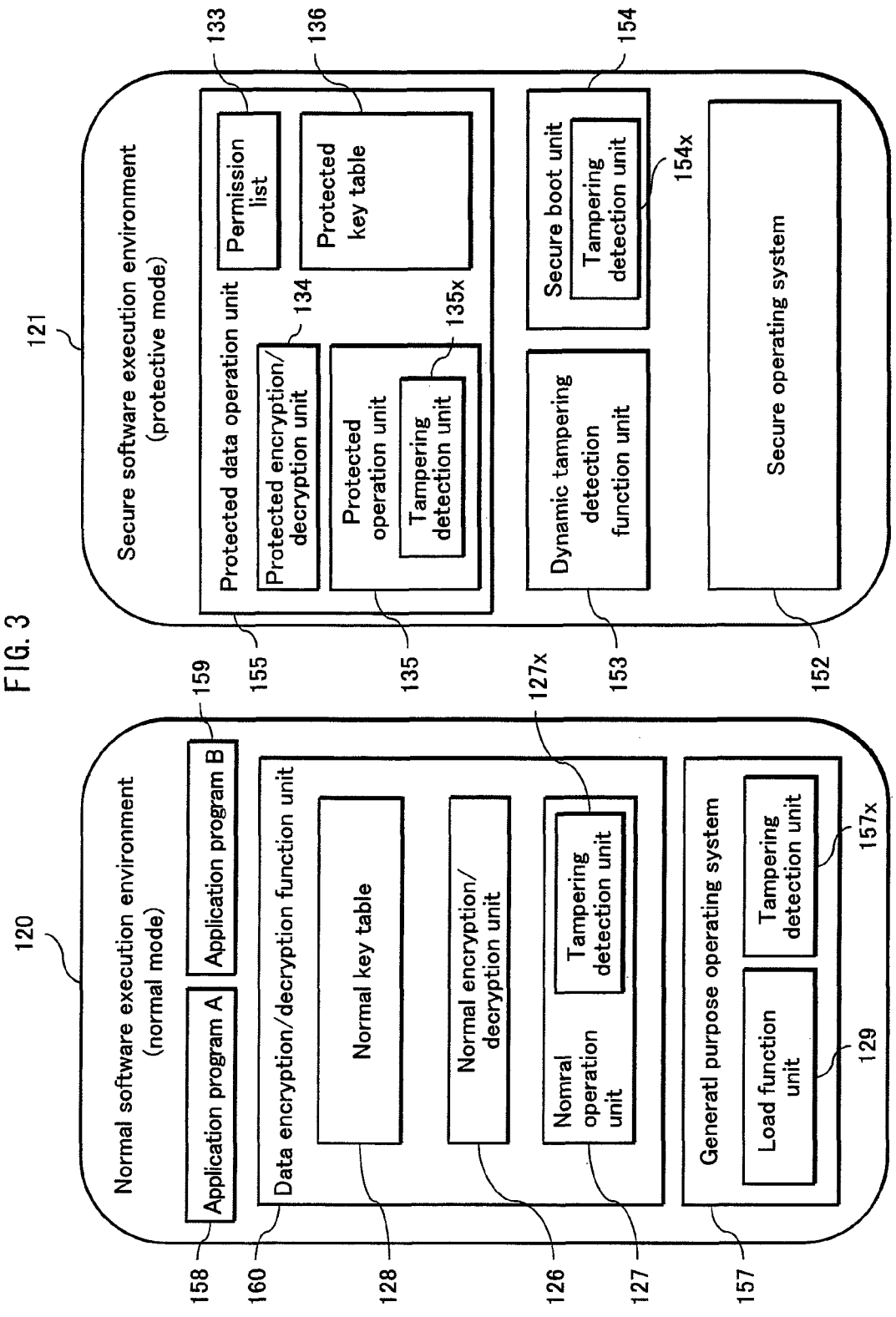
FIG. 3 shows a software structure of the information processing apparatus 100.

FIG. 3 shows a software structure of the information processing apparatus 100.

As shown in FIG. 3, the information processing apparatus 100 includes a software execution environment 120 which is the normal mode, and a secure software execution environment 121 which is the protective mode. The information processing apparatus 100 executes software with switching between the normal mode and the protective mode. Note that details of operations for switching between the normal mode and the protective mode will be described later.

(1) Explanation on Components of Software that Operates in Execution Environment 120 which is Normal Mode The execution environment 120 which is the normal mode includes the general purpose operating system 157, the data encryption/decryption function unit 160, the application program A 158, and the application program B 159.

(General Purpose Operating System 157)

The general purpose operating system 157 is an operating system that operates in the normal mode and includes a load function unit 129 and a tampering detection unit 157x. The general purpose operating system 157 loads application programs onto the memory unit 102 using the load function unit 129, and causes the loaded application programs to be executed. The general purpose operating system 157 also deletes (unloads) application programs from the memory unit 103. The tampering detection unit 157x detects tampering.

(Application Program A 158 and Application Program B 159)

The application program A 158 and the application program B 159 each provide functions such as a Web browser function and an electronic mail function to users. The application program A 158 and the application program B 159 cause data to be encrypted or decrypted.

The application program A 158 and the application program B 159 each include an instruction that instructs execution of information security processing which uses a key, and other instructions. Here, the information security processing is processing such as encryption of data, decryption of encrypted data, generation of a digital signature, verification of a digital signature, calculation of a keyed hash function. The instruction that instructs execution of information security processing with use of a key is an instruction that instructs encryption of data with use of a key, or an instruction that instructs decryption of data that has been encrypted with use of a key. The instruction that instructs execution of information security processing may also be an instruction that instructs generation of a digital signature with use of a key, an instruction that instructs verification of a digital signature with use of a key, an instruction that instructs calculation of a keyed hash function with use of a key, or the like.

The CPU 141 fetches these instructions, decodes the fetched instruction, and operates in accordance with the result of the decoding. Upon detecting, in an application program, an instruction which instructs execution of the information security processing, the CPU 141 outputs a direction to execute the information security processing to the data encryption/decryption function unit 160. This is how the application program requests the data encryption/decryption function unit 160 to execute information security processing, i.e., to execute encryption of data here.

With the CPU 141 operating in accordance with the instruction codes included in the application program, it appears as if the application programs and the CPU 141 constitute one hardware unit and it is this hardware unit that operates. This hardware unit is also referred to as "execution unit".

(Data Encryption/Decryption Function Unit 160)

The data encryption/decryption function unit 160 (also referred to as "normal security processing unit") is a computer program that receives a data encryption/decryption request from a host application program and encrypts/decrypts data in response to the received data encryption/decryption request, and includes multiple instruction codes. The data encryption/decryption function unit 160 includes the normal key table 128, a normal encryption/decryption unit 126, and a normal operation unit 127.

With the CPU 141 operating in accordance with the instruction codes included in the data encryption/decryption function unit 160, it appears as if the data encryption/decryption function unit 160 and the CPU 141 constitute one hardware unit and it is the hardware unit that operates. This hardware unit is also referred to as "normal security processing unit".

The normal operation unit 127 receives a data encryption/decryption request from a host application program such as the application program A or the application program B, judges whether a data encryption/decryption key exists or not, judges whether another application program exists or not, and encrypts/decrypts data using the normal encryption/decryption unit 126 or the protected data operation unit 155. The normal operation unit 127 includes a tampering detection unit 127x. The tampering detection unit 127x detects tampering.

The normal encryption/decryption unit 126 includes an encryption unit and a decryption unit, which are not shown in the figure, and encrypts/decrypts data using a key stored in the normal key table 128.

The normal key table 128 is a table that temporally stores keys used for encrypting or decrypting data used by host application programs. As an example in FIG. 4 shows, the normal key table 128 has an area for storing one or more pieces of key information. Each piece of key information is constituted from a reference hash value of an application program and one or more pieces of server key information; and each piece of server key information is constituted from a piece of server information and a key. As described above, the normal key table 128 is a table configured to enable a search for a unique key using the reference hash value of an application program and a piece of server information.

The application program is, for example, a browser program that provides a Web browser function. This browser program receives encrypted music and encrypted movies from a music distribution server apparatus and a movie distribution server apparatus, respectively. The server apparatuses use different keys for encryption and also use different keys for decryption. As described above, the application program is related to the music distribution server apparatus and the movie distribution server apparatus.

The reference hash value of the application program is a hash value generated for the entirety of the application program by applying a hash function. An example of the hash function is SHA-1.

A piece of server key information corresponds to a server apparatus related to the application program.

Server information is identification information for identifying a server apparatus related to the application program. A piece of server information may be an IP (Internet Protocol) address, a URL (Universal Resource Location), or an identifier that can uniquely identify the server.

A key is used for encrypting or decrypting data when service is received from a server apparatus related to the application program.

The above-mentioned data structure enables reliable and easy management of correspondence between a hash value of a predetermined application program and the corresponding encryption/decryption key. As a result, secrecy of the encryption/decryption key can be managed reliably and easily.

Furthermore, in a case where multiple encryption/decryption keys are generated in correspondence with multiple server apparatuses for one application program, the above-described data structure enables reliable and easy management of correspondence among identification information of servers, the hash value of the application, and the corresponding encryption/decryption keys. As a result, secrecy of multiple encryption/decryption keys for one application can be managed reliably and easily.

(2) Explanation on Components of Software that Operates in Execution Environment 121 which is Protective Mode The execution environment 121 that is the protective mode includes the secure operating system 152, the dynamic tampering detection function unit 153, the secure boot unit 154, and the protected data operation unit 155.

(Secure Operating System 152)

The secure operating system 152 is an operating system that operates in the protective mode, and is software that manages software which operates in the protective mode.

(Dynamic Tampering Detection Function Unit 153)

The dynamic tampering detection function unit 153 is software that verifies whether the load function unit 129, the data encryption/decryption function unit 160, and the like in the normal mode have been tampered or not. Details will be described later.

(Secure Boot Unit 154)

The secure boot unit 154 executes secure boot when the information processing apparatus 100 is powered ON. Details will be described later. The secure boot unit 154 includes a tampering detection unit 154x. The tampering detection unit 154x detects tampering.

(Protected Data Operation Unit 155)

The protected data operation unit 155 (also referred to as "protective security processing unit") is composed of a permission list 133, a protected encryption/decryption unit 134, a protected operation unit 135, and a protected key table 136. The protected data operation unit 155 generates encryption/decryption keys of data and encrypts/decrypts data.

With the CPU 141 operating in accordance with the instruction codes included in the protected data operation unit 155, it appears as if the protected data operation unit 155 and the CPU 141 constitute one hardware unit and it is the hardware unit that operates. This hardware unit is also referred to as "protective security processing unit".

The permission list 133 includes one or more pieces of server information that identify server apparatuses for which a connection is to be permitted. Server information is identification information for identifying server apparatuses related to the application program. Here, a piece of server information may be an IP address, a URL, or alternatively an identifier able to uniquely identify a server.

The protected operation unit 135 includes a key generation unit (not shown) that generates keys used for encryption or decryption of data, and a tampering detection unit 135x. The protected operation unit 135 also instructs the protected encryption/decryption unit 134 to encrypt data. The tampering detection unit 135x detects tampering, and judges whether the application program which requested encryption/decryption of data is an unauthorized application program or not. A method for judging whether the application program is an unauthorized application program or not will be described later.

The protected operation unit 135 further includes a key deletion unit (not shown) that deletes keys retained by the data encryption/decryption function unit 160 when the application program is an unauthorized application. When there exists no unauthorized application program in the normal mode, the protected operation unit 135 further includes a key duplication unit (not shown) that reads keys stored in the protected key table 136, outputs the read keys to the data encryption/decryption function unit 160 via the mode switch unit 143 and the dedicated memory unit 104, and causes the data encryption/decryption function unit 160 to store the keys. In other words, the protected operation unit 135 copies the keys stored in the protected key table 136 to the data encryption/decryption function unit 160. Note that details will be described later.

The protected encryption/decryption unit 134 includes an encryption unit and a decryption unit that encrypts data and decrypts encrypted data, respectively, using keys stored in the protected key table 136.

The protected key table 136 is a data table storing keys used when encrypting data used by a host application program or when decrypting encrypted data. The protected key table 136 has the same data structure as the normal key table 128, and has an area for storing one or more pieces of key information. These reference hash value, server information, and keys are the same as those included in the normal key table 128, and description thereof is omitted.

1.4 Operation Process of Information Processing Apparatus 100

(1) Operation Process for Key Deletion by Information Processing Apparatus 100

Figure 5:
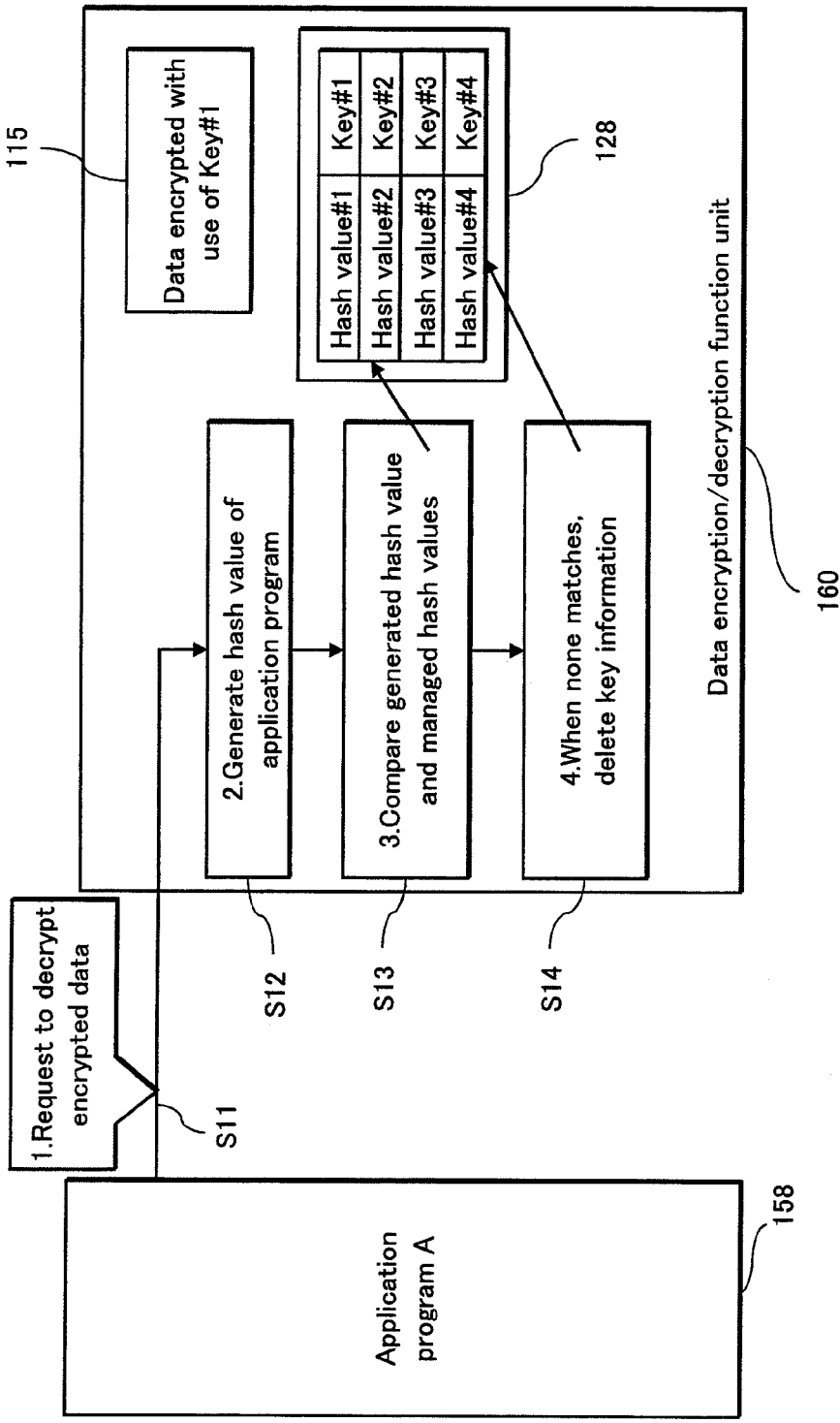
FIG. 5 is a conceptual figure that explains an operation process for deleting keys by the information processing apparatus 100.

The following describes an operation process for deleting keys used for encryption and decryption of data by the information processing apparatus 100, with reference to FIG. 5.

Upon the application program A 158 outputting a request of encrypting or decrypting data, to the data encryption/decryption function unit 160 (S11), the data encryption/decryption function unit 160 reads, from the memory unit 103, the entirety of the application program which is the request source, and generates an hash value of the application program by applying a hash function such as SHA-1 to the read application program (S12). Next, the data encryption/decryption function unit 160 reads all pieces of key information from the normal key table 128 and extracts a reference hash value from each piece of key information, and compares the generated hash value and each extracted reference hash value (S13). If there is no reference hash value that matches the generated hash value, that is, if none of the reference hash values matches the generated hash value, all the reference hash values stored in the normal key table 128 are deleted (S14).

(2) Operation Process for Secure Boot by Information Processing Apparatus 100

Figure 6:
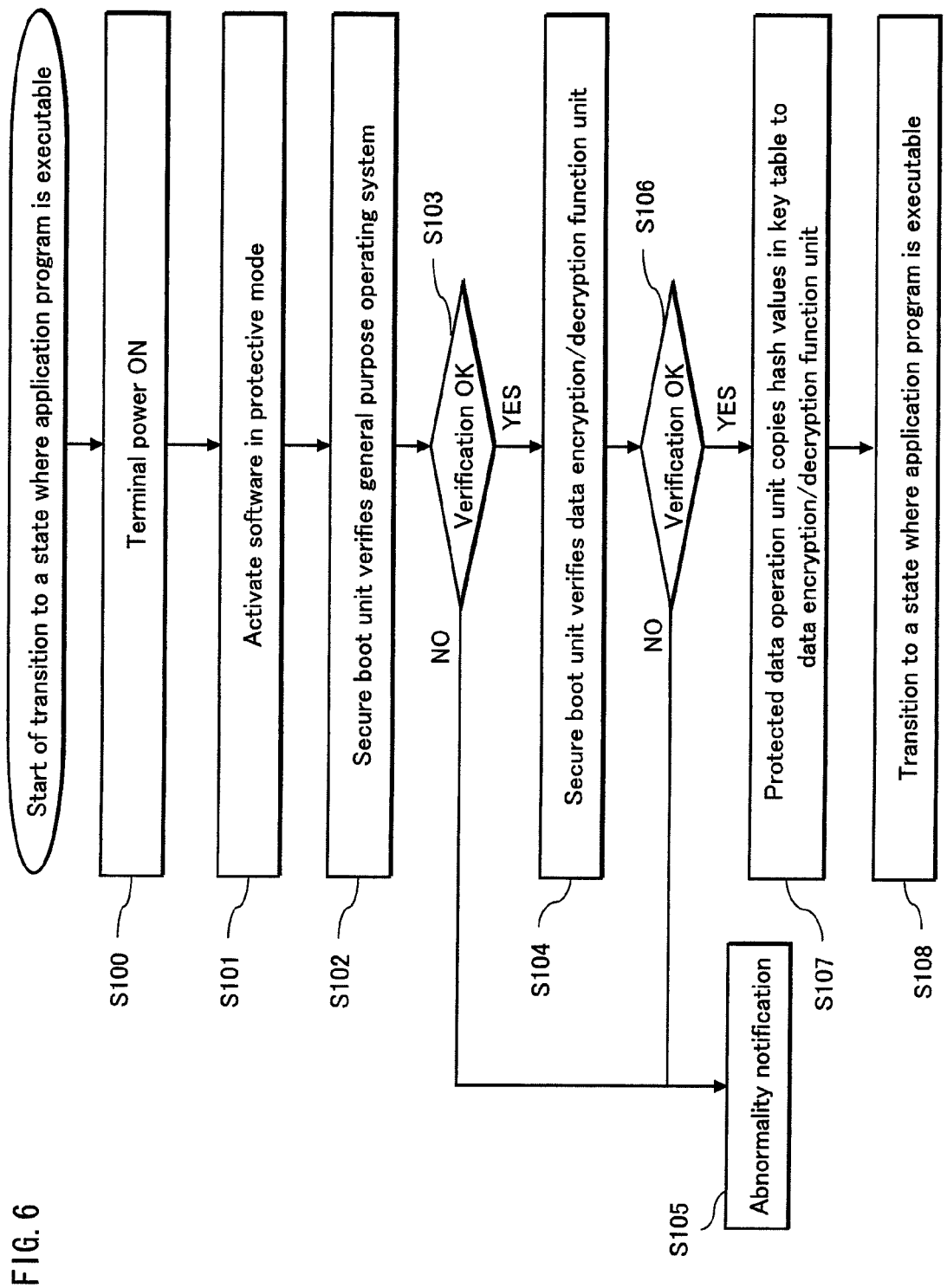

The following explains an operation process for secure boot by the information processing apparatus 100 from power-ON to a state where the application, program is operable, with reference to a flowchart shown in FIG. 6.

Upon the information processing apparatus 100 being powered ON (S100), the secure boot unit 154 which is software that operates in the protective mode is activated (S101).

Next, the tampering detection unit 154x of the secure boot unit 154 verifies the general purpose operating system 157. Specifically, the tampering detection unit 154x of the secure boot unit 154 generates a hash value of the general purpose operating system 157 stored in the memory unit 103 and verifies whether the general purpose operating system 157 has been tampered or not by comparing the generated hash value and the reference hash value that is securely stored in the secure boot unit 154 in advance (S102). Alternatively, secure boot specified by Mobile Phone WG (MPWG) of Trusted Computing Group (TCG) can be used for the verification.

When it is judged that the general purpose operating system 157 has not been tampered (S103: YES), the tampering detection unit 154x of the secure boot unit 154 verifies the data encryption/decryption function unit 160 stored in the memory unit 103. Specifically, the tampering detection unit 154x of the secure boot unit 154 generates a hash value of the data encryption/decryption function unit 160 and verifies whether the data encryption/decryption function unit 160 has been tampered or not by comparing the generated hash value and the reference hash value securely stored in the secure boot unit 154 in advance (S104). Alternatively, secure boot specified by Mobile Phone WG (MPWG) of Trusted Computing Group (TCG) can be used for the verification. Note that the verification in step S104 may be performed by the general purpose operating system 157 which has been verified to be not tampered.

When it is judged that the data encryption/decryption function unit 160 has not been tampered (S106: YES), the protected data operation unit 155 reads all pieces of key information from the protected key table 136 and writes the read piece of key information into the normal key table 128 via the mode switch unit 143 and the dedicated memory unit 104. In other words, the protected data operation unit 155 copies the piece of key information stored in the protected key table 136 to the normal key table 128 (S107). Next, the information processing apparatus 100 transits to a state where the application is executable (S108).

When it is judged that the general purpose operating system 157 has been tampered (S103: NO) or the data encryption/decryption function unit 160 has been tampered (S106: NO), a warning message is notified to a user, information indicating an abnormal termination is stored in the nonvolatile storage unit 102, and subsequently, the activation of the information processing apparatus 100 is stopped (S105).

Note that for each piece of key information shown in FIG. 4, the reference hash value of the application program and the server information may be stored in advance in the normal key table 128, and only the key associated with the reference hash value may be copied in step S107 instead of copying the key information.

(3) Overall Operation Process for Data Use by Information Processing Apparatus 100

Figure 7:
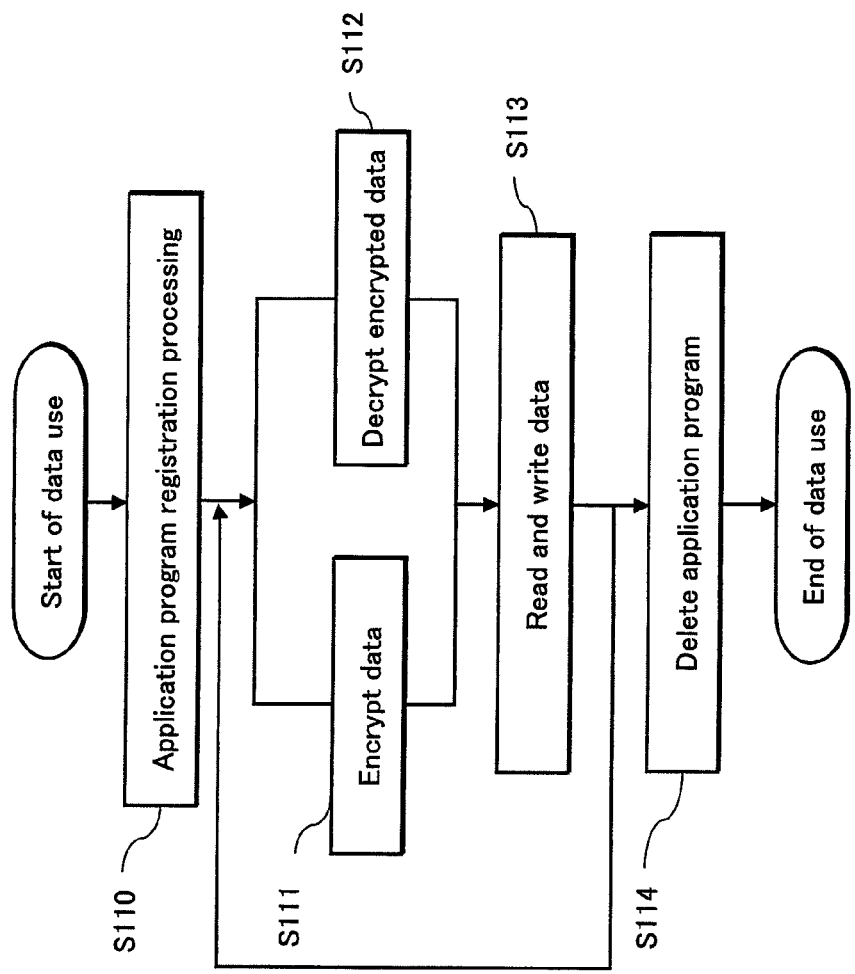
FIG. 7 is a flowchart showing a series of operations performed by an application program to use data.

The following explains the overall operation process for data use by the application program, with reference to a flowchart shown in FIG. 7. When an application program uses data, the information processing apparatus 100 performs the following operations.

Application program registration processing is performed (S110); subsequently, the application program encrypts data (S111) or decrypts encrypted data (S112); next, the application program reads or writes the data (S113). The application program encrypts/decrypts data and uses the data while repeating steps S111-S113 as required.

Following that, the application program is deleted by the user performing processing such as uninstalling of the application (S114), and the data use is terminated.

(4) State Transition during Data Encryption

Figure 8:
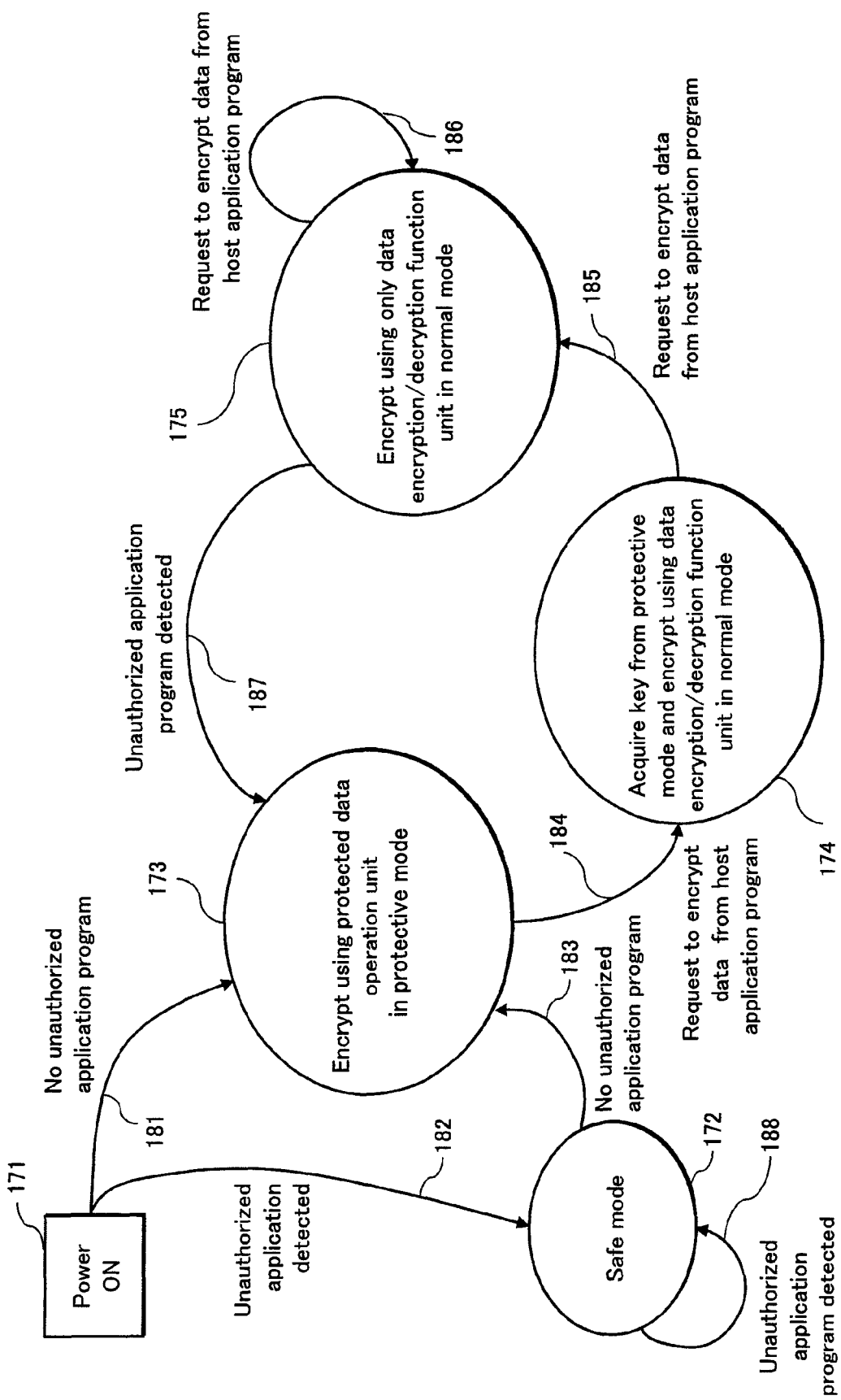
FIG. 8 is a state transition figure showing state transitions during encryption of data.

As shown in FIG. 8, the information processing apparatus 100 transits among four states 172, 173, 174 and 175 during data encryption.

The state 172 is a state where it is detected that an unauthorized application program is stored the memory unit 103, immediately after power-ON of the information processing apparatus 100. The state 173 is a state where when data is to be encrypted, the protected data operation unit 155 encrypts the data in the protected mode. The state 174 is a state where when data is to be encrypted, a key is acquired from the protection mode and the data encryption/decryption function unit 160 encrypts the data in the normal mode. The state 175 is a state where when data is to be encrypted, the data encryption/decryption function unit 160 encrypts the data in the normal mode using a key stored in the normal key table 128.

Upon the information processing apparatus 100 being powered ON (171), it is judged whether an unauthorized application program is stored in the memory unit 103 or not, and when no unauthorized application program is detected (181), the state transits to the state 173. When an unauthorized application program is detected (182), the state transits to the state 172.

In the state 173, upon receiving a request from an application program to encrypt data (184), the state transits to the state 174.

In the state 174, upon further receiving a request from the application program to encrypt data (185), the state transits to the state 175.

In the state 175, upon receiving a request from the application program to encrypt data (186), the state transits to the state 175 again. When it is detected that an unauthorized application program is stored in the memory unit 103 (187), the state transits to the state 173.

In the state 172, it is judged whether an unauthorized application program is stored in the memory unit 103 or not, and when no unauthorized application program is stored (183), the state transits to the state 173. When an unauthorized application program is stored (188), the state transits to the state 172 again.

(5) Operation Process for Registration of Application Program by Information Processing Apparatus 100

Figure 9:
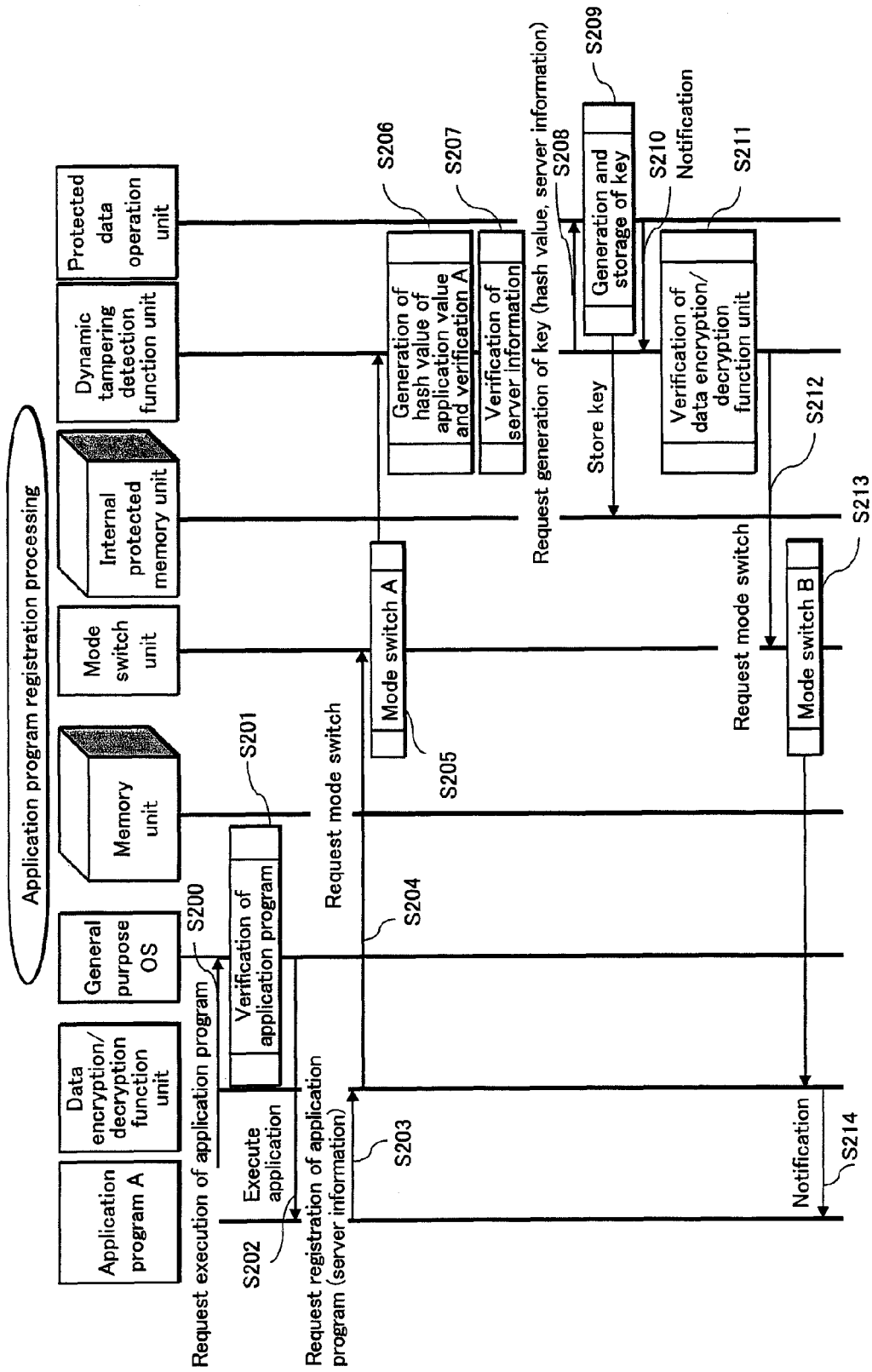
FIG. 9 is a sequence diagram indicating an operation process for registering an application program.

The following explains an operation process for registration of an application program by the information processing apparatus 100, with reference to a sequence diagram shown in FIG. 9.

When execution of an application program is instructed based on a user request, a request to execute the application program is output to the general purpose operating system 157 (S200). Here, the general purpose operating system 157 stores an address that indicates where the application program requested to be executed is positioned in the memory unit 103, into an execution request address storage position in the memory unit 103. Each program refers to this execution request address storage position when reading the application program to be executed, and know the storage position of the application program from the address stored therein. When there are more than one application program to be executed, there are more than one execution request address storage position.

The general purpose operating system 157 verifies the application program using the tampering detection unit 157x of (S201), and if the application program is an authorized application program, the general purpose operating system 157 starts executing the application program (S202).

The application program outputs an application program registration request with a piece of server information as an argument, to the data encryption/decryption function unit 160 (S203).

The data encryption/decryption function unit 160, upon receiving the application program registration request (S203), requests the mode switch unit 143 to perform a mode switch A to switch from the normal mode to the protective mode (S204), and the mode switch unit 143 performs the mode switch A that switches from the normal mode to the protective mode (S205).

The dynamic tampering detection function unit 153 is activated by the mode switch A (S205), and performs generation of a hash value of the application program and verification A (S206). Details of the generation of a hash value of the application program and the verification A will be described later.

Next, the dynamic tampering detection function unit 153 verifies the server information (S207). Details of the verification of the server information will be described later.

Next, the dynamic tampering detection function unit 153 requests the protected data operation unit 155 to generate a key, using the server information and the hash value as arguments (S208).

The protected data operation unit 155 generates the key and stores the generated key into the internal protected memory unit 144 (S209). Details of the generation and storage of the key will be described later.

Following the above, the protected data operation unit 155 notifies the dynamic tampering detection function unit 153 of the result indicating that the storage of the key is completed, i.e., the registration of the application program is completed (S210).

The dynamic tampering detection function unit 153 verifies whether the data encryption/decryption function unit 160 has been tampered or not (S211). Note that the operation corresponding to S211 may be performed between step S205 and step S206.

The dynamic tampering detection function unit 153 then requests the mode switch unit 143 to perform a mode switch B to switch from the protective mode to the normal mode (S212), and the mode switch unit 143 performs the mode switch B that switches from the protective mode to the normal mode (S213). Here, the mode switch unit 143 writes the data to be transferred from the protective mode to the normal mode, that is, the result, into the dedicated memory unit 104, switches to the normal mode, then reds the data from the dedicated memory unit 104, and outputs the read data to the normal mode. Details of the mode switch B will be described later.

The data encryption/decryption function unit 160 is activated by the mode switch B (S213), receives the result from the mode switch unit 143, and notifies the application program of the result (S214). This completes the registration processing of the application program.

(6) Operations for State Transition from State 173 to State 174

Figure 10:
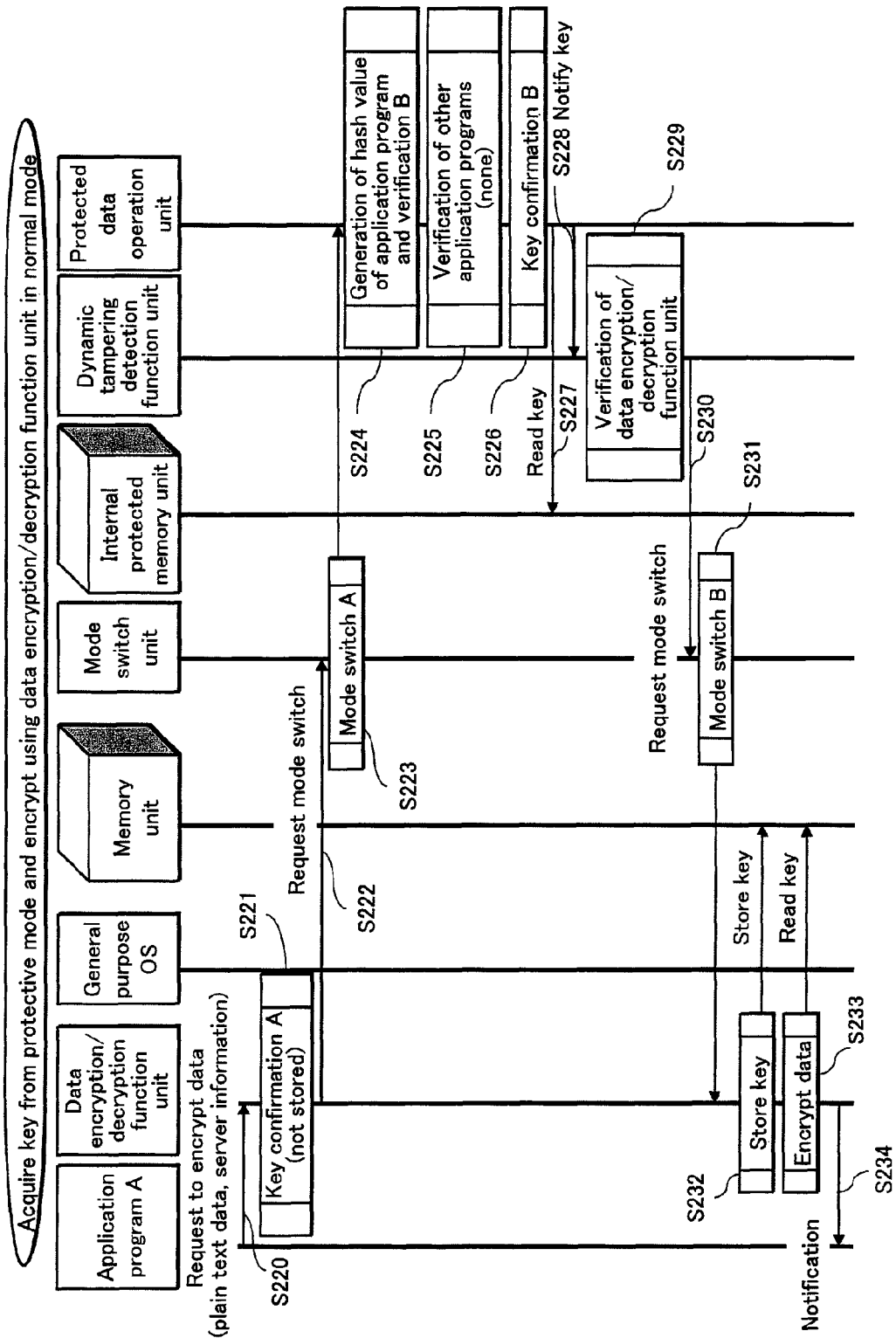
FIG. 10 is a sequence diagram showing operations for acquiring a key from the protective mode and performing encryption using the data encryption/decryption function unit in the normal mode.

The following explains operations for the state transition shown in FIG. 8 from the state 173 to the state 174, with reference to a sequence diagram shown in FIG. 10. That is, the operations for the transition to the state 174 where a key is acquired from the protective mode and encryption is performed in the normal mode using the data encryption/decryption function unit 160.

In the case of the state 173 shown in FIG. 8, when the application program requests encryption of data and there is no unauthorized application program present in the memory unit 103, operations described below are performed. Upon termination of the sequence shown in FIG. 10, the state transits to the state 174 shown in FIG. 8.

The application program requests the data encryption/decryption function unit 160 to encrypt data, using plain text data and a piece of server information as arguments (S220).

The data encryption/decryption function unit 160 performs key confirmation A, thereby confirming that the key is not stored in the normal key table 128 (S221). Next, the data encryption/decryption function unit 160 requests the mode switch unit 143 to perform the mode switch A to switch from the normal mode to the protective mode (S222).

The mode switch unit 143 performs the mode switch A (S223). Here, the mode switch unit 143 writes the data to be transferred from the normal mode to the protective mode, that is, the plain text data and the server information here, into the dedicated memory unit 104, switches to the protective mode, then reads the data from the dedicated memory unit 104, and outputs the read data to the protective mode. Details of the mode switch A will be described later. The protected data operation unit 155 is activated by the mode switch A (S223). The protected data operation unit 155 receives the plain text data and the server information from the mode switch unit 143.

The tampering detection unit 155x of the protected data operation unit 155 performs generation of a hash value of the application program and the verification A to verify whether the application program which requested the encryption of the data is an unauthorized application program or not (S224). Details of the generation of the hash value of the application program and the verification B will be described later.

Next, the tampering detection unit 155x of the protected data operation unit 155 verifies other application programs (S225). Here, it is assumed that no other application program is judged to be activated. Note that details of the verification of other application programs will be described later.

With this structure, when no application programs other than a predetermined application program corresponding to the hash value used for generating the encryption/decryption key are activated and there is no risk that these application programs use the encryption/decryption key, the encryption/decryption key is copied again in the normal key table 128 which is accessible as explained in the following. Consequently, once there is no more risk that an application program other than the predetermined application program may use the encryption/decryption key, complex encryption processing required for secretly managing the encryption/decryption key is significantly reduced again while the state where secrecy of the encryption key is secured and confidentiality of data is ensured is recovered.

Next, the protected data operation unit 155 performs key confirmation B (S226). Details of the key confirmation B will be described later. The protected data operation unit 155 then reads the key from the protected key table 136 of the internal protected memory unit 144 (S227), and transmits the key to the dynamic tampering detection function unit 153 (S228). The transmission of the key is performed via a shared memory of the protected data operation unit 155 in the internal protected memory unit 144 and the dynamic tampering detection function unit 153. Note that another method other than this may be used for the transmission. Use of the general purpose register 147 of the CPU 141 is an example of another method.

The dynamic tampering detection function unit 153 verifies whether the data encryption/decryption function unit 160 has been tampered or not (S229).

The dynamic tampering detection function unit 153 then specifies the key received from the protected data operation unit 155 and requests the mode switch unit 143 to perform the mode switch B to switch from the protective mode to the normal mode (S230).

The mode switch unit 143 stores, in the dedicated memory unit 104, the key specified by the dynamic tampering detection function unit 153 and perform the mode switch B (S231). Details of the mode switch B will be described later.

The data encryption/decryption function unit 160 is activated by the mode switch B (S231). The mode switch unit 143 reads the key from the dedicated memory unit 104 and transmits the read key to the data encryption/decryption function unit 160. The transmission of the key is performed via a shared memory included in the memory unit 103. Note that another method other than this may be used for the transmission. Use of the general purpose register 147 of the CPU 141 is an example of another method.

The data encryption/decryption function unit 160 stores therein the transmitted key (S232). Details of the storage of the key will be described later.

Next, the data encryption/decryption function unit 160 encrypts the plain text data using the key stored in the normal key table 128 of the memory unit 103 (S233). Here, an AES algorithm, a Triple DES algorithm, an RSA algorithm, or an elliptic curve cryptosystem algorithm may be used as an encryption algorithm.

Next, the data encryption/decryption function unit 160 manages the encrypted data by assigning thereto a data ID which is a unique identifier. The data encryption/decryption function unit 160 further notifies a host application program of the data ID (S234). Note that instead of assigning a data ID to the encrypted data, the entire encrypted data may be notified to the host application and the host application manages the encrypted data.

As described above, the encryption/decryption key is stored in the protected key table 136 in the protective mode, which is access-restricted, and when the protected data operation unit 155 performs encryption/decryption processing using the encryption/decryption key for the first time, processing is performed to switch the mode in order to acquire the encryption/decryption key from the access-restricted protected key table 136. After that, the encryption/decryption key is copied in the normal key table 128, which is access-allowed, and encryption/decryption is performed using the copied encryption/decryption key. Consequently, it is not necessary to perform processing for switching the mode each time encryption/decryption processing is performed, and as a result, complicated processing required when managing encryption/decryption keys in secrecy can be significantly reduced.

(7) Operations for Transition to State 175

Figure 11:
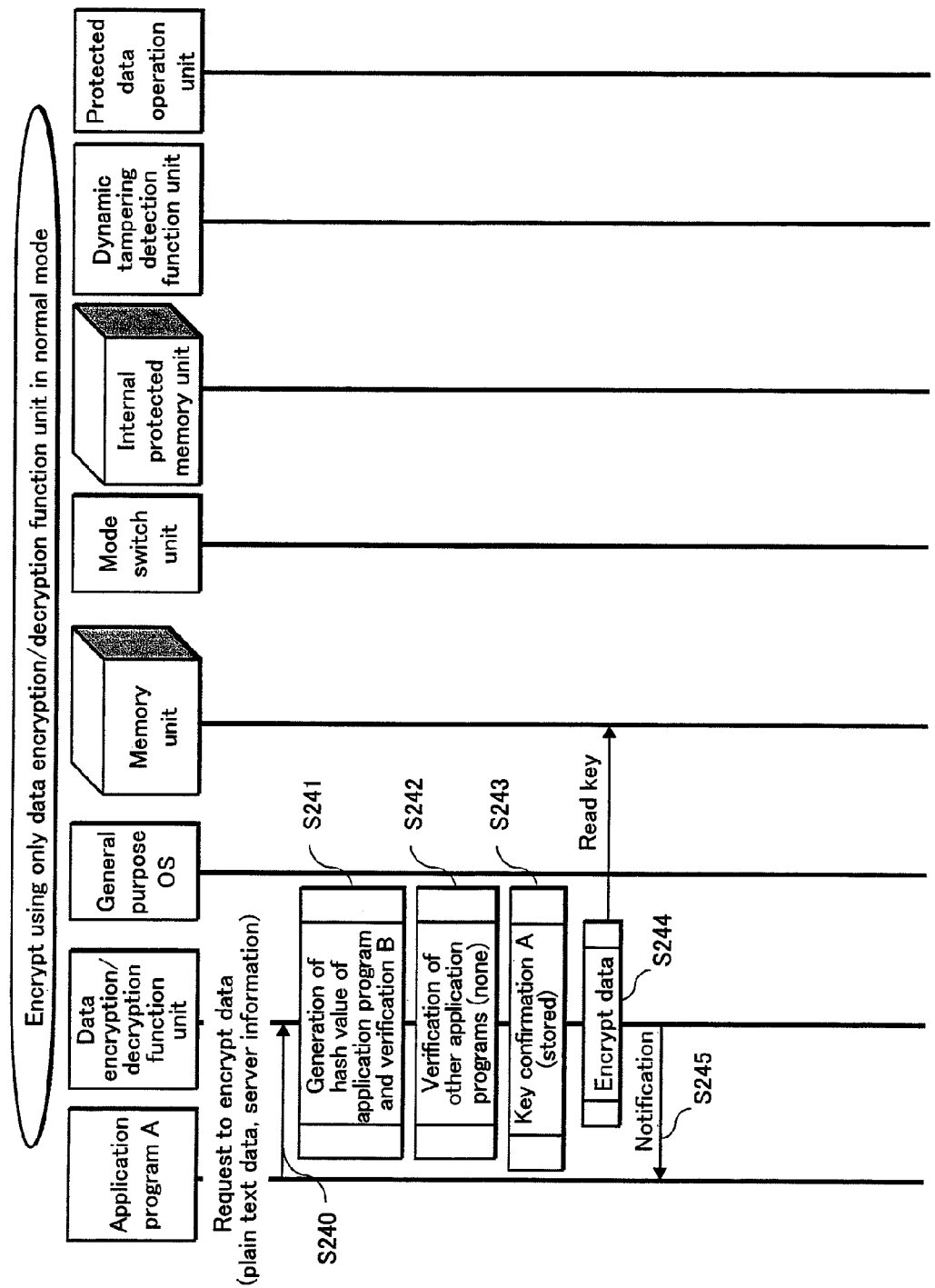
FIG. 11 is a sequence diagram showing operations for encryption using only the data encryption/decryption function unit in the normal mode.

The following explains operations for the transition to the state 175 shown in FIG. 8, with reference to a sequence diagram shown in FIG. 11.

In a case of the state 174 that is "encryption in which a key is acquired from the protective mode and the data encryption/decryption function unit in the normal mode is used" and in a case of the state 175 that is "encryption using only the data encryption/decryption function unit in the normal mode is used" shown in FIG. 8, a request to encrypt data is output and if no unauthorized application program exists, operations shown in FIG. 11 are performed. Upon completion of the operations shown in FIG. 11, the state transits to the state 175 shown in FIG. 8.

The application program requests the data encryption/decryption function unit 160 to encrypt data, using plain text data and a piece of server information as arguments (S240).

The tampering detection unit 127x of the data encryption/decryption function unit 160 performs generation of a hash value of the application program and the verification B to verify whether the application program is an unauthorized application program or not (S241). Details of the generation of the hash value of the application program and the verification B will be described later. Here, it is assumed that the application program which requested the data encryption is judged to be not an unauthorized application program.

Next, when the application program is not unauthorized, the tampering detection unit 127x of the data encryption/decryption function unit 160 verifies other application programs (S242). Here, it is assumed that no other application program is judged to be activated. Note that details of the verification of other application programs will be described later.

Next, the data encryption/decryption function unit 160 performs the key confirmation A (S243). Here, it is assumed that the key is judged to be present. Details of the key confirmation A will be described later. Next, the data encryption/decryption function unit 160 reads the key stored in the normal key table 128 in the memory, and encrypts the plain text data using the read key (S244). Here, an AES algorithm, a Triple DES algorithm, an RSA algorithm, or an elliptic curve cryptosystem algorithm may be used as an encryption algorithm.

Next, the data encryption/decryption function unit 160 manages the encrypted data by assigning thereto a data ID which is a unique identifier. The data encryption/decryption function unit 160 further notifies a host application program of the data ID (S245). Note that instead of assigning a data ID to the encrypted data, the entire encrypted data may be notified to the host application and the host application manages the encrypted data.

As described above, the encryption/decryption key is stored in the protected key table 136 in the protective mode, which is access-restricted, and when the protected data operation unit 155 performs encryption/decryption processing using the encryption/decryption key for the first time, processing is performed to switch the mode in order to acquire the encryption/decryption key from the access-restricted protected key table 136. After that, the encryption/decryption key is copied in the normal key table 128, which is access-allowed, and encryption/decryption is performed using the copied encryption/decryption key. Consequently, it is not necessary to perform processing for switching the mode each time encryption/decryption processing is performed, and as a result, complicated processing required when managing encryption/decryption keys in secrecy can be significantly reduced.

(8) Operations for Transition to State 173

Figure 12:
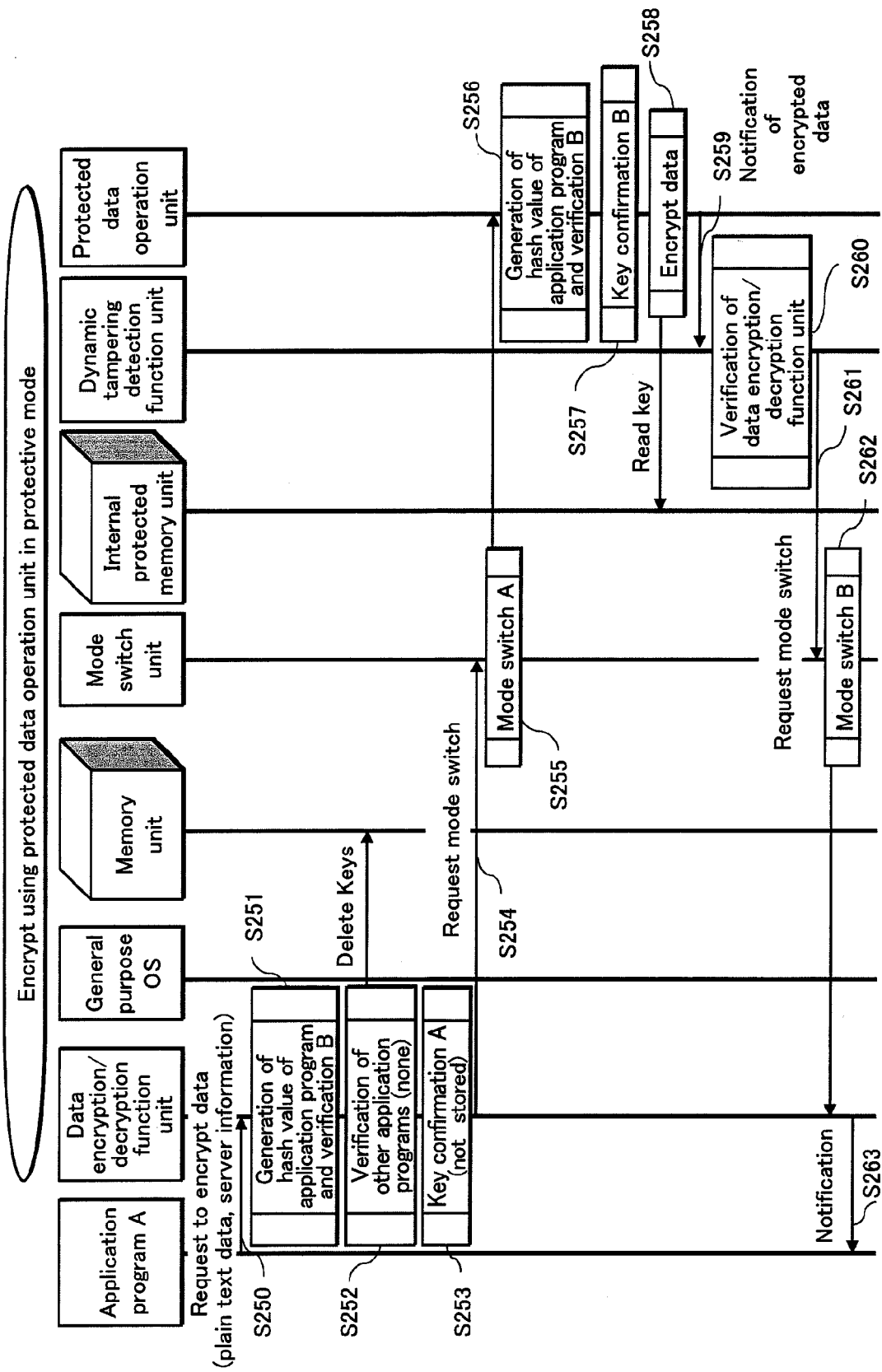
FIG. 12 is a sequence diagram showing operations for encryption using the protected data operation unit in the protective mode.

The following explains operations for the transition to the state 173 which is "encryption using the protected data operation unit in the protective mode" shown in FIG. 8, with reference to a sequence diagram shown in FIG. 12.

In the case of the state 175 which is "encryption using only the data encryption/decryption function unit in the normal mode" shown in FIG. 8, a request to encrypt data is output, and if no unauthorized application program exists, operations shown in FIG. 12 are performed. Upon completion of the operations shown in FIG. 12, the state transits to the state 173 shown in FIG. 8 again.

The application program requests the data encryption/decryption function unit 160 to encrypt data, using plain text data and a piece of server information as arguments (S250).

Next, the tampering detection unit 127x of the data encryption/decryption function unit 160 performs generation of a hash value of the application program and the verification A to verify whether the application program is an unauthorized application program or not (S251). Here, it is assumed that the application program is judged to be not an unauthorized program. Note that details of the generation of a hash value of the application program and the verification B will be described later.

Next, the tampering detection unit 127x of the data encryption/decryption function unit 160 verifies other application programs, and here, it is assumed that presence of another application program that is an unauthorized application program is detected (S252). Note that details of the verification of other application programs will be described later. In this case, the data encryption/decryption function unit 160 deletes all the keys stored in the normal key table 128. When deleting, the data encryption/decryption function unit 160 can overwrite the keys stored in the normal key table with a specific value such as "0", or generate a random number and overwrites the keys with the generated random number.

The data encryption/decryption function unit 160 then performs the key confirmation A, and here, it is assumed that the data encryption/decryption function unit 160 confirms that the key does not exist in the memory unit 103. Note that details of the key confirmation A will be described later. Next, the data encryption/decryption function unit 160 requests the mode switch unit 143 to switch the mode (S254). The mode switch unit 143 performs the mode switch A (S255). Note that details of the mode switch A will be described later.

The protected data operation unit 155 is activated by the mode switch A (S255).

Between step S255 and step S257, the tampering detection unit 155x of the protected data operation unit 155 performs generation of a hash value of the application program and the verification A to verify whether the application program which requested the encryption of the data is an unauthorized application program or not (S256). Here, it is assumed that the application program which requested the encryption of the data is not an unauthorized application program.

Next, the protected data operation unit 155 performs the key confirmation B (S257). Here, it is assumed that presence of the key is confirmed. Details of the key confirmation B will be described later. Next, the protected data operation unit 155 reads the key from the internal protected memory unit 144 (S258), and encrypts the data using the read key (S258). Here, an AES algorithm, a Triple DES algorithm, an RSA algorithm, or an elliptic curve cryptosystem algorithm may be used as an encryption algorithm.

Next, the protected data operation unit 155 notifies the dynamic tampering detection function unit 153 of the encrypted data (S259).

The dynamic tampering detection function unit 153 verifies whether the data encryption/decryption function unit 160 has been tampered or not (S260). Next, the dynamic tampering detection function unit 153 notifies the mode switch unit 143 of the encrypted data and requests the mode switch unit 143 to perform the mode switch B to switch from the protective mode to the normal mode (S261).

The mode switch unit 143 stores the received encrypted data into the dedicated memory unit 104 and performs the mode switch B (S262). Details of the mode switch B will be described later. The data encryption/decryption function unit 160 is activated by the mode switch B (S262). In this case, the mode switch unit 143 reads the encrypted data from the dedicated memory unit 104 and notifies the data encryption/decryption function unit 160 of the encrypted data.

The data encryption/decryption function unit 160 manages the encrypted data by assigning thereto a data ID which is a unique identifier. The data encryption/decryption function unit 160 further notifies a host application program of the data ID (S263). Note that instead of assigning a data ID to the encrypted data, the entire encrypted data may be notified to the host application and the host application manages the encrypted data.

With the above structure, after the encryption/decryption key copied in the normal key table 128 is deleted from the normal key table 128, the data encryption/decryption function unit 160 does not perform encryption/decryption processing in the normal mode. Instead, the mode is switched from the normal mode to the protective mode, and the protected data operation unit 155 which can access the protected key table 136 storing the encryption/decryption keys performs the encryption/decryption processing. Thus, although mode switch processing is performed after the encryption/decryption key copied in the normal key table 128 is deleted from the normal key table 128, secrecy of the encryption/decryption key is secured, and as a result, confidentiality of the encryption/decryption key is ensured.

(9) Operations when Unauthorized Application Program Requests Encryption

Figure 13:
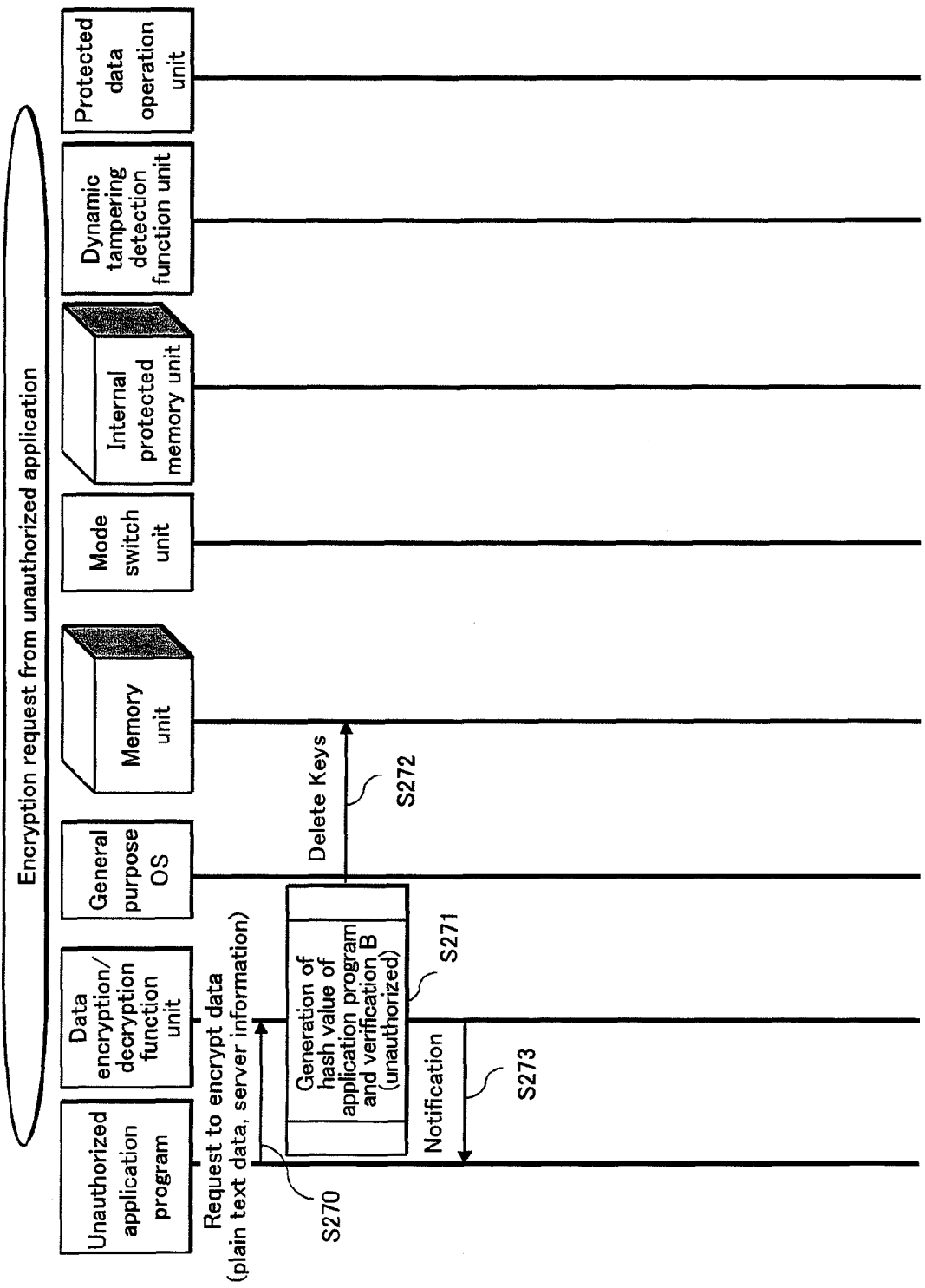
FIG. 13 is a sequence diagram showing operations in a case where encryption is requested by an unauthorized application program.

The following describes operations in a case where an unauthorized application program requests encryption of data, with reference to a sequence diagram shown in FIG. 13.

When an unauthorized application program requests encryption of data, the state of the information processing apparatus 100 transits to the state 173 which is "encryption using the protected data operation unit in the protective mode" shown in FIG. 8

The application program requests the data encryption/decryption function unit 160 to encrypt data, using plain text data and a piece of server information as arguments (S270).

The tampering detection unit 127x of the data encryption/decryption function unit 160 performs generation of a hash value of the application program and the verification B to verify whether the application program is an unauthorized application program or not (S271). Here, it is assumed that the application program is judged to be unauthorized. When judging that the application program is an unauthorized application program, the data encryption/decryption function unit 160 deletes all the keys stored in the normal key table 128 (S272). When deleting, the data encryption/decryption function unit 160 can overwrite the keys stored in the normal key table with a specific value such as "0", or generate a random number and overwrite the keys with the generated random number. Note that details of the generation of a hash value of the application program and the verification B will be described later.

Next, the data encryption/decryption function unit 160 notifies the application program that the encryption processing has failed (S273).

With this structure, the encryption/decryption key stored the normal key table 128 is deleted in a case where there is possibility that an application program other than the application corresponding to the hash value that was used when generating the encryption/decryption key (described later with reference to FIG. 21) uses the encryption/decryption key stored in the normal key table 128, which is not access-restricted. Consequently, secrecy of the encryption/decryption key is secured, and as a result, confidentiality of the data is be ensured.

Accordingly, complex encryption processing required when secretly managing the encryption/decryption key is significantly reduced while secrecy of the encryption key is secured and confidentiality of the data is ensured as well.

(10) State Transition during Decryption of Encrypted Data

Figure 14:
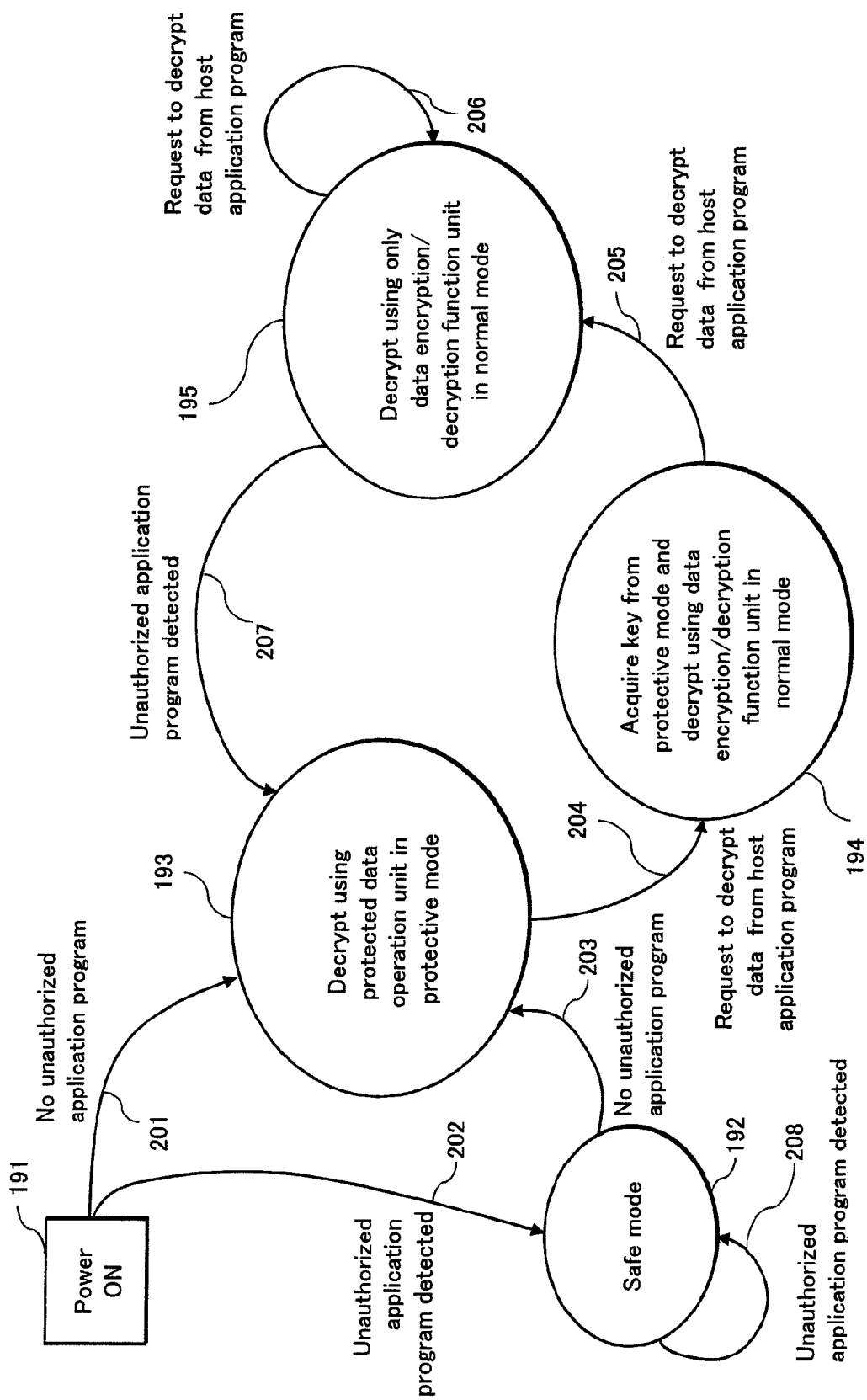
FIG. 14 shows state transitions during decryption of encrypted data.

As shown in FIG. 14, the information processing apparatus 100 transits among four states 192, 193, 194, and 195 during decryption of encrypted data.

The state 192 is a state where it is detected that an unauthorized application program is stored in the memory unit 103, immediately after power-ON of the information processing apparatus 100. The state 193 is a state where when data is to be encrypted, the protected data operation unit 155 decrypts the data in the protected mode. The state 194 is a state where when data is to be encrypted, a key is acquired from the protection mode and the data encryption/decryption function unit 160 decrypts the data in the normal mode. The state 195 is a state where when data is to be decrypted, the data encryption/decryption function unit 160 decrypts the data in the normal mode using a key in the normal key table 128. Upon the information processing apparatus 100 being powered ON (191), it is judged whether an unauthorized application program is stored in the memory unit 103 or not, and when no unauthorized application program is detected (201), the state transits to the state 193. When an unauthorized application program is detected (202), the state transits to the state 192.

In the state 193, upon receiving a request from an application program to encrypt data (204), the state transits to the state 194.

In the state 194, upon further receiving a request from the application program to encrypt data (205), the state transits to the state 195.

In the state 195, upon receiving a request from an application program to encrypt data (206), the state transits to the state 195 again. When it is detected that an unauthorized application program is stored in the memory unit 103 (207), the state transits to the state 193.

In the state 192, it is judged whether an unauthorized application program is stored in the memory unit 103 or not, and when no unauthorized program is stored (203), the state transits to the state 193. When an unauthorized program is stored (208), the state transits to the state 192 again.

The only difference between the state transitions during encryption of data shown in FIG. 8 and the state transitions during decryption of encrypted data shown in FIG. 14 is whether data is encrypted or encrypted data is decrypted. Accordingly, in the following explanation of the decryption of encrypted data, only a typical case, that is, "decryption in which a key is acquired from the protective mode and the data encryption/decryption function unit in the normal mode is used" is explained.

(11) Operations by Information Processing Apparatus 100 when Transiting to State 194

Figure 15:
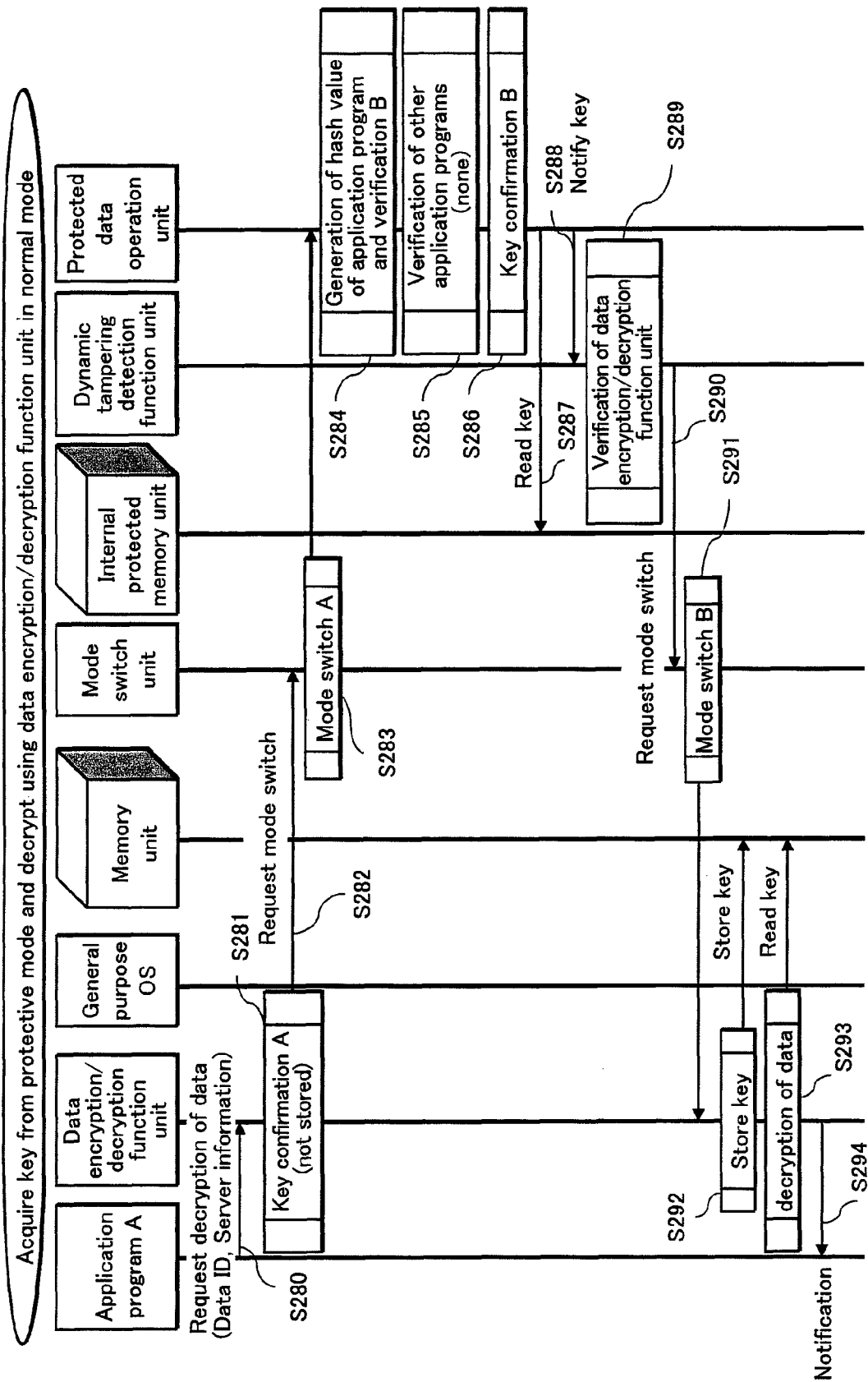
FIG. 15 is a sequence diagram showing operations for acquiring a key from the protective mode and performing decryption using the data encryption/decryption function unit in the normal mode.

The following explains the operations by the information processing apparatus 100 when transiting to the state 194 shown in FIG. 14, which is "decryption in which a key is acquired from the protective mode and the data encryption/decryption function unit in the normal mode is used", with reference to a sequence diagram shown FIG. 15.

In the case of the state 193 that is "decryption using the protected data operation unit in the protective mode" shown in FIG. 14, when an application program requests decryption of data and there is no unauthorized application program present in the memory unit 103, the information processing apparatus 100 operates as shown in FIG. 15. Upon termination of the sequence shown in FIG. 15, the state transits to the state 194 that is "decryption in which a key is acquired from the protective mode and the data encryption/decryption function unit in the normal mode is used" shown in FIG. 14.

The application program requests the data encryption/decryption function unit 160 to decrypt data using a data ID indicating encrypted data as an argument (S280).

The data encryption/decryption function unit 160 performs the key confirmation A, thereby confirming that the key is not stored in the normal key table 128 (S281). Next, the data encryption/decryption function unit 160 requests the mode switch unit 143 to perform the mode switch A to switch from the normal mode to the protective mode (S282). The mode switch unit 143 performs the mode switch A (S283). Note that details of the mode switch A will be described later. The protected data operation unit 155 is activated by the mode switch A (S283).

The tampering detection unit 155x of the protected data operation unit 155 generates a hash value of the application program and performs the verification B to verify whether the application program which requested the encryption of the data is an unauthorized application program or not (S284). Here, it is assumed that the application program is judged not to be an unauthorized program. Details of the generation of the hash value of the application program and the verification B will be described later.

Next, the tampering detection unit 155x of the protected data operation unit 155 verifies other application programs (S285). Here, it is assumed that no other application program is activated. Note that details of the verification of the other application programs will be described later.

Next, the protected data operation unit 155 performs the key confirmation B (S286). Here, it is assumed that the key is judged to be present. Details of the key confirmation B will be described later. The protected data operation unit 155 then reads the key from the protected key table 136 of the internal protected memory unit 144 (S287), and transmits the key to the dynamic tampering detection function unit 153 (S288). The transmission of the key is performed via a shared memory of the protected data operation unit 155 in the internal protected memory unit 144 and the dynamic tampering detection function unit 153. Note that another method other than this may be used for the transmission. Use of the general purpose register 147 of the CPU 141 is an example of another method.

The dynamic tampering detection function unit 153 verifies whether the data encryption/decryption function unit 160 has been tampered or not (S289). Here it is assumed that the dynamic tampering detection function unit 153 is verified to be not tampered.

The dynamic tampering detection function unit 153 then specifies the key and requests the mode switch unit 143 to perform the mode switch B to switch from the protective mode to the normal mode (S290).

The mode switch unit 143 stores, in the dedicated memory unit 104, the key specified by the dynamic tampering detection function unit 153 and performs the mode switch B (S291). Details of the mode switch B will be described later. The data encryption/decryption function unit 160 is activated by the mode switch B (S291). The mode switch unit 143 reads the key from the dedicated memory unit 104 and transmits the read key to the data encryption/decryption function unit 160. The transmission of the key is performed via a shared memory included in the memory unit 103. Note that another method other than this maybe used. Use of the general purpose register 147 of the CPU 141 is an example of another method.

The data encryption/decryption function unit 160 stores therein the transmitted key (S292). Details of the storage of the key will be described later. Next, the data encryption/decryption function unit 160 reads the key stored in the normal key table 128 of the memory unit 103 and decrypts the encrypted data using the read key (S293). Here, an AES algorithm, a Triple DES algorithm, an RSA algorithm, or an elliptic curve cryptosystem algorithm may be used as an encryption algorithm.

Next, the data encryption/decryption function unit 160 manages the generated plain text data by assigning thereto a data ID which is a unique identifier. The data encryption/decryption function unit 160 further notifies a host application program of the data ID (S294). Note that when a data ID is not assigned to the plain text data, the data encryption/decryption function unit 160 transmits, to the application program, the plain text data as an argument instead of the data ID.

(12) Operations for Verification of Application Program

Figure 16:
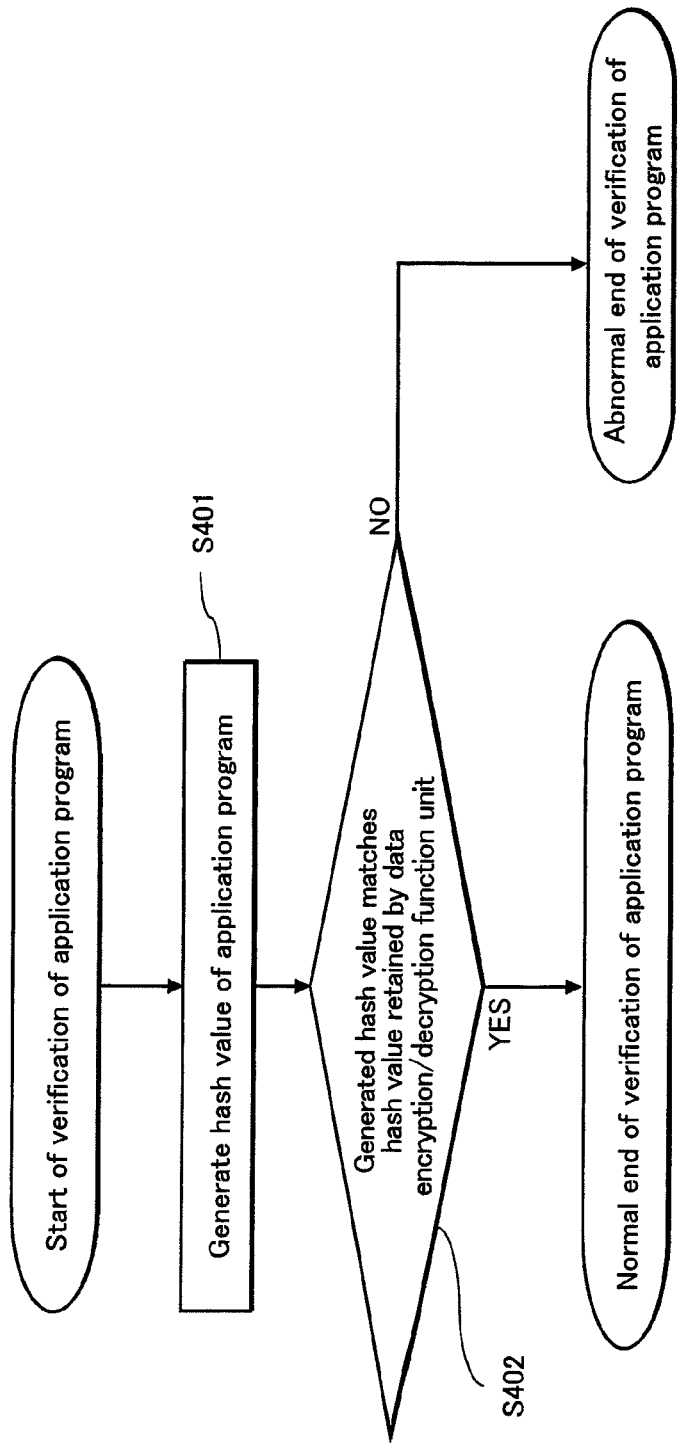
FIG. 16 is a flowchart showing operations for verifying the application program.

The following explains the operations by the information processing apparatus 100 for verification of an application program, with reference to a flowchart shown in FIG. 16.

The operations for the verification of the application program explained in the following are details of the verification of the application program indicated in step S201 in FIG. 9.

The tampering detection unit 157x, of the general purpose operating system 157 reads the application program from the memory unit 103, and generates a hash value for the read application program using, for example, a one-way hash function such as SHA-1 (S401).

Next, the general purpose operating system 157 judges whether the generated hash value matches any of hash values retained by the normal key table 128 (S402).

When the generated hash value matches (S402: YES), the verification of the application program terminates normally. When the generated hash value does not match (S402: NO), the verification of the application program terminates abnormally.

In a case of an abnormal termination, the general purpose operating system 157 does not execute the application program, that is to say, prohibits execution of the application program. The operating system 157 may also store, in the nonvolatile storage unit 102, information indicating that the application program is an unauthorized application program, as a log. Furthermore, the information processing apparatus 100 may be activated in a safe mode with use of the log in a case where power to the information processing apparatus 100 is turned on after the power is cut off once. Note that activation in the safe mode will be described later as safe boot.

Additionally, a one-way function other than SHA-1 can be used for the generation of the hash value. For example, MD5, SHA-256, AES, or DES may be used.

(13) Operations for Safe Boot

Figure 17:
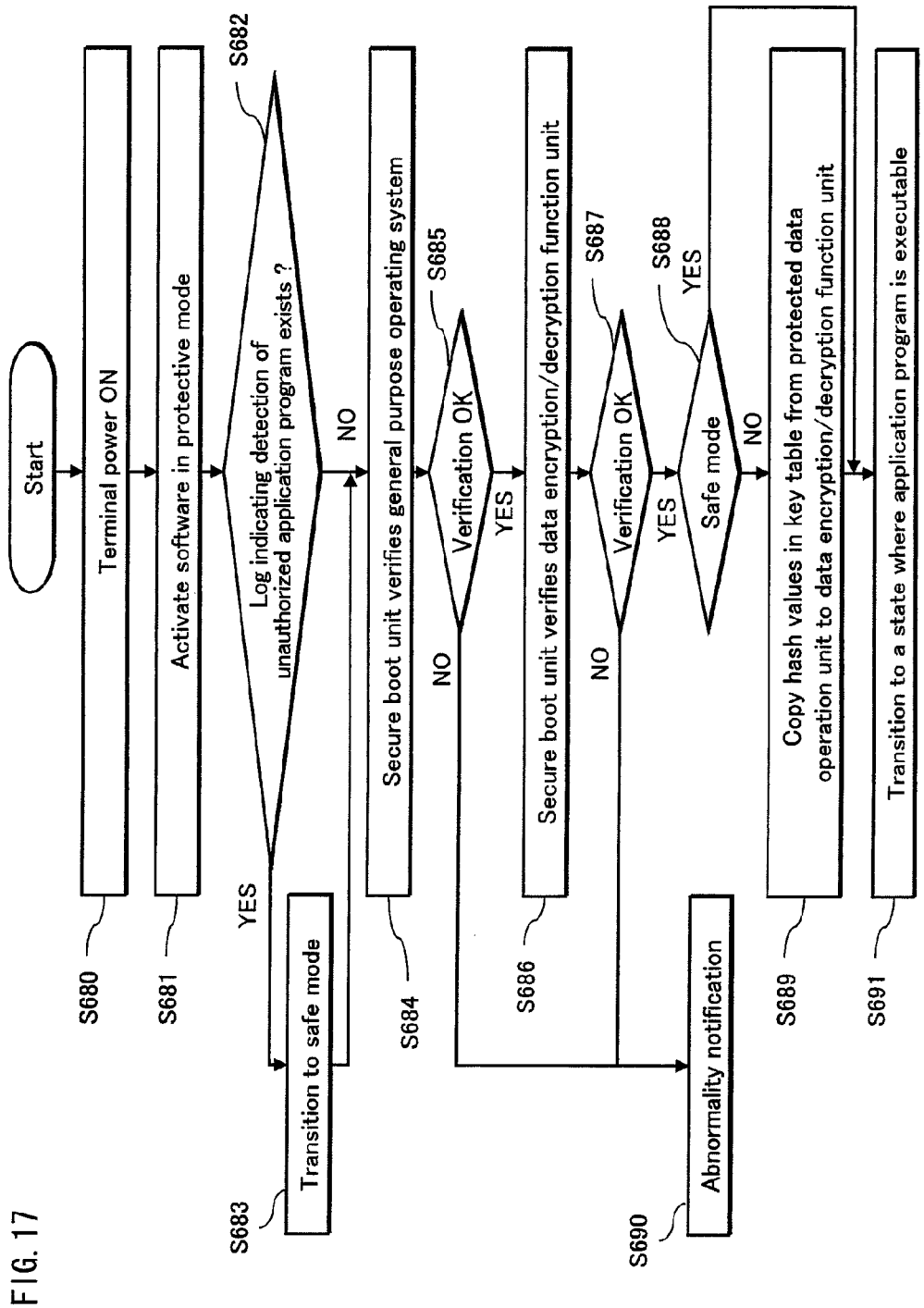
FIG. 17 is a flowchart showing operations by the information processing apparatus 100 when being activated by safe boot.

The following describes the operations for the safe boot, with reference to the flowchart shown in FIG. 17.

Upon the information processing apparatus 100 powered ON (S680), the secure boot unit 154 which is software in the protective mode is activated (S681).

Next, the secure boot unit 154 judges whether information indicating that the application program stored in the memory unit 103 is an unauthorized application program is stored as a log in the nonvolatile storage unit 102 or not (S682).

When information indicating that the application program stored in the memory unit 103 is an unauthorized application program exists as a log (S682: YES), the information processing apparatus 100 transits to the safe mode (S683). In the safe mode, the secure boot unit 154 performs setting on the protected data operation unit 155 such that in encryption/decryption processing thereafter, the protected data operation unit 155 does not copy the encryption/decryption key stored in the protected key table 136 into the normal key table 128 of the normal mode and the protected data operation unit 155 performs the encryption/decryption processing. Next, control goes to step S684.

When no information indicating presence of an unauthorized application program exists a log (S682: NO), the tampering detection unit 154x of the secure boot unit 154 verifies the general purpose operating system 157 (S684). Specifically, the tampering detection unit 155x of the secure boot unit 154 generates a hash value of the general purpose operating system 157 and verifies whether the general purpose operating system 157 has been tampered with by comparing the generated hash value and the reference hash value securely stored in advance. Note that secure boot specified by Mobile Phone WG (MPWG) of Trusted Computing Group (TCG) can be used for verification instead.

When it is judged that the general purpose operating system 157 has not been tampered (S685: YES), the tampering detection unit 154x of the secure boot unit 154 verifies the data encryption/decryption function unit 160. Specifically, the tampering detection unit 154x of the secure boot unit 154 generates a hash value of the data encryption/decryption function unit 160 and verifies whether the data encryption/decryption function unit 160 has been tampered or not by comparing the generated hash value and the reference hash value that is securely stored in advance. Note that secure boot specified by Mobile Phone WG (MPWG) of Trusted Computing Group (TCG) can be used for verification instead.

When it is judged that the data encryption/decryption function unit 160 has not been tampered (S687: YES), it is judged whether the information processing apparatus 100 is in the safe mode (S688), and when the information processing apparatus 100 is not in the safe mode (S688: NO), the protected data operation unit 155 copies the hash value stored in the protected key table 136, into the normal key table 128 of the data encryption/decryption function unit 160 (S689), and the information processing apparatus 100 transits to a state where the application program is executable (S691).

When the information processing apparatus 100 is in the safe mode (S688: YES), the information processing apparatus 100 transits to a state where the application program is executable (S691).

When it is judged that the general purpose operating system 157 has been tampered (S685: NO) or the data encryption/decryption function unit 160 has been tampered (S687: NO), the activation of the information processing apparatus 100 is terminated. Additionally, a warning message may be provided to a user (S690).

Note that the verification in step S686 may be performed by the general purpose operating system 157 that has been verified to be not tampered.

Additionally, instead of copying the hash value in step S689, the hash value may be stored in the normal key table 128 of the data encryption/decryption function unit 160 in advance.

(14) Operations for Mode Switch A

Figure 18:
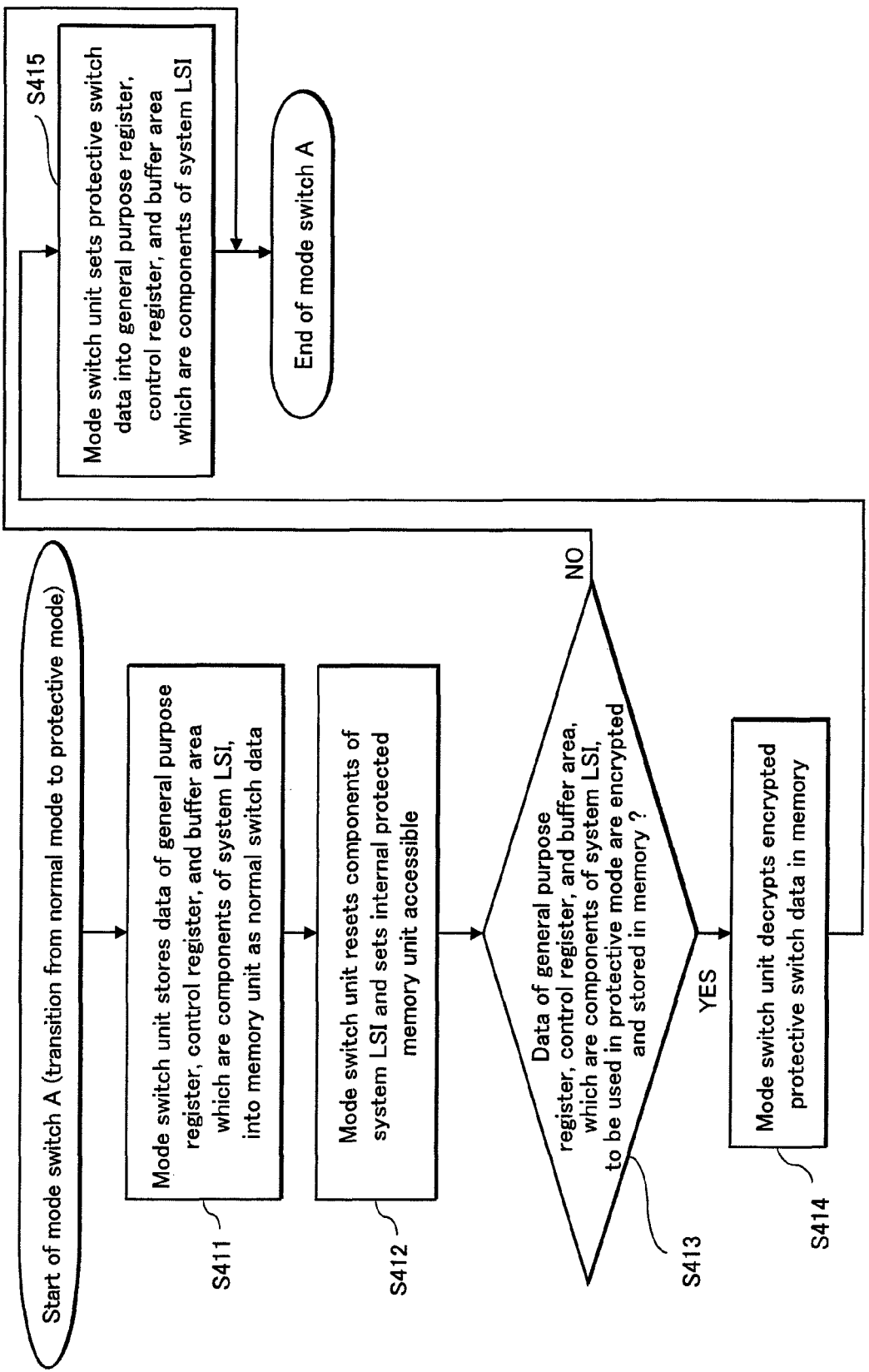
FIG. 18 is a flowchart showing operations of a mode switch A which switches from the normal mode to the protective mode.

The following describes the operations for the mode switch A that switches the mode from the normal mode to the protective mode, with reference to a flowchart shown in FIG. 18. The operations explained in the following are details of step S205 in FIG. 9, step S223 in FIG. 10, step S255 in FIG. 12, and step S283 in FIG. 15.

The mode switch unit 143 stores following data into the memory unit 103 as normal switch data 162: data stored in the general purpose register 147, the control register 148, and the buffer area 149 of the CPU 141 of the system LSI 101; and data stored in the control register 150 and the buffer area 151 of the peripheral circuit 142 of the system LSI 101 (S411).

Next, the mode switch unit 143 resets the CPU 141 and the peripheral circuit 142 of the system LSI 101, and sets the internal protected memory unit 144 to be accessible (S412).

Next, it is judged whether the data to be used in the protective mode, that is, the data stored in the general purpose register 147, the control register 148, and the buffer area 149 of the CPU 141 of the system LSI 101, and data stored in the control register 150 and the buffer area 151 of the peripheral circuit 142 of the system LSI 101 are stored encrypted in the memory unit 103 (S413).

When it is judged the data to be used in the protective mode is stored encrypted in the memory unit 103 (S413: YES), the mode switch unit 143 decrypts the protective switch data 161 stored encrypted in the memory unit 103 (S414). Here, an AES algorithm, a Triple DES algorithm, an RSA algorithm, or an elliptic curve cryptosystem algorithm may be used as a decryption algorithm for decrypting the protective switch data 161. Alternatively, when decrypting protective switch data 161, the key stored in the internal protected memory unit 144 or a key unique to the system LSI 101 may be used.

Next, the mode switch unit 143 sets the protective switch data generated as the result of the decrypting, to the general purpose register 147, the control register 148, and the buffer area 149 of the CPU 141 of the system LSI 101, and the control register 150 and the buffer area 151 of the peripheral circuit 142 of the system LSI 101 (S415). This completes the mode switch A.

When it is judged the encrypted protective switch data is not stored in the memory unit 103 (S413: NO), the mode switch A terminates.

Figure 19:
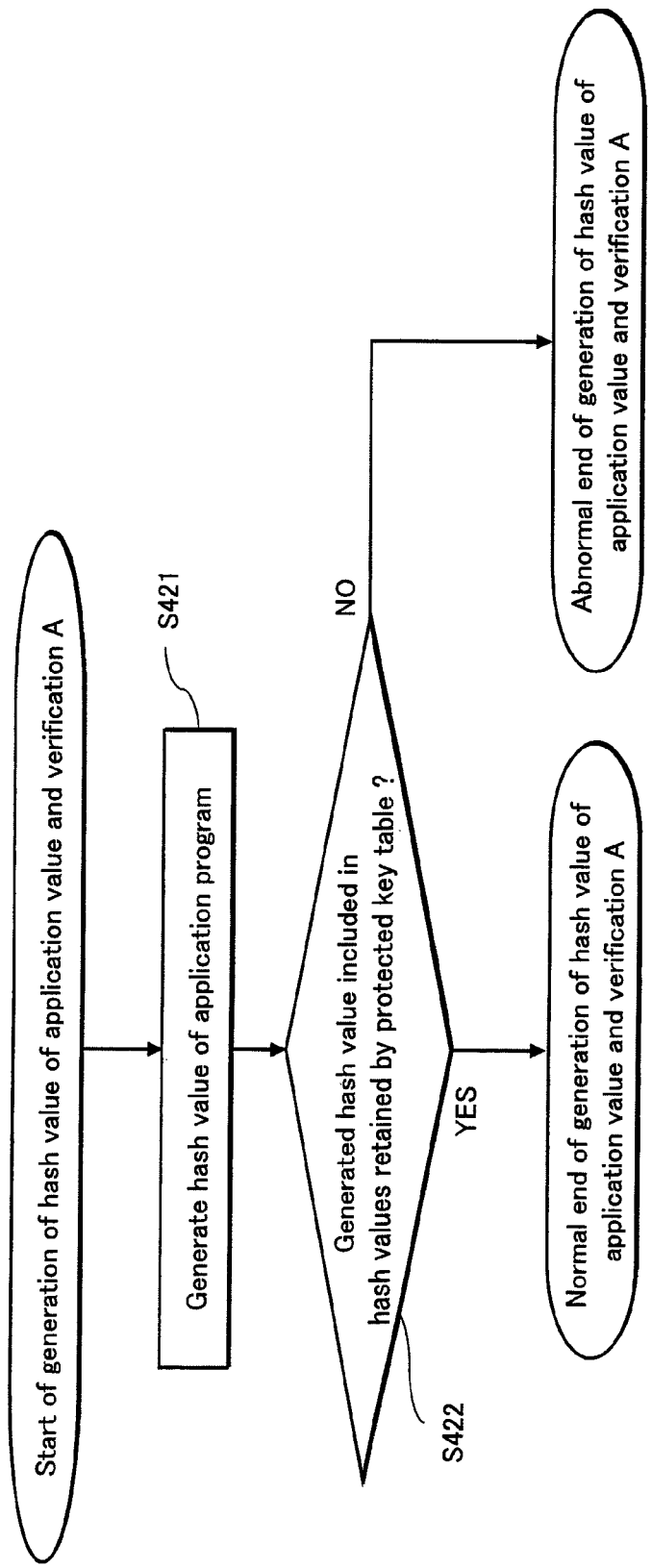
FIG. 19 is a flowchart showing operations for generation of a hash value of the application program and verification A.

(15) Operations for Generation of Hash Value of Application Program and Verification A The following explains the operations for the generation of a hash value of the application program and the verification A, with reference to a flowchart shown in FIG. 19. The operations for the generation of the hash value of the application program and the verification A are details of step S206 in FIG. 9.

The dynamic tampering detection function unit 153 generates a hash value for an execution image of the application program in the memory unit 103, using a one-way function such as SHA-1 (S421).

Next, the dynamic tampering detection function unit 153 judges whether the generated hash value matches any of the hash values retained in the protected key table 136 (S422).

When the generated hash value matches (S422: YES), the generation of the hash value of the application and the verification A terminate normally. When the generated hash value does not match (S422: NO), the generation of the hash value of the application and the verification A terminate abnormally.

In a case of an abnormal termination, the secure operating system 152 prohibits execution of the application program. The secure operating system 152 may also store, in the nonvolatile storage unit 102, information indicating that the application program is an unauthorized application program, as a log.

Note that a one-way function other than SHA-1 can be used for the generation of the hash value. For example, MD5SHA-256, AES, and DES may be used.

(16) Operations for Verification of Server Information

Figure 20:
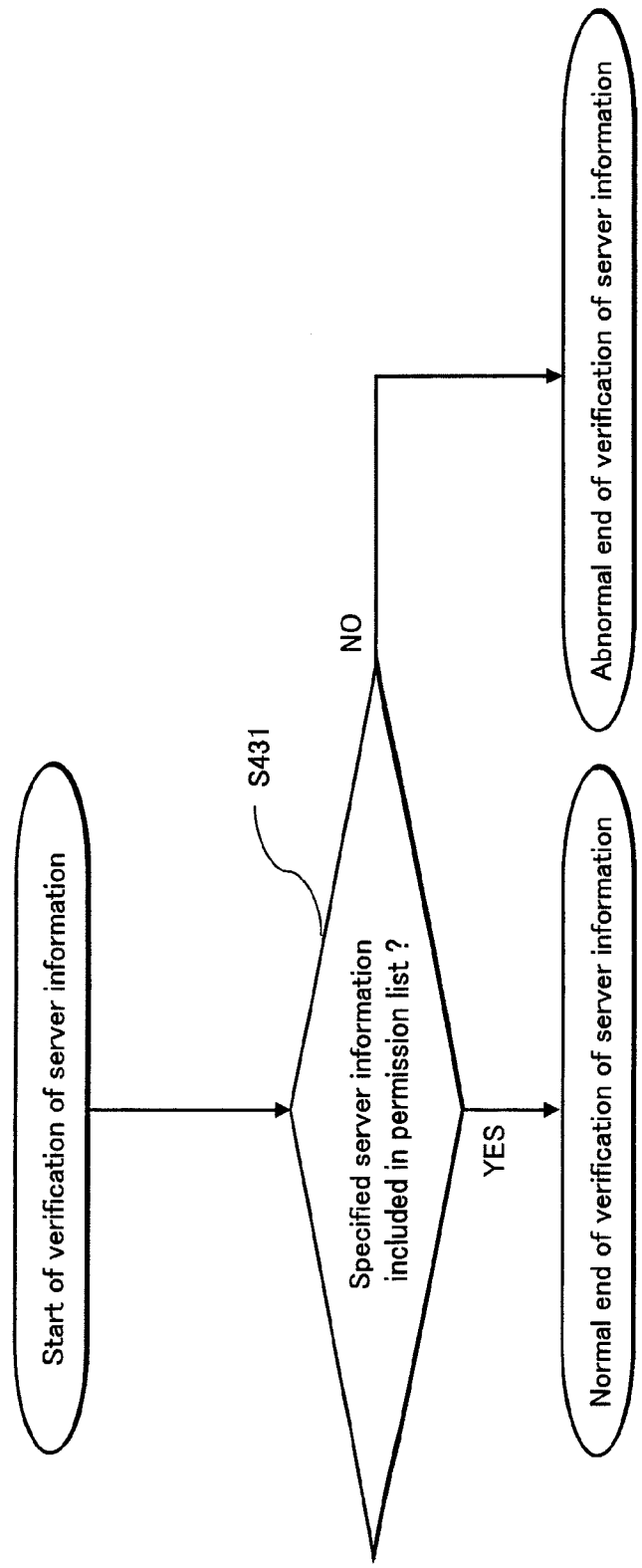
FIG. 20 is a flowchart showing operations for verifying server information.

The following explains the operations for the verification of the server information, with reference to a flowchart shown in FIG. 20. Note that here, the operations for the verification of the server information are details of step S207 in FIG. 9.

The dynamic tampering detection function unit 153 judges whether the specified piece of server information is included in the permission list 133 (S431).

When the specified piece of server information is included in the permission list 133 (S431: YES), the verification of the server information terminates normally, and the server information is verified to be legitimate. When the server information is not included in the permission list 133 (S431: NO), the verification of the server information terminates abnormally, and the server information is verified to be illegitimate. In a case of an abnormal termination, the secure operating system 152 prohibits execution of the application program. The secure operating system 152 may also store, in the nonvolatile storage unit 102, information indicating that the application program is an unauthorized application program, as a log.

Note that the protected data operation unit 155 may store a prohibition list instead of the permission list 133. The prohibition list includes one or more pieces of server information that identify server apparatuses for which a connection is not to be permitted. Note that the prohibition list may not include one or more pieces of server information that identify server apparatuses for which a connection is not to be permitted. In this case, the dynamic tampering detection function unit 153 may perform as follows: the dynamic tampering detection function unit 153 judges whether the specified piece of server information is included in the prohibition list or not, and when the specified piece of server information is judged to be not included, the verification of the server information terminates normally, and when the specified piece of server information is judged to be included, the verification of the server information terminates abnormally.

Alternatively, the verification of the server information may be performed using the permission list 133 and the prohibition list.

Note that the permission list 133 and the prohibition list may have a digital signature attached thereto for detecting tampering. Verification of the digital signature is performed in the protective mode, and a verification key may be a key of a terminal manufacturer.

(17) Operations for Generation and Storage of Key

Figure 21:
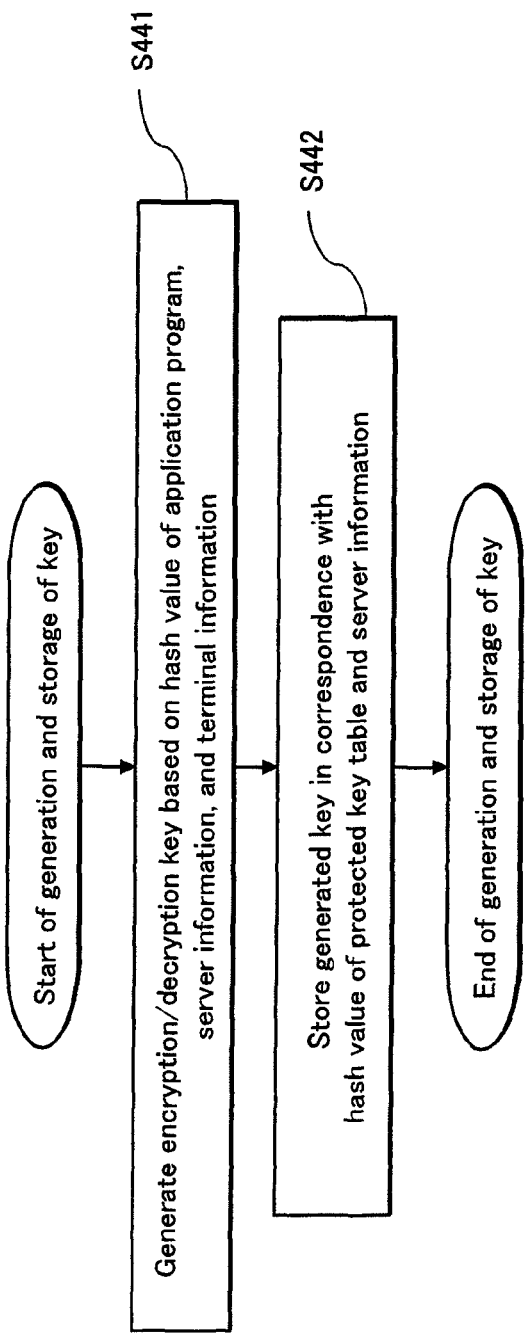
FIG. 21 is a flowchart showing operations for generation and storage of a key.

The following explains the operations for the generation and the storage of the key, with reference to a flowchart shown in FIG. 21.

Note that the operations for the generation and the storage of the key explained in the following are details of step S209 in FIG. 9.

The protected data operation unit 155 generates the encryption/decryption key based on the hash value of the application program, the server information, and terminal information (S441).

Specifically, the protected data operation unit 155 generates the encryption/decryption key using the following equation.

Encryption/decryption key=Hash (hash value+server information+terminal information)

Here, A=Hash (B) indicates that A is obtained by applying a hash function to B; and the operator "+" indicates concatenation. In other words, the hash value, the server information and the terminal information are concatenated in the stated order, and the encryption/decryption key is obtained by applying a hash function to the concatenated data. Here, the hash function is, for example, SHA-1.

The terminal information is identification information for uniquely identifying the information processing apparatus 100 and is stored in the protected data operation unit 155 in advance.

Next, the protected data operation unit 155 stores the generated encryption/decryption key into the piece of key information corresponding to the hash value and the server information in the protected key table 136 (S442). This completes key generation and storage processing.

Note that the key may be generated without using the terminal information in the key generation in step S441.

Specifically, the protected data operation unit 155 generates the encryption/decryption key using the following equation.

Encryption/decryption key=Hash (hash value+server information)

In this case, the encryption/decryption key does not depend on terminal information, and consequently, if encrypted data is moved to another information processing apparatus, this another information processing apparatus is able to generate an encryption/decryption key that does not depend on terminal information, and decrypts encrypted data using the generated encryption/decryption key.

Note that in the key generation in step S411, the generated encryption/decryption key may be stored in a nonvolatile storage unit (not shown) that is accessible only in the protective mode. This enables the key to be retained even in a case where the information processing apparatus is powered OFF.

Alternatively, in the key generation in step S411, the encryption/decryption key may be generated using only the hash value of the application program. As a result, the encryption/decryption key becomes unique to the application program.

Specifically, the encryption/decryption key is generated using the following equation.

Encryption/decryption key=Hash (hash value)

Alternatively, in the key generation in step S411, the encryption/decryption key may be generated using only the server information. As a result, the encryption/decryption key becomes unique to the server.

Specifically, the encryption/decryption key is generated using the following equation.

Encryption/decryption key=Hash (server information)

Alternatively, in the key generation in step S411, the encryption/decryption key may be generated using only the terminal information. As a result, the encryption/decryption key becomes unique to the terminal.

Specifically, the encryption/decryption key is generated using the following equation.

Encryption/decryption key=Hash (terminal information)

Alternatively, in the key generation in step S411, the following process may be performed: a random number is generated using a timer not shown, or the like, and the encryption/decryption key is generated using the generated random number, the hash value of the application program, the server information, and the terminal information. According to this structure, randomness is added to the encryption/decryption key, rendering it more difficult to estimate the value of the key.

Specifically, the encryption/decryption key is generated using the following equation.

Encryption/decryption key=Hash (random number+ hash value+server information+terminal information)

With this structure, when one application program transmits data to multiple server apparatuses, multiple encryption keys can be generated according to the multiple server apparatuses for the one application program.

(18) Operations for Verifying Data Encryption/Decryption Function Unit 160

Figure 22:
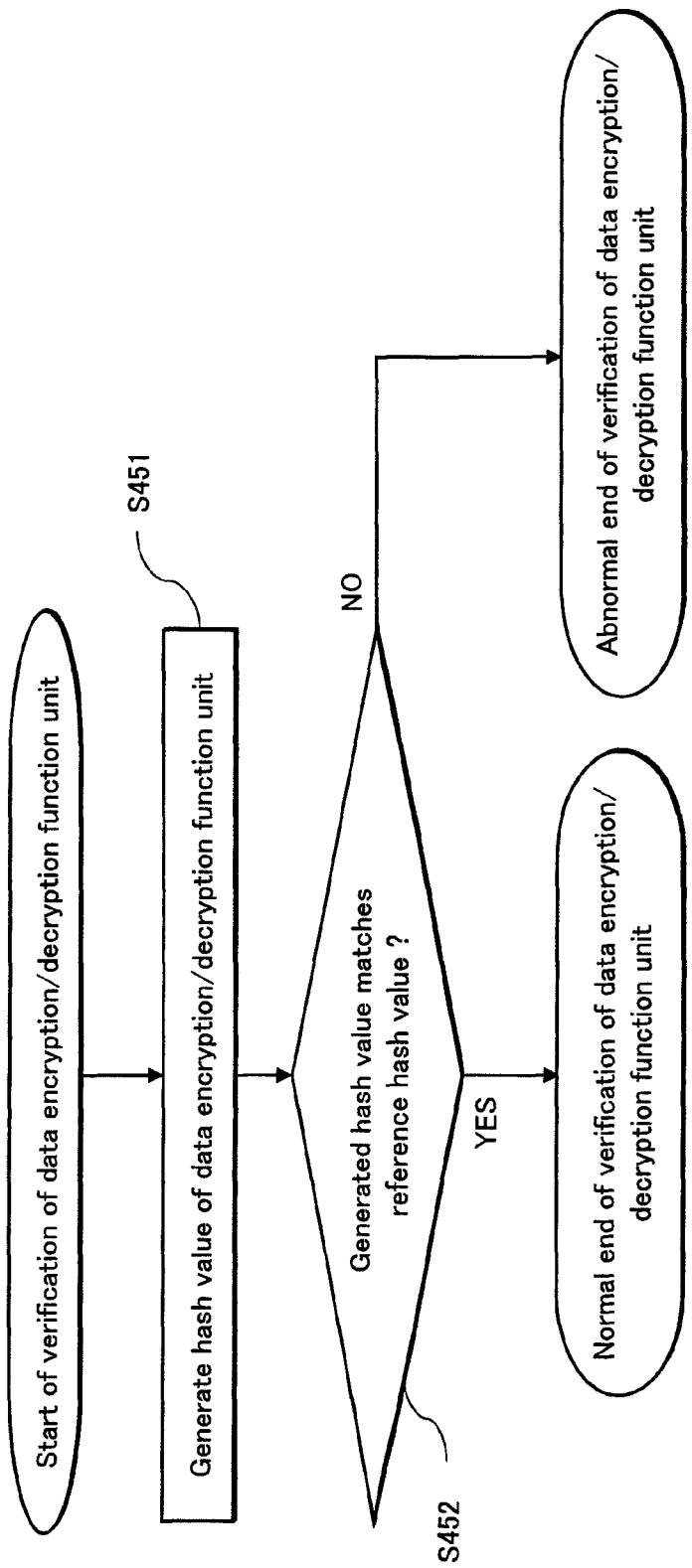
FIG. 22 is a flowchart showing operations for verifying a data encryption/decryption function unit.

The following explains the operations for verifying the data encryption/decryption function unit 160, with reference to a flowchart shown in FIG. 22. Note that the operations for verifying the data encryption/decryption function unit 160 explained here are details of step S211 in FIG. 9, step S229 in FIG. 10, step S260 in FIG. 12, and step S289 in FIG. 15.

The dynamic tampering detection function unit 153 generates a hash value for an execution image of the data encryption/decryption function unit 160 in the memory unit 103, using a one-way function such as SHA-1 (S451).

The dynamic tampering detection function unit 153 judges whether the generated hash value matches the reference hash value pre-stored in the normal key table 128 of the data encryption/decryption function unit 160 (S452).

When the generated hash value matches (S452: YES), the verification of the data encryption/decryption function unit 160 terminates normally, and the data encryption/decryption function unit 160 is judged to be legitimate.

On the other hand, when the generated hash value does not match (S452: NO), the verification of the data encryption/decryption function unit 160 terminates abnormally, and the data encryption/decryption function unit 160 is judged to be illegitimate. In a case of an abnormal termination, the information processing apparatus 100 stops operating. The secure operating system 152 stops encryption/decryption of data. Additionally, information indicating that the data encryption/decryption function unit 160 has been tampered may be stored as a log in the nonvolatile storage apparatus. Furthermore, when the normal key table 128 of the data encryption/decryption function unit 160 retains keys, these keys are deleted.

Note that a one-way function other than SHA-1 can be used for the generation of the hash value. For example, MD5, SHA-256, AES, and DES may be used.

(19) Operations for Mode Switch B

Figure 23:
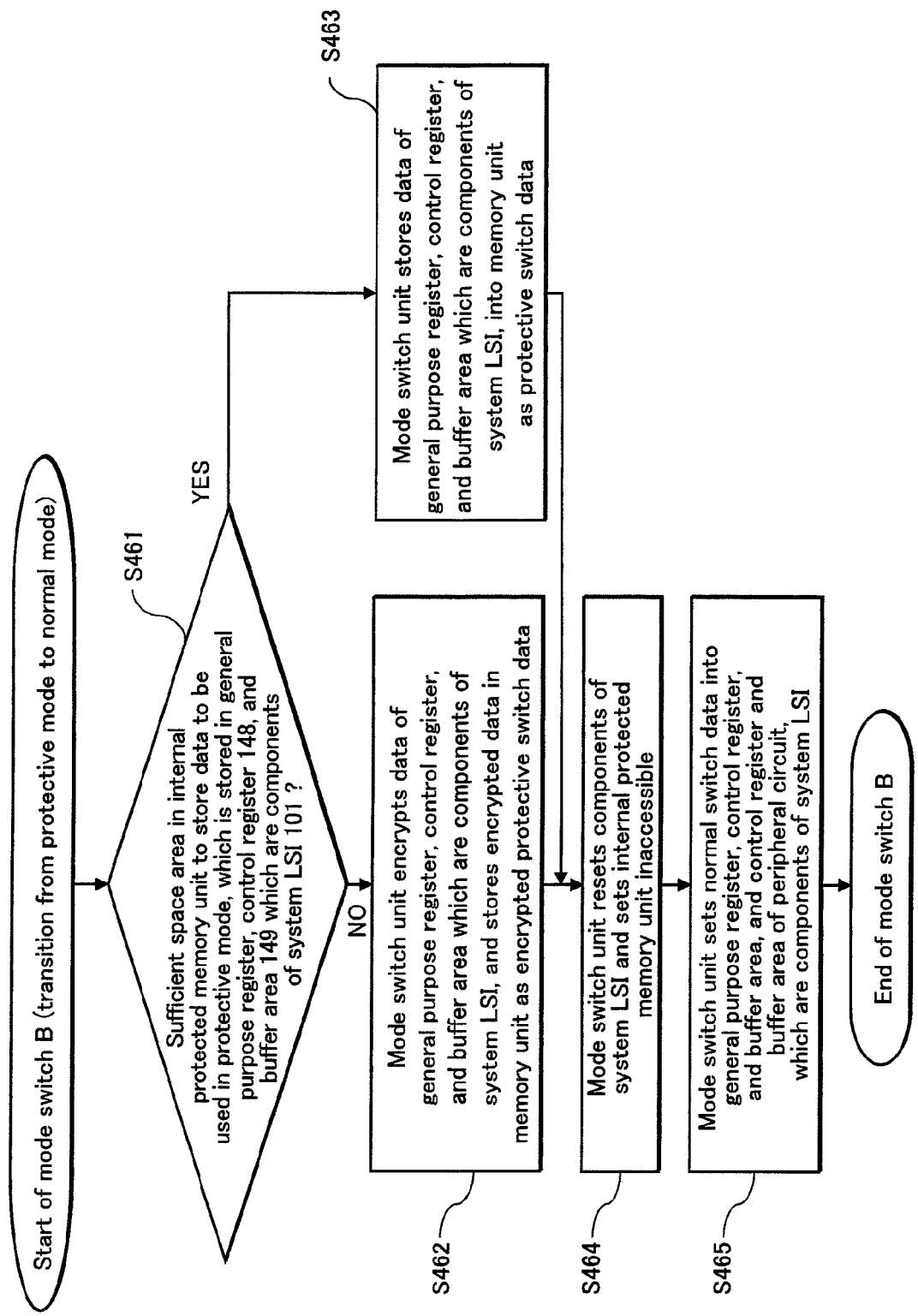
FIG. 23 is a flowchart showing operations of a mode switch B which transits from the protective mode to the normal mode.

The following explains the operations for the mode switch B that switches from the protective mode to the normal mode, with reference to a flowchart shown in FIG. 23. Note that the operations for the mode switch B explained here are details of step S213 in FIG. 9, step S231 in FIG. 10, step S262 in FIG. 12, and step S291 in FIG. 15.

The mode switch unit 143 judges whether there is a sufficient space area in the internal protected memory unit 144 to store the data stored in the general purpose register 147, the control register 148, and the buffer area 149 of the CPU 141 of the system LSI 101, and the data stored in the control register 150 and the buffer area 151 of the peripheral circuit 142 of the system LSI 101 (S461).

When there is not a sufficient space area (S461: NO), the mode switch unit 143 encrypts the data stored in the general purpose register 147, the control register 148, and the buffer area 149 of the CPU 141 of the system LSI 101, and the data stored in the control register 150 and the buffer area 151 of the peripheral circuit 142 of the system LSI 101, and stores the encrypted data as encrypted protective switch data 161 into the memory unit 103 (S462).

Next, the mode switch unit 143 resets the components of the system LSI 101 and sets the internal protected memory unit 144 to be inaccessible (S464).

Next, the mode switch unit 143 sets the contents of the normal switch data 162 stored in the memory unit 103 into the general purpose register 147, the control register 148, and the buffer area 149 of the CPU 141 of the system LSI 101, and the control register 150 and the buffer area 151 of the peripheral circuit 142 of the system LSI 101 (S465). This completes the operations for the mode switch B.

When there is a sufficient space area (S461: YES), the mode switch unit 143 stores the following data as the protective switch data 156 into the internal protected memory unit 144: the data stored in the general purpose register 147, the control register 148, and the buffer area 149 of the CPU 141 of the system LSI 101; and the data stored in the control register 150 and the buffer area 151 of the peripheral circuit 142 of the system LSI 101 (S463). Next, the control goes to step S464.

Figure 24:
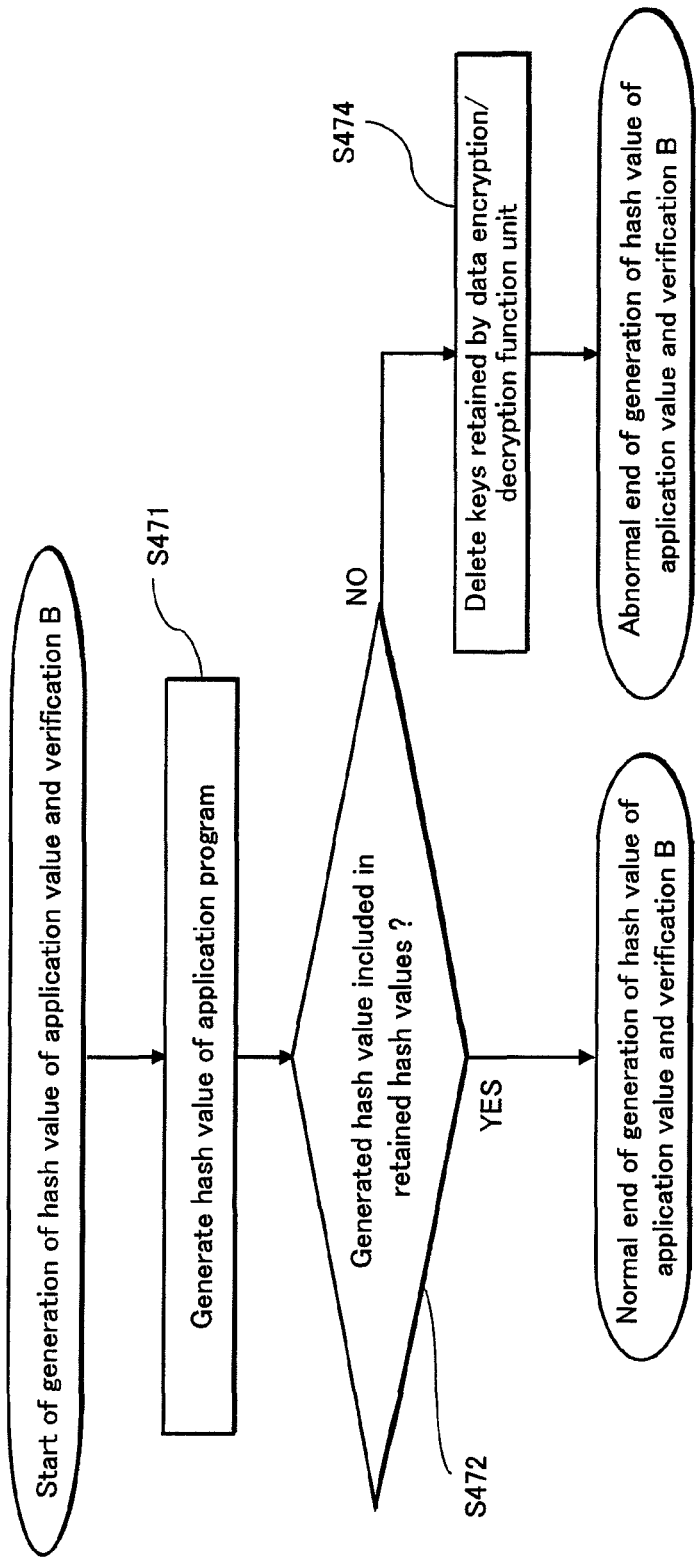
FIG. 24 is a flowchart showing operations for generation of a hash value of the application program and verification B.

(20) Operations for Generation of Hash Value of Application Program and Verification B The following explains the operations for the generation of a hash value of the application program and the verification B, with reference to a flowchart shown in FIG. 24. Note that the generation of the hash value and the verification B are details of step S224 in FIG. 10, step S241 in FIG. 11, step S251 in FIG. 12, step S256 in FIG. 12, step S271 in FIG. 13, and step S284 in FIG. 15.

The tampering detection unit 155x, of the protected data operation unit 155 (or the tampering detection unit 127x of the data encryption/decryption function unit 160) generates a hash value for an execution image of the application program stored in the memory unit 103, using a one-way hash function such as SHA-1 (S471).

Next, the tampering detection unit 155x of the protected data operation unit 155 (or the tampering detection unit 127x of the data encryption/decryption function unit 160) judges whether the generated hash value is included in the hash values retained in the protected key table 136 (or the normal key table 128 of the data encryption/decryption function unit 160) (S472).

When the generated hash value is included (S472: YES), the verification B terminates normally, and the application program is verified to be legitimate.

On the other hand, when the generated hash value is not included (S472: NO), the protected data operation unit 155 (or the data encryption/decryption function unit 160) deletes the keys retained by the data encryption/decryption function unit 160, the verification B terminates abnormally, and the application program is verified to be illegitimate. In a case of an abnormal termination, the secure operating system 152 prohibits execution of the application program. Additionally, information indicating that the application program is an unauthorized application program may be stored in the nonvolatile storage unit 102 as a log.

Note that a one-way function other than SHA-1 can be used for the generation of the hash value. For example, MD5, SHA-256, AES, or DES may be used.

(21) Operations for Verification of Other Applications

Figure 25:
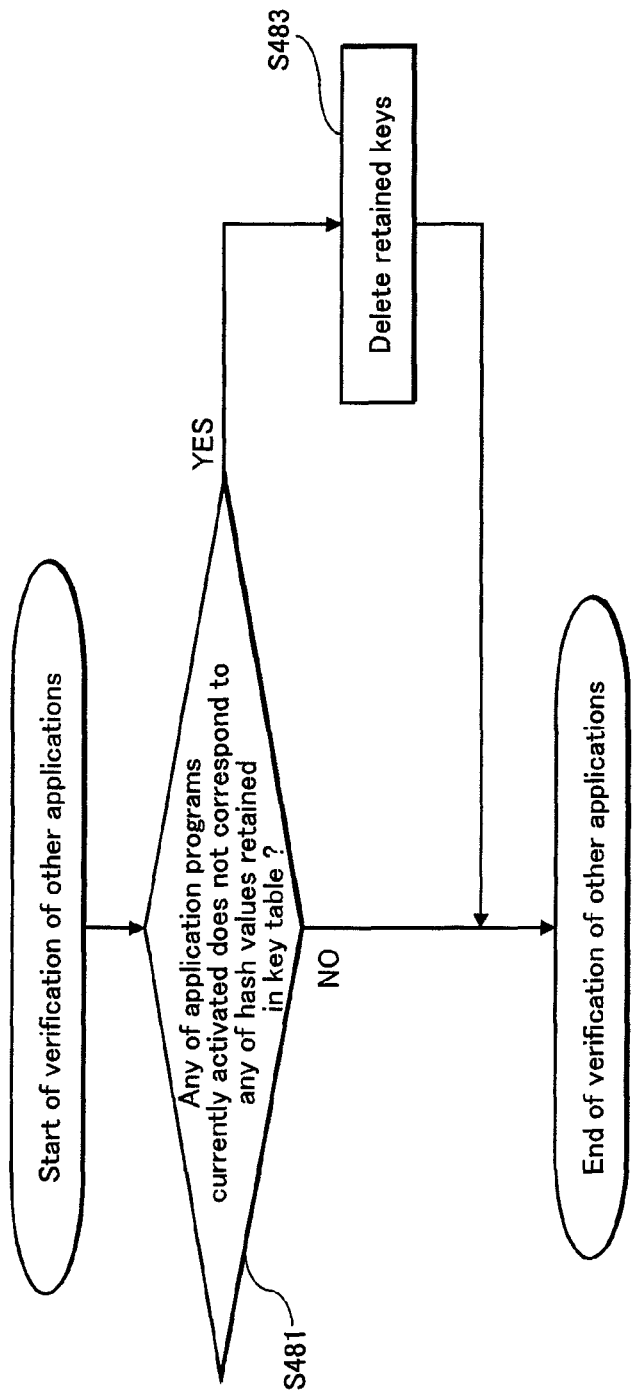
FIG. 25 is a flowchart showing operations for verifying another application program.

The following explains the operations for verification of other application programs, with reference to a flowchart shown in FIG. 25. Note that the operations for the verification of other programs explained here are details of step S225 in FIG. 10, step S242 in FIG. 11, step S252 in FIG. 12, and step S285 in FIG. 15.

The tampering detection unit 155x of the protected data operation unit 155 (or the tampering detection unit 127x of the data encryption/decryption function unit 160) checks whether there is any application program among the application programs being activated that does not correspond with any of the hash values retained by the protected key table 136 (or the normal key table 128) (S481). Note that the load function unit 129 retains hash values of the applications program which the load function unit 129 has loaded, and this check is performed by comparing the hash values retained by the load function unit 129 and the hash values obtained by applying a hash function to the application programs being activated.

When no other program exists (S481: NO), the operations for the verification of other application programs terminate normally.

On the other hand, when an other program exists (S481: YES), the protected data operation unit 155 (or the data encryption/decryption function unit 160) deletes the keys retained in the protected key table 136 (or the normal key table 128) (S483), and the operations for the verification of the other application programs terminate.

(22) Operations for Key Confirmation A

Figure 26:
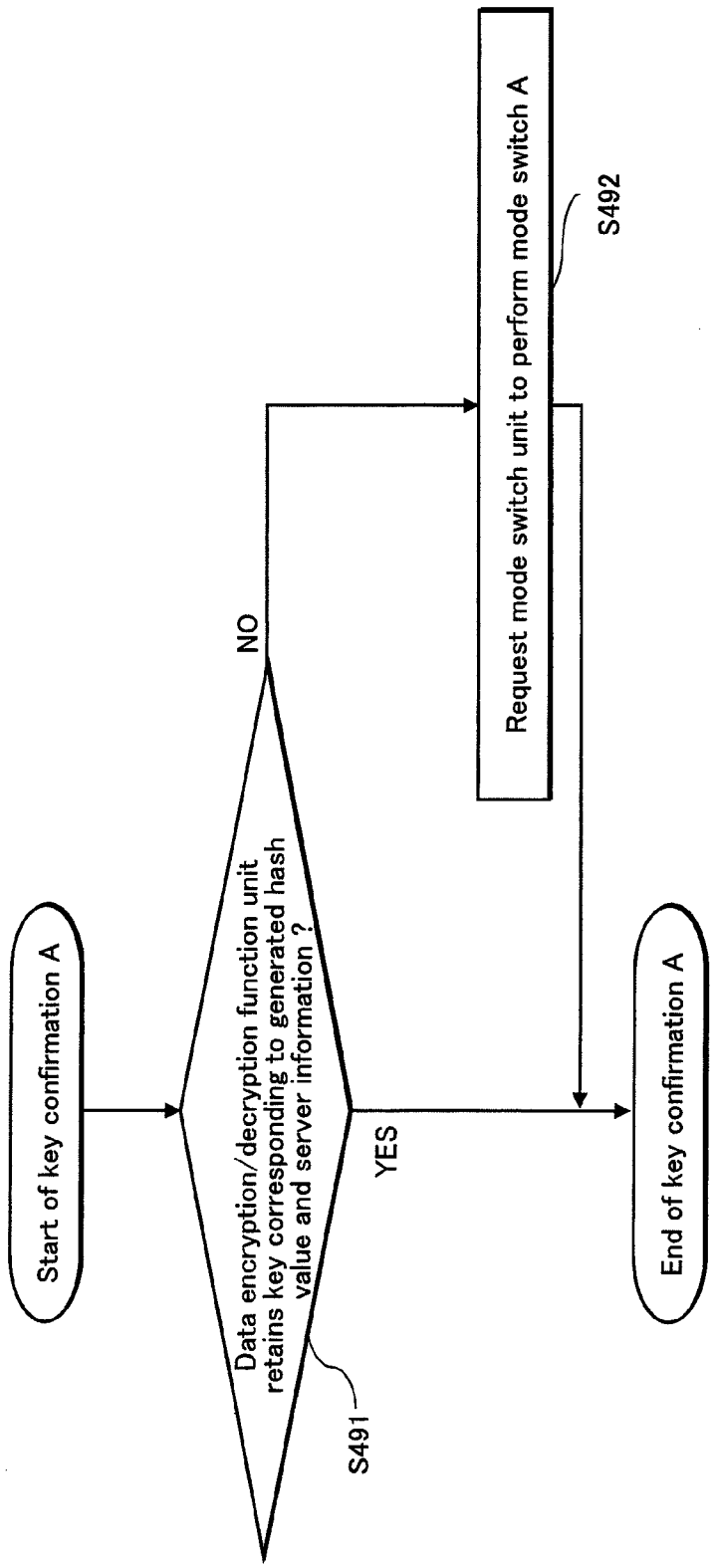
FIG. 26 is a flowchart showing operations of key confirmation A.

The following explains the operations for the key confirmation A, with reference to a flowchart shown in FIG. 26. Note that the operations for the key confirmation A explained here are details of step S221 in FIG. 10, step S243 in FIG. 11, step S253 in FIG. 12, and step S281 in FIG. 15.

The data encryption/decryption function unit 160 confirms whether the normal key table 128 retains the key that corresponds to the piece of server information (S491). When the normal key table 128 retains the corresponding key, (S491: YES), the operations for the key confirmation A terminate.

On the other hand, when the normal key table 128 does not retain the corresponding key (S491: NO), the data encryption/decryption function unit 160 requests the mode switch unit 143 to perform mode-switching, acquires a key from the protective mode, requests the mode switch unit 143 to perform mode-switching again, which results in the mode being switched to the normal mode (S492). This completes the operations for the key confirmation A.

(23) Operations for Key Confirmation B

Figure 27:
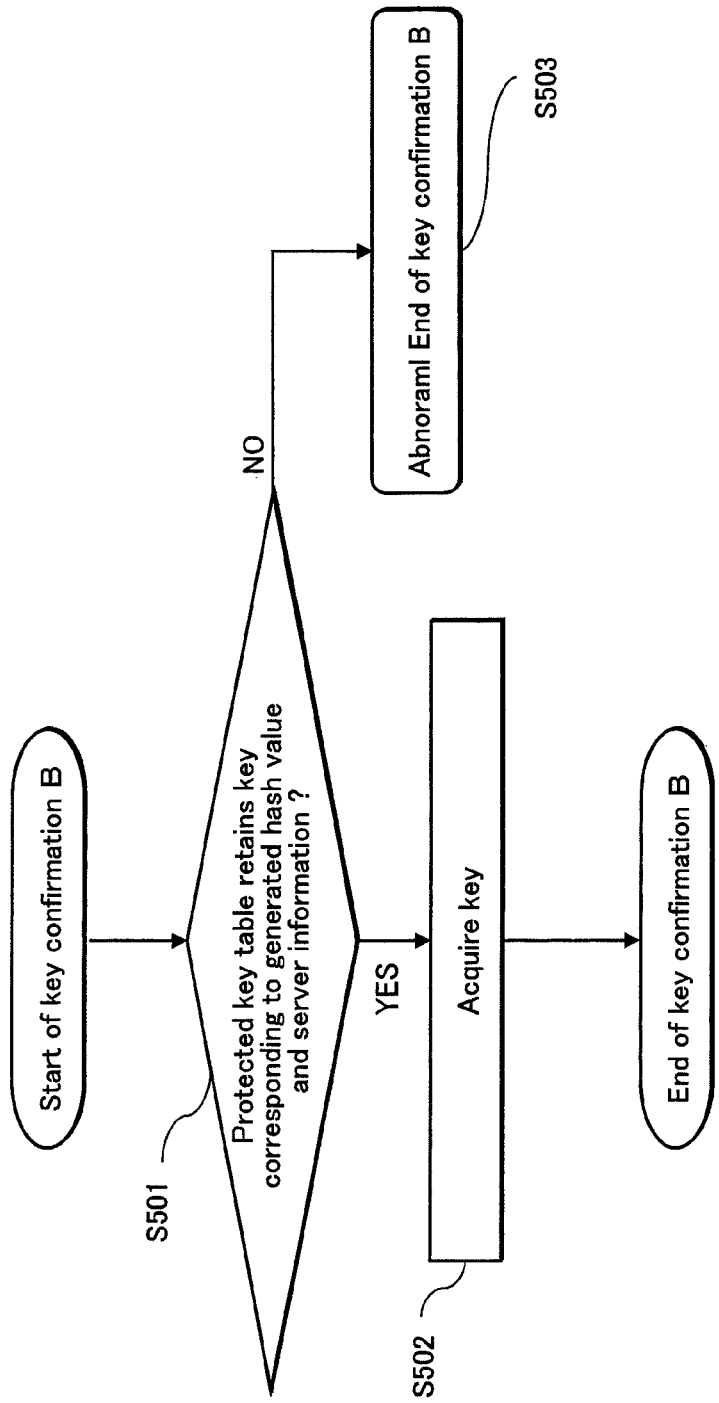
FIG. 27 is a flowchart showing operations of key confirmation B.

The following explains the operations for the key confirmation B, with reference to a flowchart shown in FIG. 27. Note that the operations for the key confirmation B explained here are details of step S226 in FIG. 10, step S257 in FIG. 12, and step S286 in FIG. 15.

The protected data operation unit 155 checks whether the protected key table 136 retains the key corresponding to the hash value and the piece of server information (S501).

When the protected key table 136 retains the corresponding key (S501: YES), the protected data operation unit 155 acquires the corresponding key from the protected key table 136 (S502), and the operations for the key confirmation B terminate normally.

On the other hand, when the protected key table 136 does not retain the corresponding keys (S501: NO), the key confirmation B terminates abnormally. In a case of abnormal termination, the secure operating system 152 prohibits execution of the application program. Additionally, information indicating the application program is an unauthorized application program may be stored in the nonvolatile storage unit 102 as a log.

Note that instead of the information indicating an unauthorized application program, a flag indicating an unauthorized application program can be stored in the nonvolatile storage unit 102. Alternatively, the information indicating an unauthorized application program may be a hash value generated from the application program.

Note that safe boot may be performed using the log indicating an unauthorized application program.

(24) Operations for Storing Key

Figure 28:
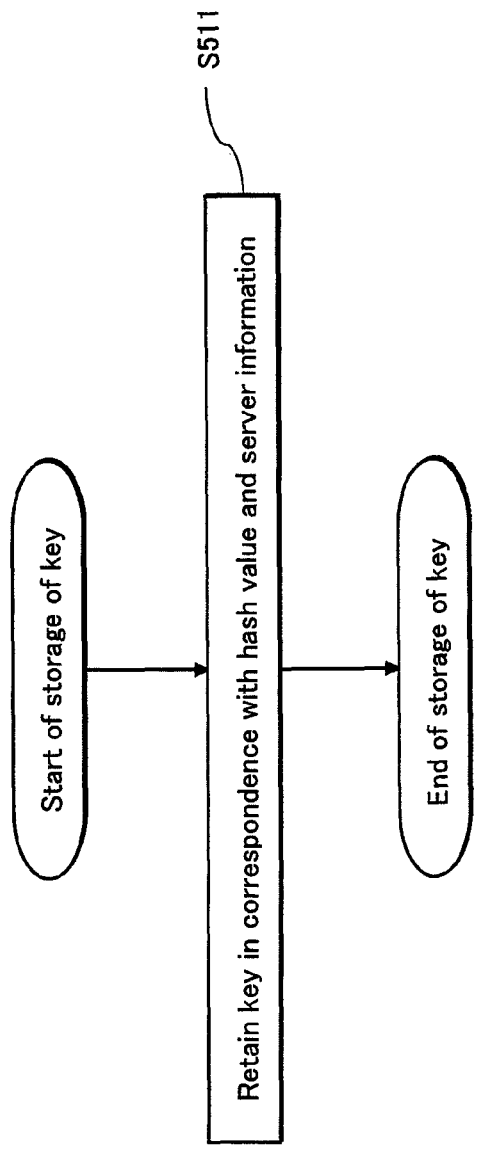
FIG. 28 is a flowchart showing operations of storage of a key.

The following explains the operations for storing a key, with reference to a flowchart shown in FIG. 28. Note that the operations for storing the key explained here are details of step S232 in FIG. 1 and step S292 in FIG. 15.

The data encryption/decryption function unit 160 stores the key, in correspondence with the hash value and the piece of server information into the normal key table 128 (S511). This completes the operations for storing the key.

1.5 Conclusion

According to the present embodiment, an encryption key is stored into the internal protected memory unit 144 which is access-restricted, and when the data encryption/decryption function unit 160 performs encryption processing using the encryption key for the first time, the mode is switched to acquire the encryption key from the internal protected memory unit 144. After that, the encryption key is copied into the memory unit 103 which is accessible, and the encryption key copied into the memory unit 103 is used in the normal mode. As is apparent from the above, the normal mode is not switched to the protective mode.

With this structure, it is not necessary to switch the mode each time encryption processing is performed, which significantly reduces complex encryption processing required when managing the encryption key secretly.

Meanwhile, the key generation unit of the protected operation unit 135 generates the encryption key based on the hash value of a predetermined application program, stores the generated encryption key into the internal protected memory unit 144, and stores the hash value used for generating the encryption key into the memory unit 103; and the data encryption/decryption function unit 160, upon receiving a request to encrypt predetermined data stored in the memory unit 103, calculates the hash value of the application program, and if the calculated hash value does not match the hash value stored in the memory unit 103, deletes the encryption key copied in the memory unit 103.

With this structure, when there is a risk that an application program other than the application program corresponding to the hash value used for generating the encryption key uses the encryption key stored in the memory unit 103, which is freely accessible from the data encryption/decryption function unit 160, the encryption key stored in the memory unit 103 is deleted. Consequently, secrecy of the encryption key is secured, and confidentiality of the data is ensured.

Thus, complex encryption processing required when secretly managing the encryption key is significantly reduced while secrecy of the encryption key is secured and confidentiality of the data is ensured.

2. Second Embodiment

The following explains an information processing apparatus 100b (not shown) as another embodiment pertaining to the present invention. The information processing apparatus 100b has a similar structure as the information processing apparatus 100.

In the following, explanation is mainly made on differences from the information processing apparatus 100.

Figure 29:
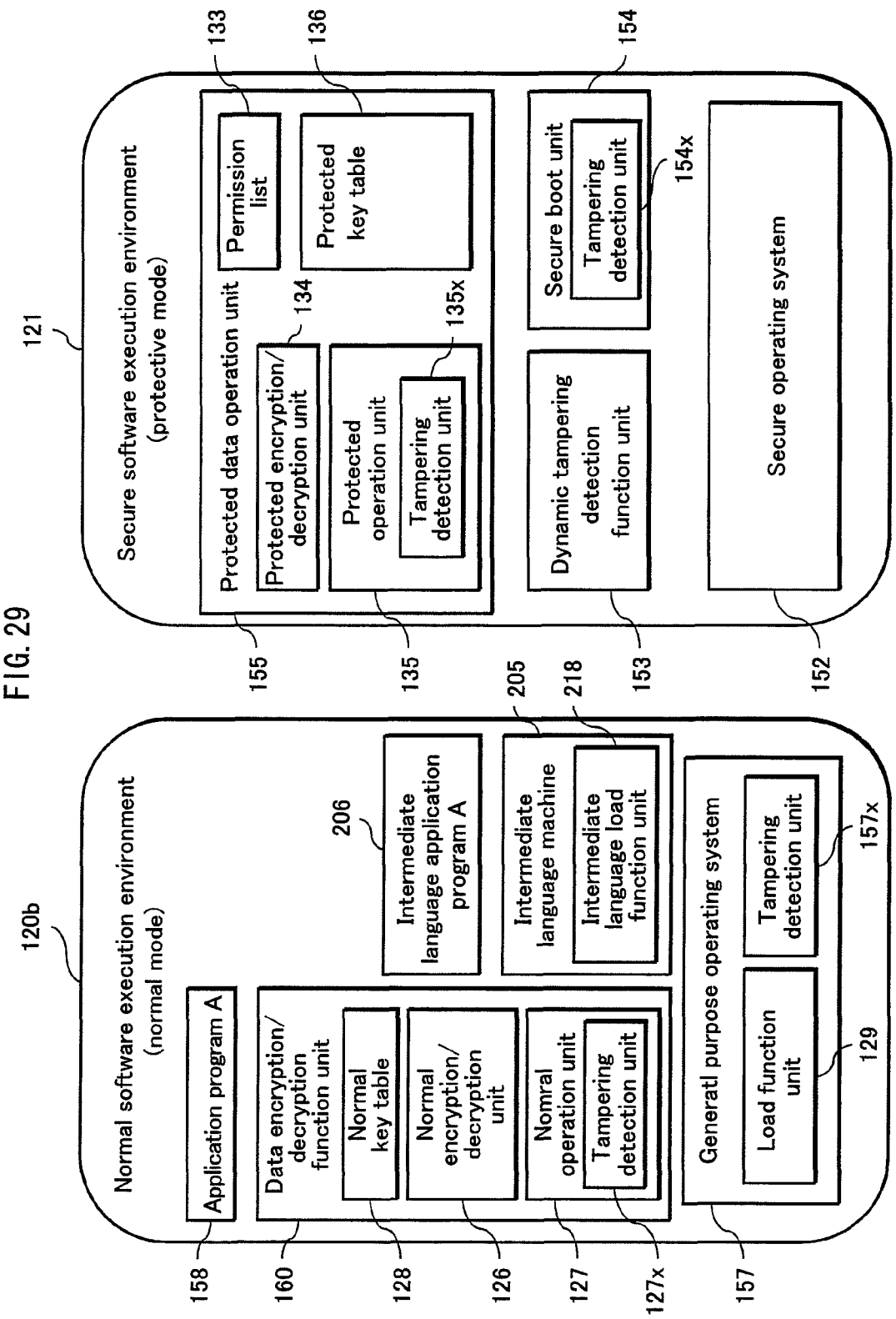
FIG. 29 shows a software structure of an information processing apparatus 100b of a second embodiment.

FIG. 29 shows the software structure of the information processing apparatus 100b.

The information processing apparatus 100b includes a software execution environment 120b which is the normal mode, and a secure software execution environment 121 which is the protective mode. As with the information processing apparatus 100, the information processing apparatus 100b switches between the normal mode and the protective mode during execution of each software.

Unlike the information processing apparatus 100, the information processing apparatus 100b also controls intermediate language application programs that control a virtual machine. Being used for controlling the virtual machine, intermediate language application programs in general are considered not to perform encryption/decryption of data managed by the application program. Accordingly, the information processing apparatus 100b refuses all requests from an intermediate language application program to perform encryption/decryption. Also, when the source of the request for encryption/decryption is found out to be an intermediate language application program, the generation of the hash value and the verification will not be performed. Consequently, the number of hash values to be retained can be reduced.

The execution environment 121 of the information processing apparatus 100b, is identical to the execution environment 121 in the first embodiment.

On the other hand, the execution environment 120b of the information processing apparatus 100b further includes an intermediate language machine 205 and an intermediate language application program 206, in addition to the components of the execution environment 120 in the first embodiment. As described above, in the information processing apparatus 100b application programs that operate on the general purpose operating system 157 perform encryption/decryption of data, and intermediate language application programs do not perform encryption/decryption of data.

The intermediate language machine 205 includes an intermediate language load function unit 218.

The intermediate language machine 205 is a virtual machine that operates according to instructions from the intermediate language application program 206.

The intermediate language load function unit 218 has a function to load the intermediate language application program 206.

The intermediate language application program 206 is an application program described using a program language that causes the virtual machine to operate.

In the second embodiment, the generation of the hash value of the application program and the verification A (S206 in FIG. 9) and the generation of the hash value of the application program and the verification B (S224 in FIG. 10, steps S251 and S256 in FIG. 12, and S271 in FIG. 13) in the first embodiment terminate abnormally when the request is output from the intermediate language machine 205 using the intermediate language application program 271.

Note that the methods for verifying and judging the application program in the generation of the hash value of the application program and the verification A, and the generation of the hash value of the application program the verification B are the same as those in the first embodiment.

By judging the intermediate language application program 206 and the application program (native language application program) 158 separately, as described above, the number of hash values to be retained can be reduced. Also, in a case of an intermediate language application program, the generation of the hash value and the verification fail. Accordingly, encryption/decryption of data requested by the intermediate language application program will not be performed.

Note that the structure of the second embodiment is the same as the structure of the first embodiment except for the intermediate language machine 205 and the intermediate language application program 206.

3. Third Embodiment

The following describes an information processing apparatus 100c (not shown) as another embodiment pertaining to the present invention. The information processing apparatus 100c has a similar structure as the information processing apparatus 100.

In the following, explanation is mainly made on differences from the information processing apparatus 100.

Figure 30:
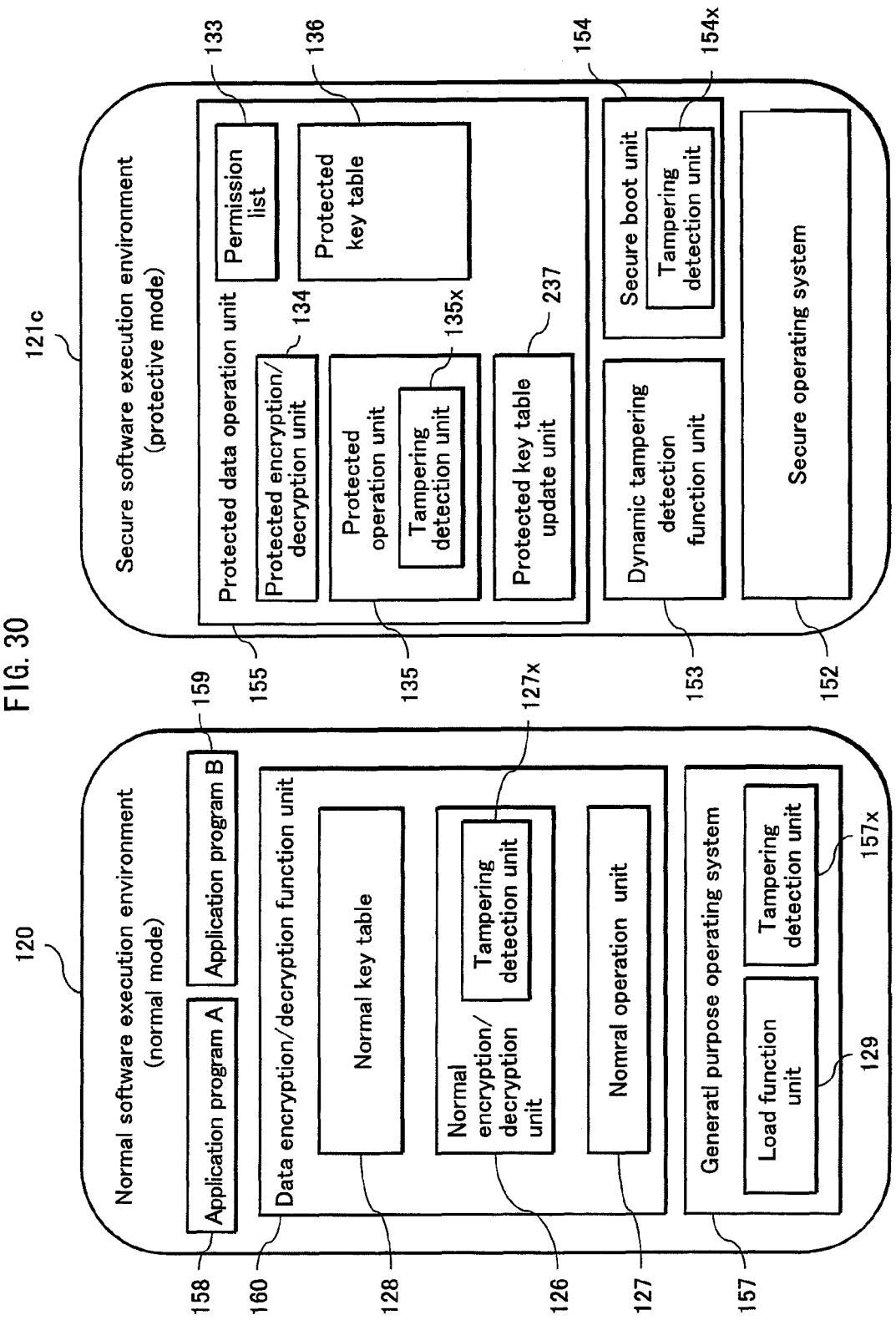
FIG. 30 shows a software structure of an information processing apparatus 100c of a third embodiment.

FIG. 30 shows the software structure of the information processing apparatus 100c.

The information processing apparatus 100c includes a software execution environment 120c which is the normal mode, and a secure software execution environment 121c which is the protective mode. As with the information processing apparatus 100, the information processing apparatus 100c switches between the normal mode and the protective mode during execution of each software.

The information processing apparatus 100c is an information processing apparatus that is able to add an application performing data encryption/decryption. The execution environment 121c of the information processing apparatus 100c has a similar structure as the execution environment 121 of the first embodiment, and the protected data operation unit 155 further includes a protected key table update unit 237.

The information processing apparatus 100c adds a new application program managed by the protected key table 136.

Described next is a method for adding an application program managed by the protected key table 136, using FIGS. 31-34.

(1) Operation Process for Registering Application Program

Figure 31:
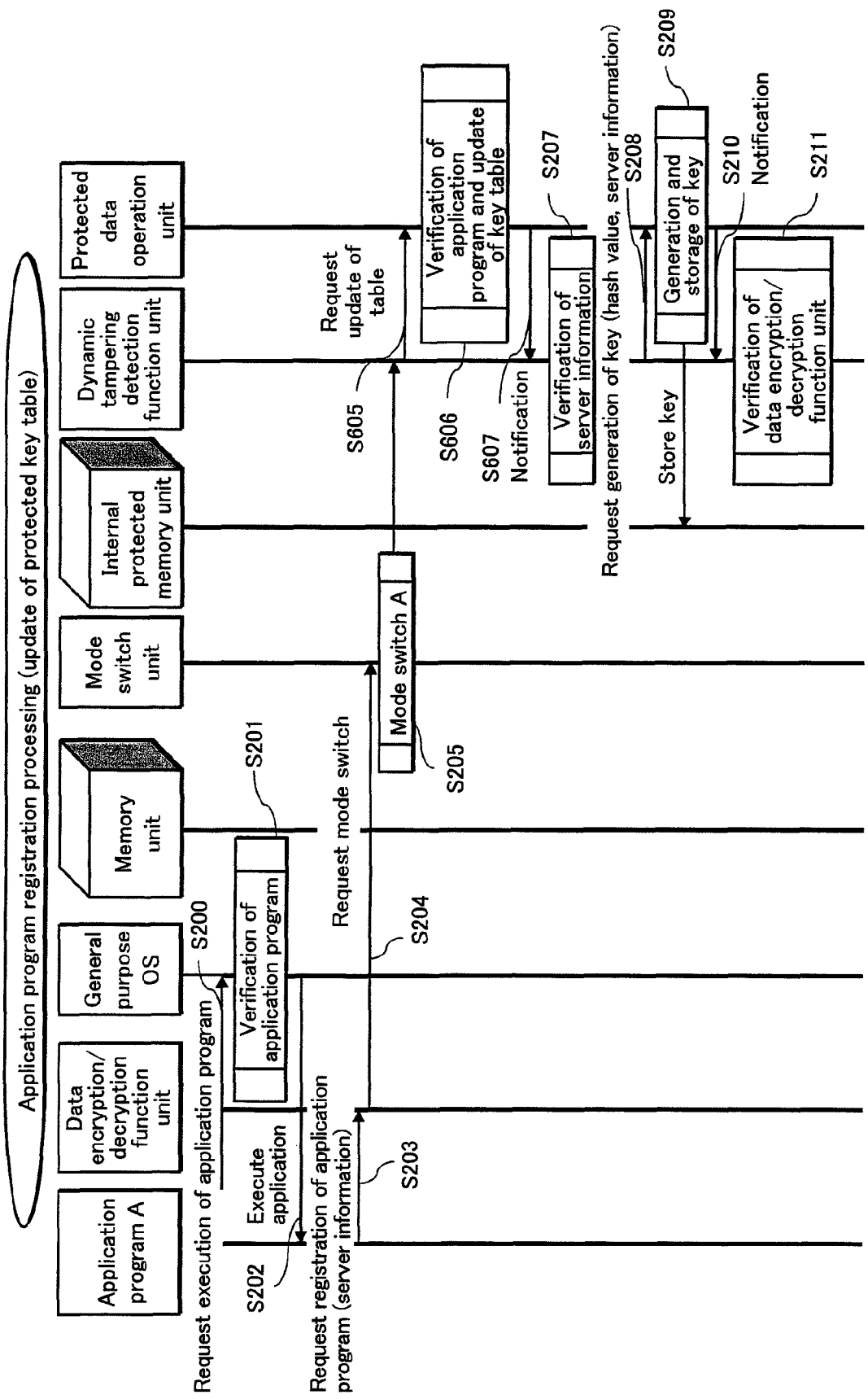
FIG. 31 is a sequence diagram showing operations for registering an application program in the third embodiment (continued to FIG. 32)
Figure 32:
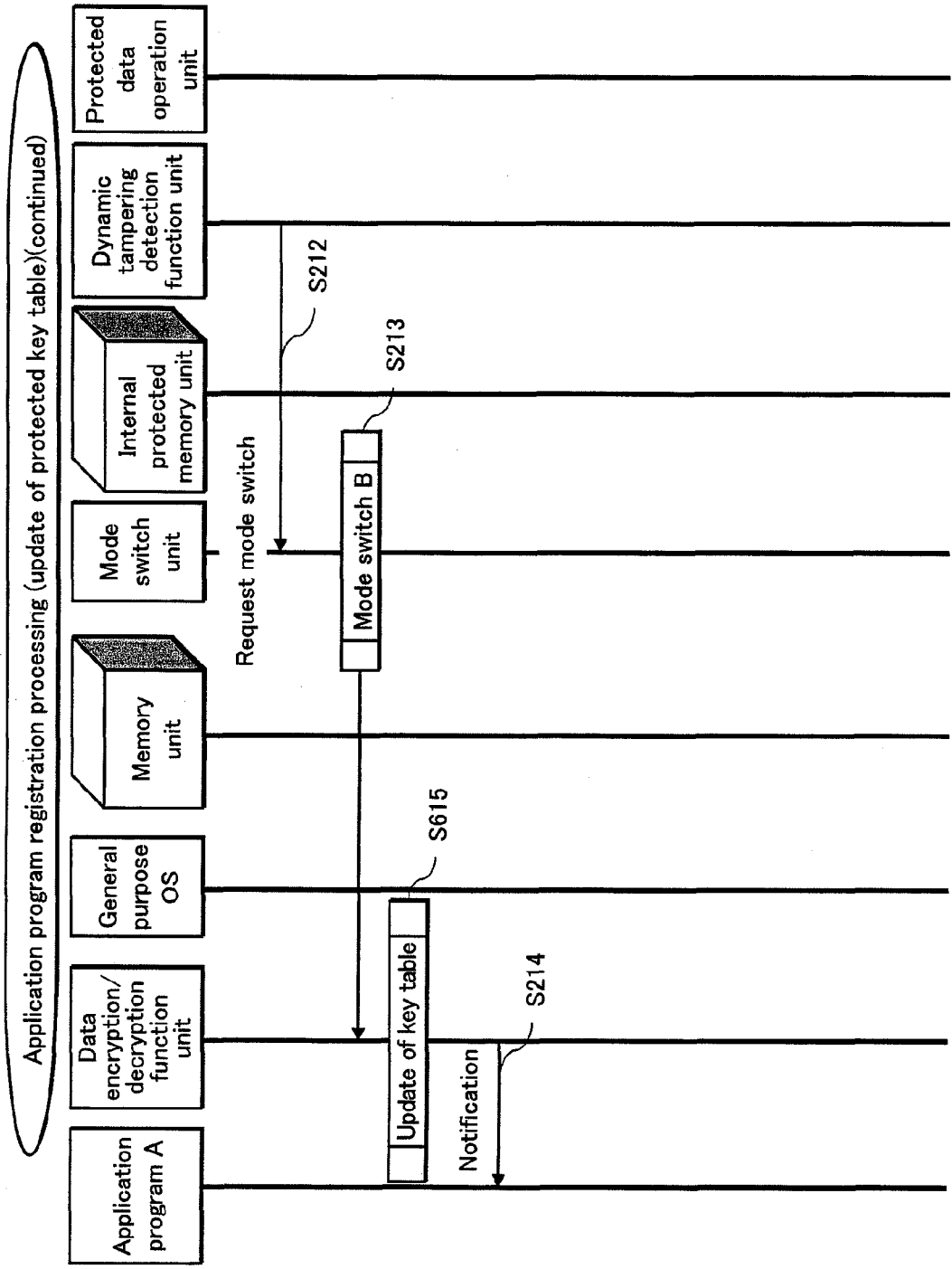
FIG. 32 is a sequence diagram showing operations for registering the application program in the third embodiment (continued from FIG. 31)

The following explains an operation process for registering the application program, with reference to FIG. 31 and FIG. 32.

The operation process for registering the application program in the third embodiment is similar to the operation process shown in FIG. 9 in the first embodiment. In the following, explanation is mainly given on the differences.

The operation process for registering the application program in the third embodiment differs from that in the first embodiment in two aspects.

One of the difference is that instead of the generation of the hash value of the application program and the verification A performed in the first embodiment (S206 in FIG. 9), the following are performed in the registration of the application program in third embodiment, as shown in FIG. 31: a table update request (S605); verification of the application program and update of a key table (S606); and notification (S607).

The other difference is that in the registration of the application program in the third embodiment, as shown in FIG. 32, the data encryption/decryption function unit 160 performs the key table update (S615) after the mode switch B (S213).

Other aspects are the same as those of the first embodiment shown in FIG. 9.

(2) Operations for Verification of Application Program and Update of Key Table

Figure 33:
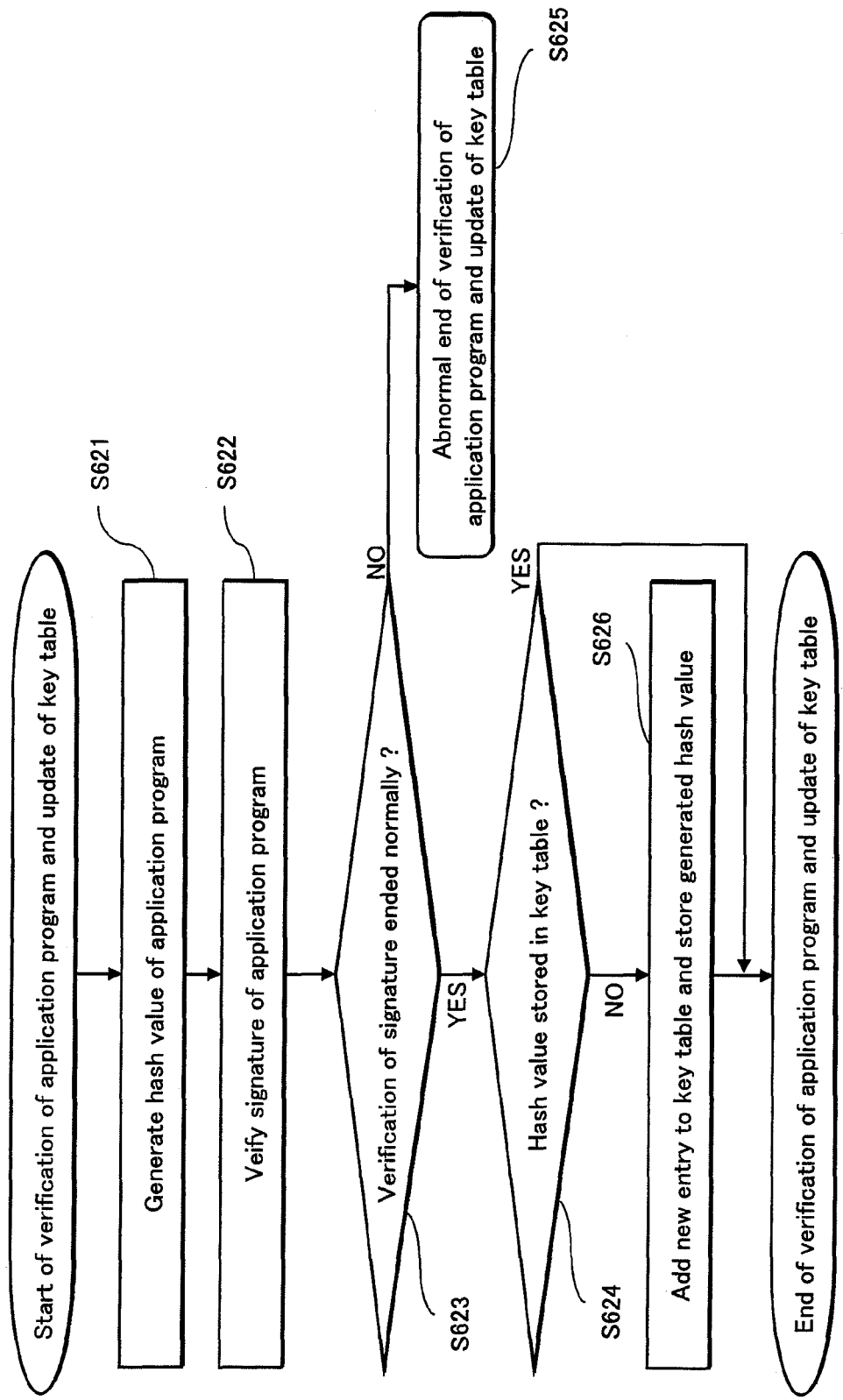
FIG. 33 is a flowchart showing operations for verification of the application program and update of the key table in the third embodiment.

The following explains the operations for verification of the application program and the update of the key table, with reference to a flowchart shown in FIG. 33. Note that the operations for the verification of the application program and the update of the key table explained here are details of step S606 in FIG. 31.

The protected key table update unit 237 generates a hash value of the application program (S621).

Next, the protected key table update unit 237 verifies a digital signature corresponding to the application program (S622). A verification key used for verifying the digital signature is retained by the protected key table update unit 237 and provided by the manufacturer of the information processing apparatus 100c. The algorithm used for verifying the digital signature is a verification algorithm for digital signatures using an RSA algorithm, an elliptic curve cryptosystem, or the like.

When the verification terminates normally (S623: YES), the protected key table update unit 237 judges whether the hash value generated in step S621 matches a hash value stored in the protected key table 136 (S624).

When the hash value generated in step S621 matches (S624: YES), the verification of the application program and the update of the key table terminate.

When the hash value generated in step S621 does not match (S624: NO), a piece of key information is created as a new entry in the protected key table 136, stores the hash value generated in step S621 into the reference hash value field of the application program of the new piece of key information (S626), and the verification of the application program and the update of the key table terminate.

Furthermore, in a case where the piece of key information is added to the protected key table 136 as a new entry and the generated hash value is stored in this piece of key information, the generated hash value is notified in the notification in step S210, in the mode switch request in step S212, and in the mode switch B in step S213.

(3) Operations for Updating Normal Key Table 128

Figure 34:
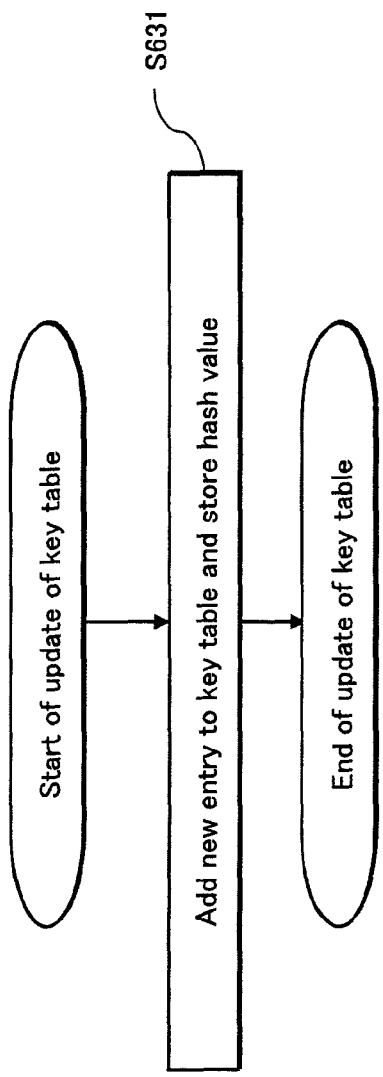
FIG. 34 is a flowchart showing operations for update of the key table in the third embodiment.

The following explains the operations for updating the normal key table 128, with reference to a flowchart shown in FIG. 34. Note that the operations for updating the normal key table 128 explained here are details of step S615 in FIG. 32.

The data encryption/decryption function unit 160 adds a new piece of key information as a new entry to the normal key table 128 and stores, in the new piece of key information, the hash value notified from the protective mode (S631). This completes the operations for updating the normal key table 128.

By adding an application program managed by the normal key table 128 as described above, data of the added new application program can be protected.

Note that the key used for verifying the application program in step S622 may be a key other than the key provided by the manufacturer of the information processing apparatus 100c. A key other than the key provided by the manufacturer of the information processing apparatus 100c may be, for example, a key provided by a service firm which administers the server, or a key provided by a content company which provides the contents.

4. Fourth Embodiment

The following explains an information processing apparatus 100b (not shown) as another embodiment pertaining to the present invention. The information processing apparatus 100d has a similar structure as the information processing apparatus 100.

In the following, explanation is mainly made on differences from the information processing apparatus 100.

The information processing apparatus 100d controls the number of times the key is used for data encryption/decryption. The following explains a technique to control, with use of the information processing apparatus 100d the number of times the key is used, with reference to FIG. 35 and FIG. 36.

(1) Data Structure of Normal Key Table 128d

The protected data operation unit 155 of the information processing apparatus 100d stores a protected key table 136d (not shown) instead of the protected key table 136 of the information processing apparatus 100. The data encryption/decryption function unit 160 stores a normal key table 128d instead of the normal key table 128 of the information processing apparatus 100. One example of the normal key table 128d is shown in FIG. 35.

The normal key table 128d has the same structure as the protected key table 136d. Here, explanation is given on the data structure of the normal key table 128d and explanation on the data structure of the protected key table 136d is omitted.

The normal key table 128d is a table that temporally stores keys used for encrypting/decrypting the data used by the application program, and as shown in FIG. 35, has an area for storing one or more pieces of key information. Each piece of key information is composed of a reference hash value of the application program and one or more pieces of server information. Each piece of server key information is composed of a piece of server information, a key, a maximum use count, and a current use count. The reference hash value of the application program and the server information are as described above, and description thereof is omitted here.

The maximum use count is the maximum number of times the application program corresponding to the key is able to use the key; and the current use count is the number of times the corresponding application program has actually used the key. The normal key table 128d differs from the key table of the information processing apparatus 100 in including the maximum use count and the current use count.

(2) Operations for Key Confirmation A

Figure 36:
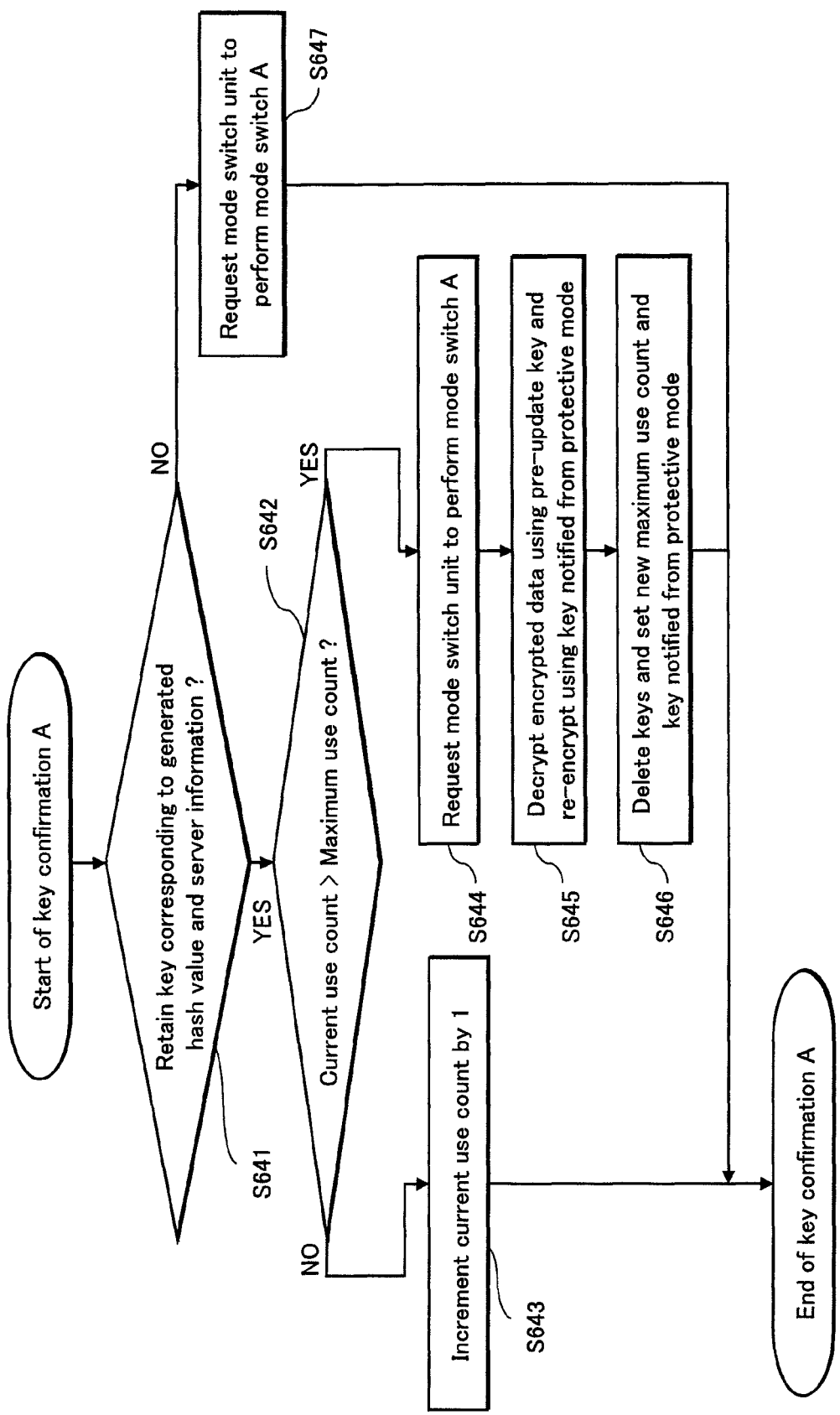
FIG. 36 is a flowchart showing operations for the key confirmation A in the fourth embodiment.

The following explains the operations for the key confirmation A of the information processing apparatus 100d, with reference to a flowchart shown in FIG. 36. The data encryption/decryption function unit 160 of the information processing apparatus 100d performs the key confirmation A as described below instead of the operations for the key confirmation A (shown in FIG. 26) of the information processing apparatus 100.

Note that the operations for the key confirmation A explained here are details of step S221 in FIG. 10, step S243 in FIG. 11, step S253 in FIG. 12, and step S281 in FIG. 15.

The data encryption/decryption function unit 160 judges whether the normal key table 128d retains the key that corresponds to the generated hash value and the piece of server information (S641).

When the normal key table 128d retains the key that corresponds to the generated hash value and the piece of server information (S641: YES), the data encryption/decryption function unit 160 reads, from the normal key table 128d the maximum use count and the current use count that correspond with the generated hash value and the piece of server information, and judges whether the read current use count exceeds the read maximum use count (S642).

When the read current use count does not exceed the read maximum use count (S642: NO), the data encryption/decryption function unit 160 increments the current use count that corresponds to the generated hash value and the piece of server information by "1", and overwrites the incremented current use count onto the normal key table 128d (S643), which completes the key confirmation A.

When the read current use count exceeds the read maximum use count (S642: YES), the following is performed: the data encryption/decryption function unit 160 requests the mode switch unit 143 to perform the mode switch A and to acquire a new key and a new maximum use count; the new key and the new maximum use count are generated in the protective mode and output to the normal mode; after the mode is switched to the normal mode again, the data encryption/decryption function unit 160 acquires the new key and the new maximum use count (S644). Note that the new key may be generated in the execution environment 121 using a random number generated with use of a timer (not shown) or the like, the hash value of the application program, the piece of server information, and terminal information.

Next, the data encryption/decryption function unit 160 decrypts the encrypted data using the pre-update key, and encrypts the resultant data again using the new key notified from the protective mode (S645).

Next, the data encryption/decryption function unit 160 performs the following: deleting, in the normal key table 128d the pre-update key that corresponds to the generated hash value and the piece of server information; setting the current use count corresponding with the generated hash value and the piece of server information to "0"; setting the maximum use count notified from the protective mode into the field of the maximum use count that corresponds to the generated hash value and the piece of server information; and setting the new key notified from the protective mode into the field of the key that corresponds to the generated hash value and the piece of server information (S646). This completes the operations for the key confirmation A.

When the normal key table 128d does not retain the key that corresponds to the generated hash value and the piece of server information (S641: NO), the data encryption/decryption function unit 160 requests the mode switch unit 143 to perform the mode switch A (S647), and completes the operations for the key confirmation A.

(3) As described above, according to the information processing apparatus 100d the number of times the key, which is used for encrypting/decrypting data, is used can be restricted. Accordingly, the same encryption/decryption key will not be used more than the number of times indicated by the maximum use count, thereby reducing possibility of leakage of the encryption/decryption key. In a case where the key has been used more than the maximum use count, the key is updated to a new key. This enforces the protection against brute force attacks in which attackers generate all possible patterns of encryption/decryption keys and try them one by one.

5. Fifth Embodiment

The following explains an information processing apparatus 100e as another embodiment pertaining to the present invention. The information processing apparatus 100e has a similar structure as the information processing apparatus 100. In the following, explanation is mainly made on differences from the information processing apparatus 100.

The information processing apparatus 100e controls the length of time the key for encrypting/decrypting data is used. In the following, a technique to control the length of time the key for encrypting/decrypting data with use of the information processing apparatus 100e is explained with reference to FIGS. 37-39.

(1) Structure of Information Processing Apparatus 100e

Figure 37:
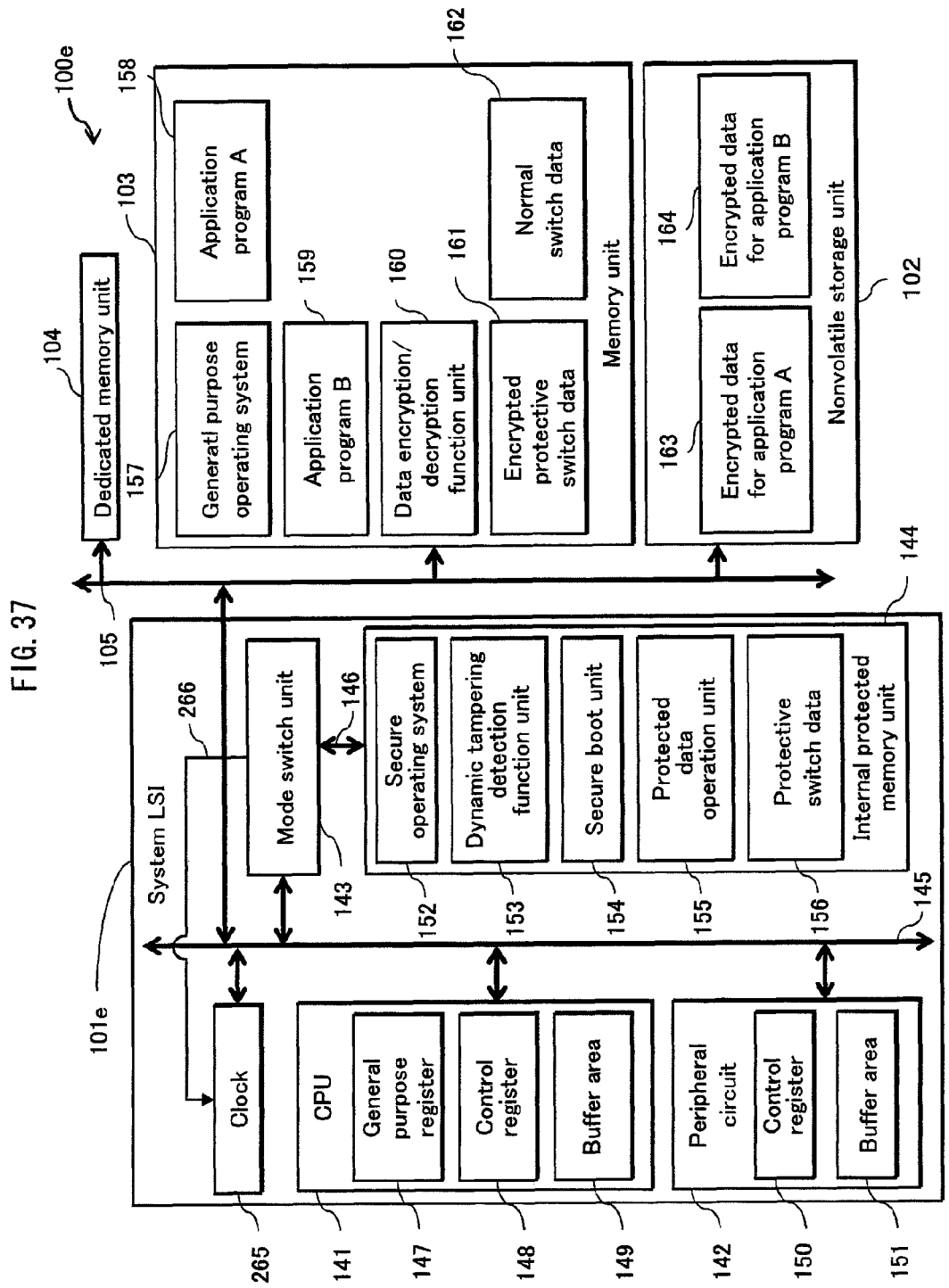
FIG. 37 shows a structure of an information processing apparatus 100e of a fifth embodiment.

As shown in FIG. 37, the information processing apparatus 100e has a structure similar to that of the information processing apparatus 100.

The information processing apparatus 100e differs from the information processing apparatus 100 in that a system LSI 101e has a clock 265. The protected data operation unit 155 of the information processing apparatus 100e stores a protected key table 136e (not shown) instead of the protected key table 136 of the information processing apparatus 100. The data encryption/decryption function unit 160 stores a normal key table 128e instead of the normal key table 128 of the information processing apparatus 100. FIG. 35 shows one example of the normal key table 128e. The rest of the structure is the same as that of the information processing apparatus 100.

(1) Clock 265

The clock 265 is a time keeping unit that measures time, and retains time information indicating the current time. The clock 265 is connected with the CPU 141, the peripheral circuit 142, and the mode switch unit 143 via the internal bus 145. Furthermore, the clock 265 is connected with the mode switch unit 143 via the dedicated line 266.

Access from the CPU 141 to the time information retained by the clock 265 is restricted by the mode switch unit 143.

When the system LSI 101e is in the protective mode, the mode switch unit 143 performs control via the dedicated line 266 such that the time information stored in the clock 265 can be read and changed. When the system LSI 101e is in the normal mode, the mode switch unit 143 performs control via the dedicated line 266 such that the time information stored in the clock 265 can only be read.

(2) Data Structure of Key Table

The normal key table 128e has the same data structure as the protected key table 136e . Here, explanation is given on the data structure of the normal key table 128e and explanation on the data structure of the protected key table 136e is omitted.

The normal key table 128d is a table that temporally stores keys used for encrypting/decrypting data used by the application program, and as shown in FIG. 38, has an area for storing one or more pieces of key information. Each piece of key information is composed of a reference hash value of the application program and one or more pieces of server information. Each piece of server key information is composed of a piece of server information, a key, and a final time. The reference hash value of the application program and the piece of server information are as described above, and description thereof is omitted here.

The final time indicates the ending time of a period during which the application program corresponding to the key is able to use the key, and for example, is composed of year, month, day, hour, minute, and second.

The normal key table 128e differs from the information processing apparatus 100 in including the final time.

(3) Operations for Key Confirmation A

Figure 39:
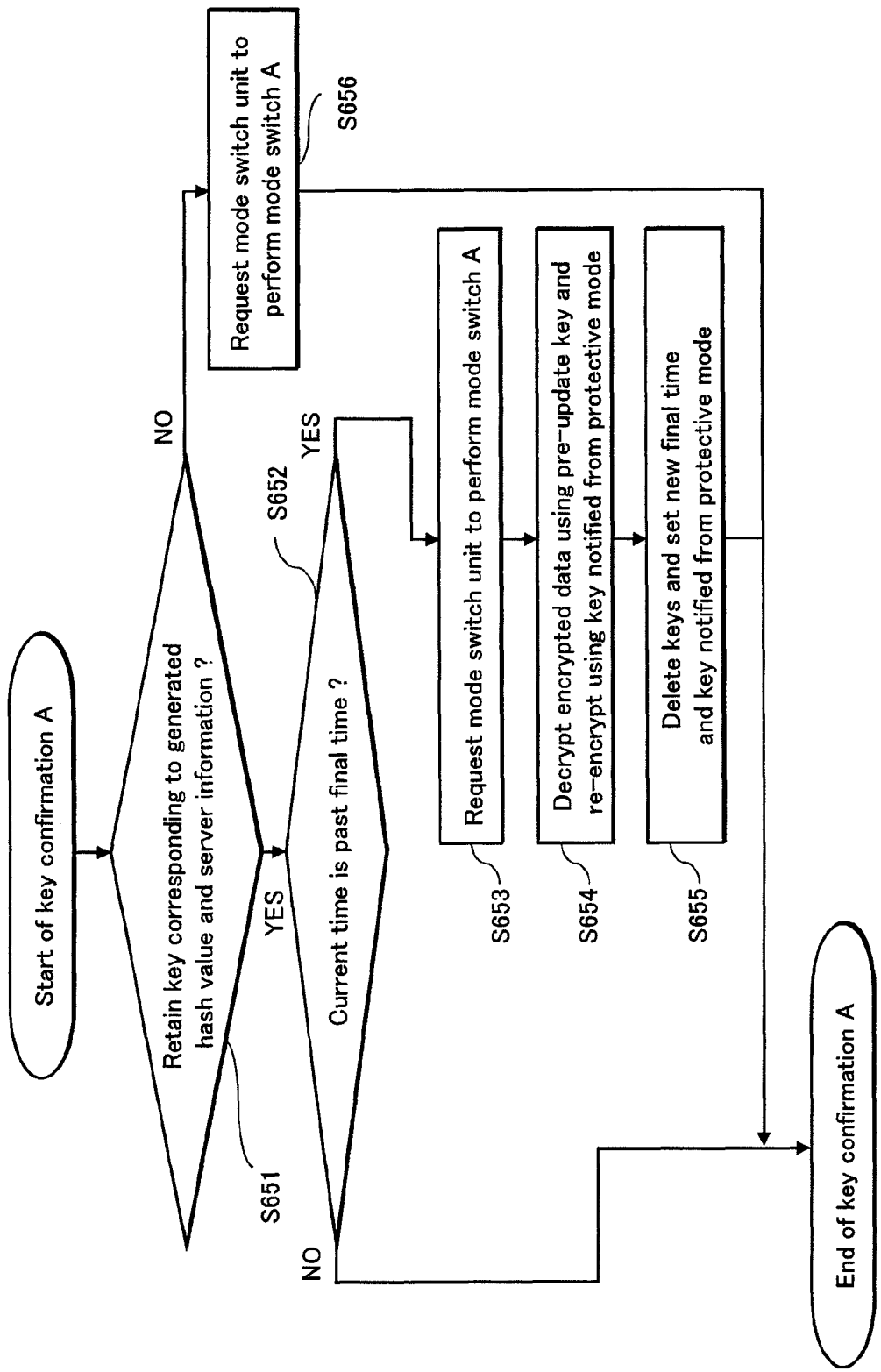
FIG. 39 is a flowchart showing operations for key confirmation A in the fifth embodiment.

The following explains the operations for key confirmation A by the information processing apparatus 100e, with reference to a flowchart shown in FIG. 39. The data encryption/decryption function unit 160 of the information processing apparatus 100e performs the key confirmation A as follows, instead of the key confirmation A performed by the information processing apparatus 100 (shown in FIG. 26).

Note that the operations for the key confirmation A explained here are details of step S221 in FIG. 10, step S243 in FIG. 11, step S253 in FIG. 12, and step S281 in FIG. 15.

The data encryption/decryption function unit 160 judges whether the normal key table 128d retains the key that corresponds to the generated hash value and the piece of server information (S651).

When the normal key table 128d retains the key that corresponds to the generated hash value and the piece of server information (S651: YES), the data encryption/decryption function unit 160 acquires the time information from the clock 265, reads the final time that corresponds to the generated hash value and the piece of server information, and judges whether the current time indicated by the acquired time information is past the acquired final time (S652).

When the current time is not past the final time (S652: NO), the key confirmation A is terminated.

When the current time is past the final time (S652: YES), the following is performed: the data encryption/decryption function unit 160 requests the mode switch unit 143 to perform the mode switch A and to acquire a new key and a new final time; the new key and the new final time are generated in the protective mode and output to the normal mode; after the mode is switched to the normal mode again, the data encryption/decryption function unit 160 acquires the new key and the new final time (S653). Note that the new key may be generated using a random number generated with use of the clock 265, a timer (not shown) or the like, the hash value of the application program, the piece of server information, and terminal information.

Next, the data encryption/decryption function unit 160 decrypts the encrypted data using the pre-update key, and encrypts the resultant data again using the new key notified from the protective mode (S654).

Next, the data encryption/decryption function unit 160 performs the following: deleting, in the normal key table 128d the pre-update key that corresponds to the generated hash value and the piece of server information; setting, in the normal key table 128d the final time notified from the protective mode into the field of the final time that corresponds to the generated hash value and the piece of server information; and setting the new key notified from the protective mode into the field of the key that corresponds to the generated hash value and the piece of server information (S655). This completes the operations for the key confirmation A.

When the normal key table 128d does not retain the key that corresponds to the generated hash value and the piece of server information (S651: NO), the data encryption/decryption function unit 160 requests the mode switch unit 143 to perform the mode switch A (S647), and completes the operations for the key confirmation A.

(3) With the above-described structure, the use time of the key used for encrypting/decrypting data can be restricted. Accordingly, the same encryption/decryption key will not be used past the final time, thereby reducing possibility of leakage of the encryption/decryption key. Once the final time has passed, the key is updated to a new key. This enforces the protection against brute force attacks in which attackers generate all possible patterns of encryption/decryption keys and try them one by one.

6. Sixth Embodiment

The following explains an information processing apparatus 100f as another embodiment pertaining to the present invention. The information processing apparatus 100f has a similar structure as the information processing apparatus 100. In the following, explanation is mainly made on differences from the information processing apparatus 100.

Upon detecting an unauthorized application program, the information processing apparatus 100f decrypts encrypted data and deletes the plain text data generated by the decryption. In the following, explanation is given on a technique, upon detecting an unauthorized application program, to decrypt encrypted data and delete the plain text generated by the decryption, with reference to FIGS. 40-43.

(1) Structure of Information Processing Apparatus 100f

Figure 40:
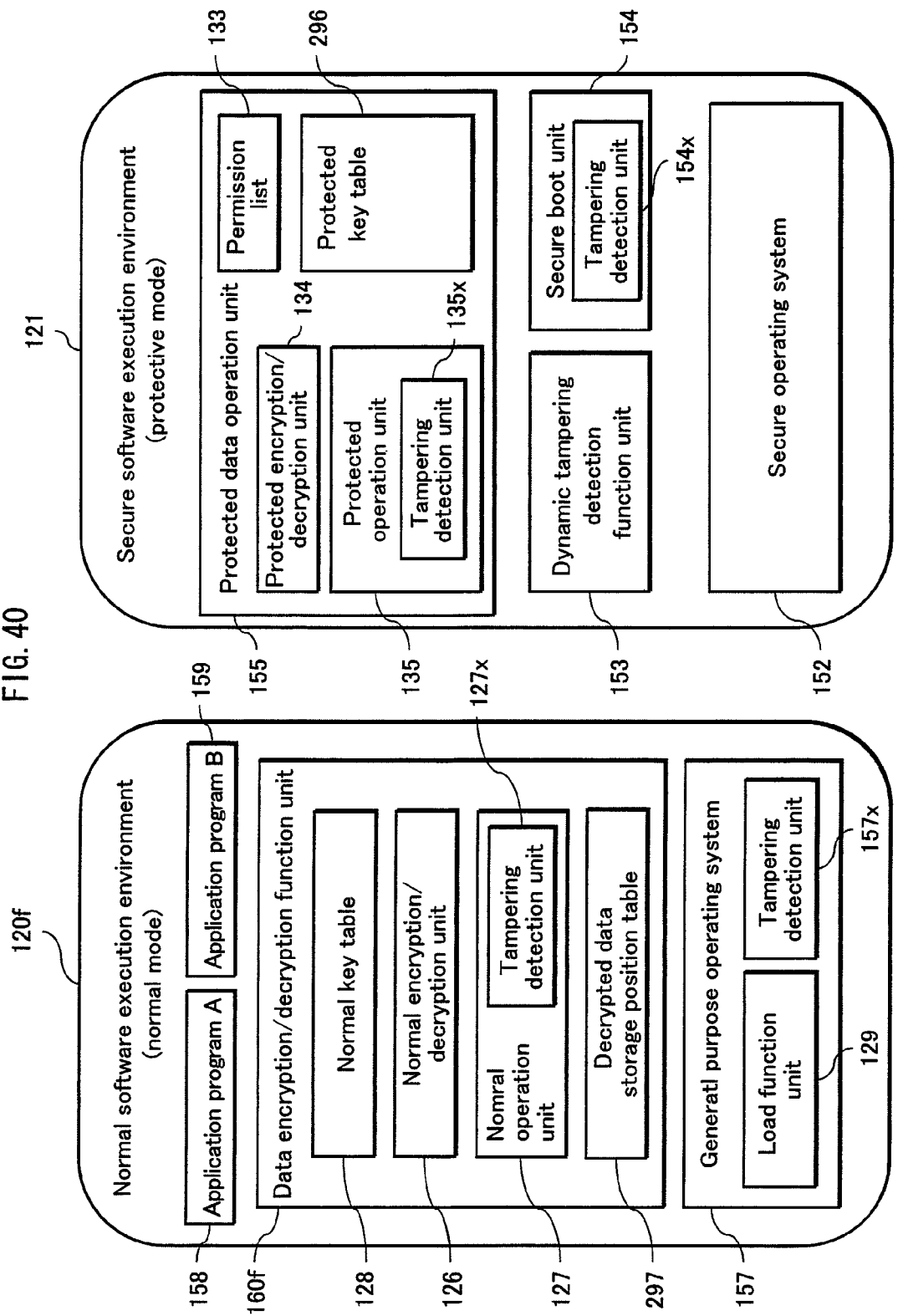
FIG. 40 shows a software structure of an information processing apparatus 100f of a sixth embodiment.

FIG. 40 shows the software structure of the information processing apparatus 100f.

The information processing apparatus 100f includes a software execution environment 120f which is the normal mode, and the secure software execution environment 121 which is the protective mode. As with the information processing apparatus 100, the information processing apparatus 100f switches between the normal mode and the protective mode during execution of each software.

The execution environment 120f which is similar to the execution environment 120 of the information processing apparatus 100 includes a data encryption/decryption function unit 160f instead of the data encryption/decryption function unit 160 of the information processing apparatus 100. The data encryption/decryption function unit 160f which is similar to the data encryption/decryption function unit 160 of the information processing apparatus 100 has a decrypted data storage position table 297 in addition to the components of the data encryption/decryption function unit 160.

The execution environment 120 of the information processing apparatus 100f is the same as the execution environment 120 of the information processing apparatus 100.

As is apparent from the above, the execution environment 120f of the information processing apparatus 100f differs from the execution environment 120 of the information processing apparatus 100 in that the data encryption/decryption function unit 160f further includes the decrypted data storage position table 297.

(2) Data Structure of Decrypted Data Storage Position Table 297

As shown in FIG. 41, the decrypted data storage position table 297 is a data table including multiple pieces of decryption information. Each piece of decryption information corresponds to data to be encrypted or decrypted by the application program which operates on the information processing apparatus 100f. Each piece of decryption information is composed of a data ID, an encrypted data storage filename, a hash value of the destination application program, a decrypted data storage address, and a decrypted data size.

The data ID is an identifier for uniquely identifying encrypted data.

The encrypted data storage file name is a name of a file in which encrypted data is stored.

The hash value of the destination application program is a hash value of the application program which was provided with the plain text data obtained as a result of decrypting the encrypted data, and is an identifier for identifying the application program.

The decrypted data storage address is a leading address of a memory that stores the plain text data obtained by decrypting the encrypted data. The address is stored here when the plain text obtained by decrypting the encrypted data is provided to the application program.

The decrypted data size is a size of the plain text data obtained by decrypting the encrypted data. The size is stored here when the plain text data obtained by decrypting the encrypted data is provided to the application program.

Figure 42:
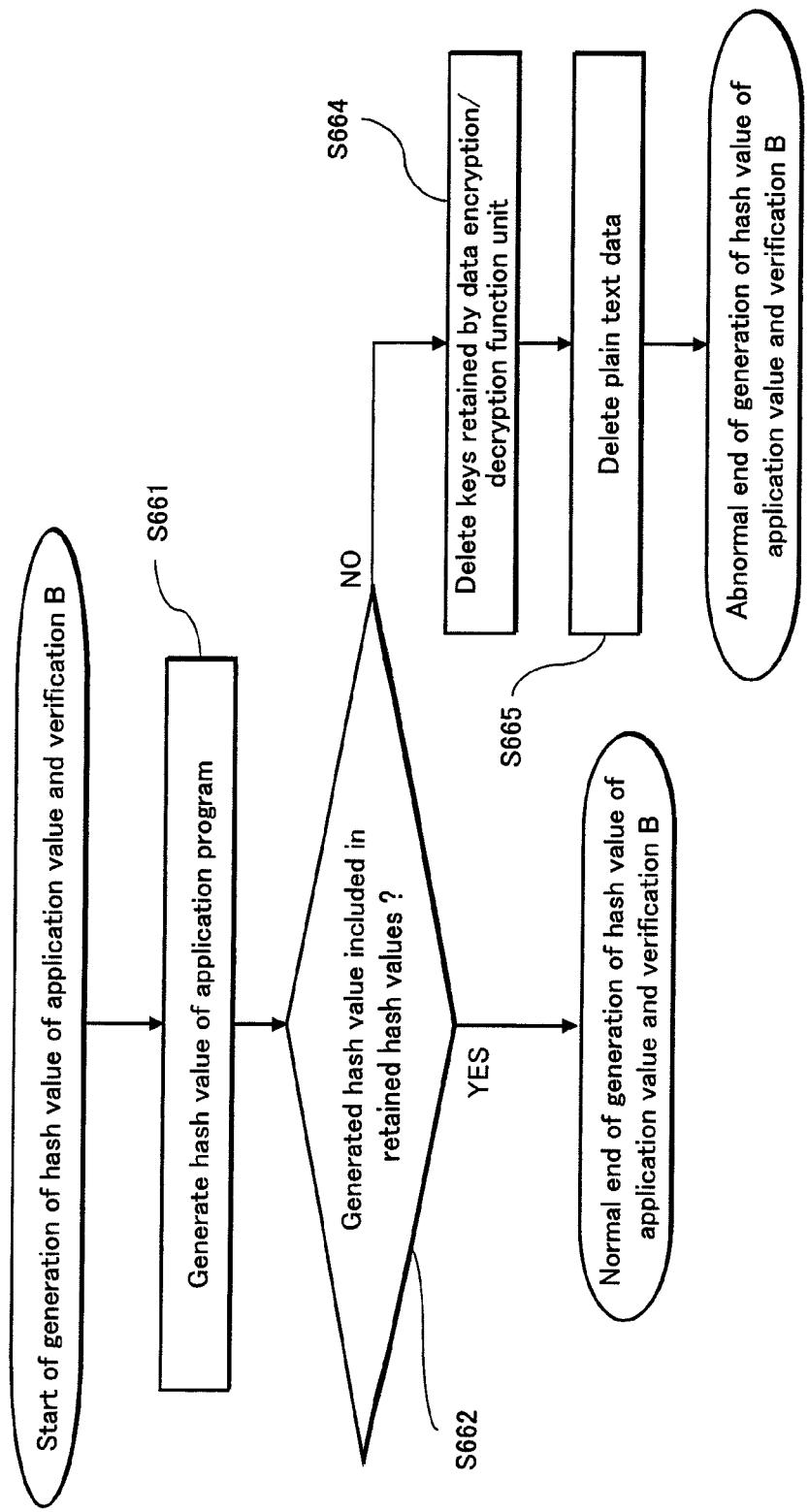
FIG. 42 is a flowchart showing operations for generation of a hash value of the application program and verification B in the sixth embodiment.

(3) Operations for Generation of Hash Value of Application Program and Verification B The following explains operations for generation of hash value of an application program and verification B, with reference to a flowchart shown in FIG. 42.

The data encryption/decryption function unit 160f (or the protected data operation unit 155) of the information processing apparatus 100f performs the operations for the generation of the hash value of the application program and the verification B as follows, instead of the operations for the generation of the hash value of the application program and the verification B performed by the information processing apparatus 100 (shown in FIG. 24). Note that the operations for the generation of the hash value of the application program and the verification B explained here are details of step S224 in FIG. 10, step S241 in FIG. 11, step S251 in FIG. 12, step S256 in FIG. 12, step S271 in FIG. 13, and step S284 in FIG. 15.

The tampering detection unit 127x of the data encryption/decryption function unit 160 (or the tampering detection unit 155x of the protected data operation unit 155) generates a hash value for an execution image of the application program stored in the memory unit 103, using a one-way hash function such as SHA-1 (S661). Note that a one-way function other than SHA-1 can be used for the generation of the hash value. For example, MD5 SHA-256 AES, or DES may be used.

Next, the tampering detection unit 127x of the data encryption/decryption function unit 160 (or the tampering detection unit 155x of the protected data operation unit 155) judges whether the generated hash value is included in the hash values retained in the normal key table 128 (or the protected key table 136) (S662).

When the generated hash value is included (S662: YES), the operations for the generation of the hash value of the application program and the verification B terminate normally.

When the generated hash value is not included (S662: NO), the data encryption/decryption function unit 160f (or the protected data operation unit 155) deletes the keys retained in the normal key table 128 (or the protected key table 136) (S664), read the decrypted data storage address and the decrypted data storage size from the decrypted data storage position table 297, and deletes the decrypted data based on the read address and size (S665). The deletion can be performed by overwriting the keys stored in the normal key table with a specific value such as "0", or generating a random number and overwriting the keys with the generated random number. This is how the generation of the hash value and the verification B terminate abnormally. In a case of an abnormal termination, execution of the application program is prohibited. Additionally, information indicating that the application program is an unauthorized application program maybe stored in the nonvolatile storage unit 102, as a log.

(4) As described above, not only the decrypted key, but also plain text data obtained by the decryption with use of the encryption/decryption key is deleted. Consequently, not only plain text data to be generated in the future, but also the plain text data generated in the past can be protected from unauthorized application programs.

(5) Operations for Verification of Other Application Programs

Figure 43:
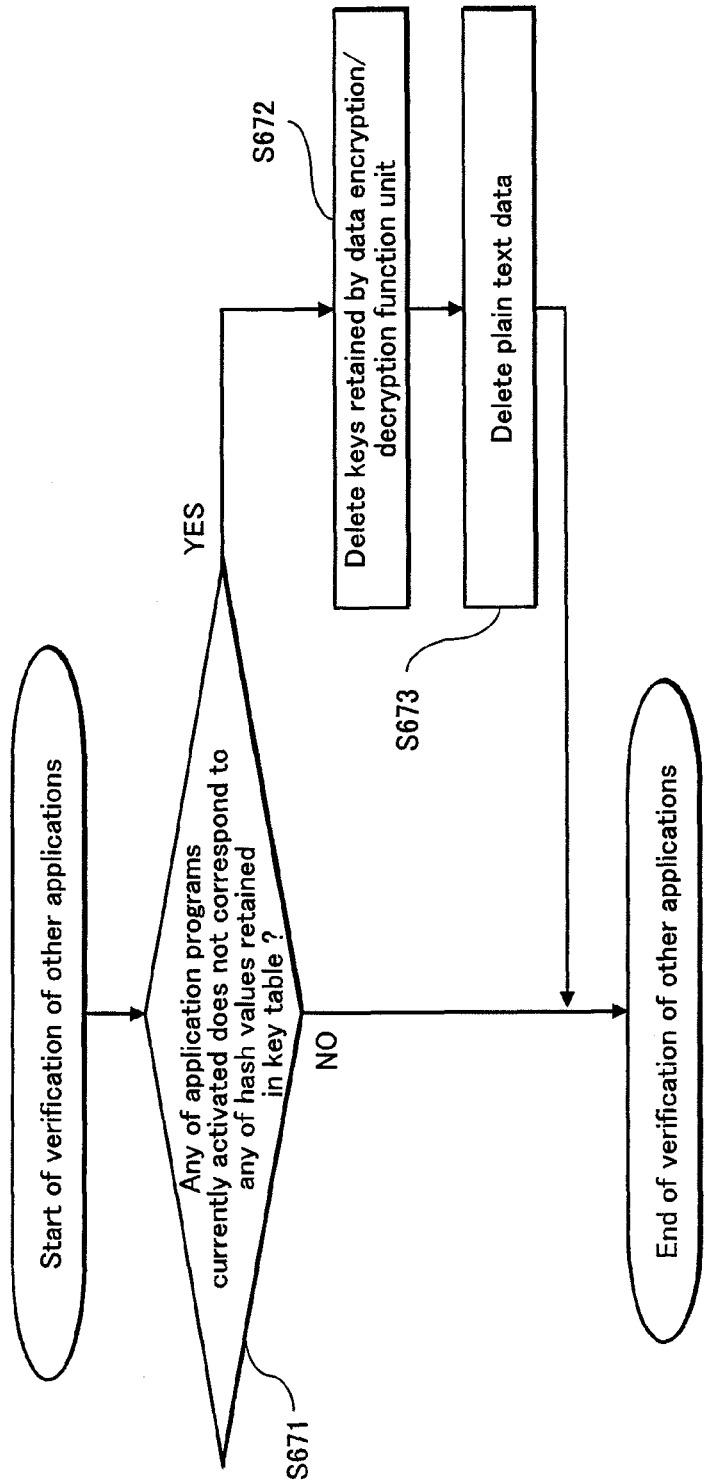
FIG. 43 is a sequence diagram showing operations for confirmation of other application programs in the sixth embodiment.

The following explains operations for verification of other application programs, with reference to a flowchart shown in FIG. 43.

The data encryption/decryption function unit 160*f* (or the protected data operation unit 155) of the information processing apparatus 100*f* performs the operations for the verification of other application programs as follows instead of the operations for the verification of other application programs by the information processing apparatus 100 (shown in FIG. 25). Note that the operations for the verification of other application programs explained here are details of step S225 in FIG. 10, step S242 in FIG. 11, step S252 in FIG. 12, and step S285 in FIG. 15.

The tampering detection unit 127*x* of the data encryption/decryption function unit 160*f* (or the tampering detection unit 155*x* of the protected data operation unit 155) checks whether there is any application program among the application programs being activated that does not correspond with any of the hash values retained by the normal key table 128*f* (or the protected key table 136*f*) (S671). Note that the load function unit 129 retains hash values of the applications program which the load function unit 129 has loaded, and this check may be performed by checking these hash values.

When there is no application program that does not correspond with any of the hash values retained by the normal key table 128*f* (S671: NO), the operations for the verification of other application programs terminate normally.

When there is an application program that does not correspond with any of the hash values retained by the normal key table 128*f* (S671: YES), the protected data operation unit 155 (or the data encryption/decryption function unit 160) deletes the keys retained in the normal key table 128 (or the protected key table 136) (S672), reads the decrypted data storage address and the decrypted data storage size, and deletes the decrypted data based on the read address and size (S673). This completes the operations for verifying other application programs. Note that the deleting can be realized by overwriting a specific value on the decrypted data. Alternatively, the deleting may be realized by generating a random number and overwriting the random number on the decrypted data.

(6) Note that among the operations of the information processing apparatus 100*f* the generation of the hash value and the verification B and the verification of other application programs are as described above, and the other operations are the same as those of the information processing apparatus 100.

As described above, according to the present embodiment, an encryption key is stored into the internal protected memory unit 144 which is access-restricted, and when the data encryption/decryption function unit 160 performs encryption processing using the encryption key, for example, for the first time, the mode is switched from the normal mode to the protective mode to acquire the encryption key from the internal protected memory unit 144. After that, the encryption key is copied into the memory unit 103 which is accessible, thereby eliminating the need to switch to the protective mode again.

With this structure, it is not necessary to switch the mode each time encryption processing is performed, which significantly reduces complex encryption processing required when secretly managing the encryption key.

Meanwhile, the key generation unit of the protected operation unit 135 generates the encryption key based on the hash value of a predetermined application program, stores the generated encryption key into the internal protected memory unit 144, and stores the hash value used for generating the encryption key into the memory unit 103; and the data encryption/decryption function unit 160*f* upon receiving a request to encrypt predetermined data stored in the memory unit 103, calculates the hash value of the application program, and if the calculated hash value does not match the hash value stored in the memory unit 103, deletes the encryption key copied in the memory unit 103. With this structure, when there is a risk that an application program other than the application program corresponding to the hash value used for generating the encryption key uses the encryption key stored in the memory unit 103, which is freely accessible from the data encryption/decryption function unit 160, the encryption key stored in the memory unit 103 is deleted. Consequently, secrecy of the encryption key is be secured, and confidentiality of the data is be ensured.

Thus, complex encryption processing required when secretly managing the encryption key is significantly reduced while secrecy of the encryption key is secured and confidentiality of the data is ensured.

7. Others

An information processing apparatus pertaining to a first aspect of the present invention comprises: a first memory storing predetermined data; a second memory storing an encryption key; a storage unit storing a predetermined application program; a key generation unit operable to generate the encryption key based on a hash value of the predetermined application program, store the generated key into the second memory, and store the hash value into the first memory; an encryption unit that is allowed to access the first memory and prohibited from accessing the second memory and that is operable to read the predetermined data from the first memory and encrypt the predetermined data; and a control unit operable to set a first mode, activates the predetermined application program, receives a processing request from the predetermined application program to encrypt the predetermined data stored in the first memory, and when the encryption key is not stored in the first memory, switch the first mode to a second mode, cause the key generation unit to copy the encryption key stored in the second memory into the first memory, switch the second mode to the first mode, and cause the encryption unit to encrypt the predetermined data using the encryption key copied into the first memory, the first mode allowing the predetermined application program to access the first memory and prohibiting the predetermined application program from accessing the second memory, and the second mode allowing the key generation unit to access the first memory and the second memory, wherein the encryption unit calculates, in accordance with the processing request, a hash value of the application program that has output the processing request, and when the calculated hash value does not match the hash value stored in the first memory, deletes the encryption key copied into the first memory.

According to the present aspect, complex encryption processing required when secretly managing the encryption key is significantly reduced, and at the same time, secrecy of the encryption key is secured, thereby ensuring confidentiality of the data.

In order to protect the confidentiality of the data, it is necessary to secretly manage the encryption key used for encrypting the data. secretly managing the encryption key requires restricting access to the memory that stores the encryption key. On the other hand, restricting access to the memory storing the encryption key makes encryption processing using the encryption key more complex. That is, each time encryption processing is performed, the encryption key needs to be acquired from the above-mentioned access-restricted memory.

According to the present aspect, the information processing apparatus stores the encryption key in the access-restricted second memory, and when the encryption unit performs encryption processing using the encryption key, for example, for the first time, the information processing apparatus switches the mode to acquire the encryption key from the access-restricted second memory. However, thereafter, the encryption key is copied to the access-allowed first memory, thereby eliminating the need for switching the mode. Consequently, it is not necessary to switch the mode each time encryption processing is performed. As a result, complex encryption processing required when secretly managing the encryption key is significantly reduced.

Furthermore, with this structure, the key generation unit of the information processing apparatus generates the encryption key based on the hash value of the predetermined application program, stores the generated hash value into the second memory, stores the encryption key used for generating the hash value, into the first memory, and the encryption unit, upon receiving a processing request to encrypt the predetermined data stored in the first memory, calculates the hash value of the application program which has output the processing request, and when the calculated hash value and the hash value stored in the first memory do not match each other, the encryption unit deletes the encryption key copied into the first memory. Accordingly, when there is possibility that an application program other than the application program corresponding to the hash value used for generating the encryption key uses the encryption key stored in the first memory, to which the encryption unit has free access, the encryption key stored in the first memory is deleted. Consequently, secrecy of the encryption key is secured, and as a result, confidentiality of the data is ensured.

Thus, complex encryption processing required for secretly managing the encryption key can be significantly reduced while the secrecy of the encryption key is secured and the confidentiality of the data is ensured.

Further, in an information processing apparatus pertaining to a second aspect of the present invention, upon receiving the processing request from the predetermined application program, in a case where the encryption key is stored in the first memory, the control unit causes the encryption unit to encrypt the predetermined data using the encryption key copied into the first memory, without switching to the second mode.

According to the present aspect, when the processing request is received from the predetermined application program and the encryption key is stored in the first memory, the control unit makes the encryption unit encrypt the predetermined data, without switching to the second mode, with use of the encryption key copied into the first memory. With this structure, the encryption key is stored in the access-restricted second memory, and when the encryption unit performs encryption processing using the encryption key, for example, for the first time, the mode is switched to acquire the encryption key from the access-restricted second memory. After that, however, the encryption key is copied in the access-allowed first memory, and performs encryption using the copied encryption key. This eliminates the need to switch the mode each time encryption processing is performed, thereby significantly reducing complex encryption processing required when secretly managing the encryption key.

In an information processing apparatus pertaining to a third aspect of the present invention, the predetermined application program is an application program storing data to be transmitted to an external device, into the first memory, the key generation unit generates the encryption key based on identification information of the external device and the hash value of the predetermined application program, and the control unit encrypts the data to be transmitted to the external device using the encryption key and stores the encrypted data into a third memory.

According to the present aspect, when the predetermined application program is an application program storing the data to be transmitted to the external device into the first memory, the key generation unit generates the encryption key based on the identification of the external device, and the hash value of the predetermined application program. With this structure, when one application stores data to be transmitted to multiple external devices, multiple encryption keys can be generated for the one application according to the multiple external devices.

In an information processing apparatus pertaining to a fourth aspect of the present invention, the key generation unit further includes a second encryption unit that is operable to read the predetermined data from the first memory, read the encryption key from the second memory, and encrypt the predetermined data, and the control unit, upon receiving the processing request from the predetermined application program in the first mode after the encryption key copied into the first memory is deleted from the first memory, switches to the second mode, and causes the second encryption unit to encrypt the predetermined data stored in the first memory using the encryption key stored in the second memory.

According to the present aspect, the key generation unit has the second encryption unit that reads the predetermined data from the first memory, reads the encryption key from the second memory, and encrypts the predetermined data. Upon receiving the processing request from the predetermined application program after the encryption key copied into the first memory is deleted from the first memory, the control unit switches to the second mode, which allows the key generation unit to access the first memory and the second memory, and causes the second encryption unit to encrypt the predetermined data stored in the first memory using the encryption key stored in the second memory. With this structure, after the encryption key copied into the first memory is deleted from the first memory, the first mode is switched to the second mode, and the control unit causes the key generation unit, which is able to access the second memory storing therein the encryption key, to perform encryption processing, instead of causing the encryption unit to perform the encryption processing in the first mode. Consequently, although mode switching processing needs to be performed after the encryption key copied into the first memory is deleted from the first memory, the secrecy of the encryption key is secured, and as a result, the confidentiality of the data is ensured.

An information processing apparatus pertaining to a fifth aspect of the present invention further includes a monitor unit operable to monitor whether an application is being activated or not, and when the monitor unit judges, after the encryption key copied into the first memory is deleted, that the application program which has output the processing request and corresponds to a hash value that does not match the hash value stored in the first memory is inactivated, the control unit switches to the second mode and causes the first encryption unit to copy the encryption stored in the second memory into the first memory in a case where the processing request was received from the predetermined application program and the encryption key is not stored in the first memory.

According the present aspect, after the encryption key copied into the first memory is deleted, when it is judged that the activation of the application program that has output the processing request and corresponds to the hash value which does not match the hash value stored in the first memory is terminated, the encryption stored in the first memory is copied into the first memory again. With this structure, when an application program other than the predetermined application program corresponding to the hash value used for generating the encryption key is inactivated and thus there is no longer danger of this application program using the encryption key, the encryption key is copied again into the first memory to which the encryption is allowed to access. Consequently, when there is no longer danger of an application program other than the predetermined application program using the encryption key, complex encryption processing required for secretly managing the encryption key is significantly reduced again while the state where the secrecy of the encryption key is secured and the confidentiality of the data is ensured is recovered.

Furthermore, in an information processing apparatus pertaining to a sixth aspect of the present invention, the key generation unit generates the encryption key corresponding to the predetermined application program based on the hash value of the predetermined application program at initial setting of the application program, stores the generated encryption key into the second memory, generates a key generation list that associate the hash value of the predetermined application program and the corresponding encryption key, stores the generated key generation list into the second memory, and stores hash values included in the key generation list into the first memory.

According to the present aspect, the key generation unit generates a key generation list in which the hash value of the predetermined application program is associated with the corresponding encryption. This structure enables reliable and easy management of the correspondence between the hash value of the predetermined application program and the corresponding encryption key. As a result, the secrecy of the encryption key can be managed reliably and easily.

An information processing apparatus pertaining to a seventh aspect of the present invention further acquires identification information of an external device to which the predetermined application program transmits data, at the initial setting of the predetermined application program via the predetermined application, generates the encryption key corresponding to the predetermined application program based on the identification information of the external device and the hash value of the predetermined application, stores the generated encryption key into the second memory, generates a second key generation list that associates the identification information of the external device, the hash value of the predetermined application program, and the corresponding encryption key with one another, stores the generated second key generation list into the second memory, and stores hash values included in the second key generation list into the first memory.

According to the present aspect, the key generation unit generates the second key generation list that associates the identification information of the external device, the hash value of the predetermined application program, and the corresponding encryption key with one another. This structure enables reliable and easy management of correspondence among the identification information of the external device, the hash value of the predetermined application program, and the corresponding encryption key, when multiple encryption keys are generated for one application program according to multiple external terminals. As a result, the secrecy of the multiple encryption keys for the one application can be managed reliably and easily.

Furthermore, in an information processing apparatus pertaining to an eighth aspect of the present invention, the key generation unit stores information indicating a number of usages of the encryption key, into the first memory when copying the encryption key into the first memory, the encryption unit, when a number of times the encryption key has been used exceeds the number of usages indicated by the information, deletes the encryption key copied into the first memory and requests the control unit to copy a new encryption key, and the control unit switches to the mode and causes the key generation unit to generate a new encryption key and copy the generated key into the first memory.

The present aspect reduces possibility of leakage of the encryption key because the same encryption key is not continuously used, and at the same time enforces the protection against brute force attacks in which attackers generate all possible patterns of encryption keys and try them one by one.

An information processing apparatus pertaining to a ninth aspect of the present invention further includes a time measuring unit operable to measure date and time, wherein the key generation unit stores time information indicating a final date and a final time by which use of the encryption key is allowed, into the first memory when copying the encryption key into the first memory, the encryption unit, when the final date and the final time indicated by the time information is past the date and the time measured by the time keeping unit, deletes the encryption key copied into the first memory and requests the control unit to copy a new encryption key, and the control unit switches to the second mode and causes the key generation unit to generate a new encryption key and copy the generated encryption key into the first memory.

The present aspect reduces possibility of leakage of the encryption key because the same encryption key is not continuously used, and at the same time enforces the protection against brute force attacks in which attackers generate all possible patterns of encryption keys and try them one by one.

An information processing apparatus pertaining to a tenth aspect of the present invention comprises : a first memory storing predetermined encrypted data; a second memory storing an decryption key; a storage unit storing a predetermined application program; a key generation unit operable to generate the decryption key based on a hash value of the predetermined application program, store the generated key into the second memory, and store the hash value into the first memory; an decryption unit that is allowed to access the first memory and prohibited from accessing the second memory and that is operable to read the predetermined encrypted data from the first memory and decrypt the predetermined encrypted data; and a control unit operable to set a first mode, activates the predetermined application program, receives a processing request from the predetermined application program to decrypt the predetermined encrypted data stored in the first memory, and when the decryption key is not stored in the first memory, switch the first mode to a second mode, cause the key generation unit to copy the decryption key stored in the second memory into the first memory, switch the second mode to the first mode, and cause the decryption unit to decrypt the predetermined encrypted data using the decryption key copied into the first memory, the first mode allowing the predetermined application program to access the first memory and prohibiting the predetermined application program from accessing the second memory, and the second mode allowing the key generation unit to access the first memory and the second memory, wherein the decryption unit calculates, in accordance with the processing request, a hash value of the application program that has output the processing request, and when the calculated hash value does not match the hash value stored in the first memory, deletes the decryption key copied into the first memory, the information processing apparatus further comprises a fourth memory storing plain text data obtained as a result of the decryption unit decrypting the predetermined encrypted data using the decryption key, and the decryption unit calculates, in response to the processing request, the hash value of the application program that has output the processing request, and deletes the plain text data stored in the fourth memory when the calculated hash value and the hash value stored in the first memory do not match each other.

According to the present aspect, not only the decryption key but also the plain text data decrypted in the past using the decryption key are deleted. Accordingly, not only the plain text data to be generated in the future, but also the plain text data generated in the past can be protected from unauthorized application programs.

8. Modifications (1) In the embodiments above, the load function unit 129 which verifies the application program is included in the general purpose operating system 157. However, the verification of the application can be realized by a software module other than that. The software module other than that is, for example, download software that downloads the application program from the network and stores the downloaded application program into the information processing apparatus.

(2) In the embodiments above, when an unauthorized application program is detected, keys stored in the normal key table are deleted. However, other data may be deleted instead. The other data is, for example, decrypted plain text data. Another example of the other data is a file storing therein the unauthorized application program.

(3) In the embodiments above, when an unauthorized application program is detected, keys stored in the normal key table are deleted. However, another operation may be performed instead. For example, a warning message may be transmitted to the application program which retains the decrypted plain text data. Alternatively, the following processing maybe performed: detection information indicating detection of an unauthorized application program is stored into the nonvolatile storage unit 102; it is judged whether detection information is stored in the nonvolatile storage unit 102 or not at the next activation of the information processing apparatus 100; and when the detection information is stored, control is performed to execute dynamic tampering checks more frequently.

(4) In the embodiments above, hash values are generated using the SHA-1 algorithm. However, a method other than that can be used. For example, a SHA-256 algorithm, an MD5 algorithm, or the like may be used.

(5) In the embodiments above, in "encryption in which a key is acquired from the protective mode and the data encryption/decryption function unit in the normal mode is used" (FIG. 10), the data encryption/decryption function unit 160 does not perform the following before the key confirmation A (S221): "Generation of hash value of application program and verification B, and Verification of other application programs".

However, "Generation of hash value of application program and verification B, and Verification of other application programs" may be performed after the data encryption request (S220) and before the key confirmation A (S221).

Consequently, a uniform operation process is shared between "encryption using only the data encryption/decryption function unit in the normal mode is used" (FIG. 11) and "encryption using the protected data operation unit in the protective mode" (FIG. 12). This allows processing by the data encryption/decryption function unit 160 to be applied in common, thereby reducing instruction codes in programs.

(6) In the embodiments above, in "decryption in which a key is acquired from the protective mode and the data encryption/decryption function unit in the normal mode is used" (FIG. 15), the data encryption/decryption function unit 160 does not perform "Generation of hash value of application program and verification B, and Verification of other application programs" before the key confirmation A (S281).

However, "Generation of hash value of application program and verification B, and Verification of other application programs" may be performed after the data decryption request (S280) and before the key confirmation A (S281).

Consequently, a uniform operation process is shared between "encryption using only the data encryption/decryption function unit in the normal mode is used" (FIG. 15) and "decryption using the protected data operation unit in the protective mode" (not shown). This allows processing by the data encryption/decryption function unit 160 to be applied in common, thereby reducing instruction codes in programs.

(7) In the embodiments above, the verification of the server information is not performed after step S224 in FIG. 10.

However, the verification of the server information may be performed after step S224.

With this structure, when an unauthorized piece of server information is specified, subsequent processing does not need to be performed. This enables processing to be executed at a higher speed when abnormality occurs.

(8) In the embodiments above, the verification of the server information is not performed after step S241 in FIG. 11.

However, the verification of the server information may be performed after step S256.

With this structure, when an unauthorized piece of server information is specified, subsequent processing does not need to be performed. This enables processing to be executed at a higher speed when abnormality occurs.

(9) In the embodiments above, the verification of the server information is not performed after step S256 in FIG. 12.

However, the verification of the server information may be performed after step S256.

With this structure, when an unauthorized piece of server information is specified, subsequent processing does not need to be performed. This enables processing to be executed at a higher speed when abnormality occurs.

(10) In the embodiments above, a hash value of the application program is generated in "Generation of hash value of application program and verification B".

However, the hash value generated in "Generation of hash value of application program and verification A" may be used in "Generation of hash value of application program and verification B".

With this structure, a reduction is achieved in the number of times the hash value is generated, thereby facilitating faster processing.

(11) In the embodiments above, mode switching between the normal mode and the protective mode is used. However, a method other than this may be used.

One such example is construction of two software execution environments using an operating system virtual technique and performing access control to a specific one of these software execution environments. With this structure, secure and high-speed data encryption/decryption processing can be performed by the information processing apparatus equipped with the operating system virtual technique.

(12) In the embodiments above, the generated hash value and the reference hash value are compared to verify the application program which requested encryption/decryption of data in "Generation of hash value of application program and verification B" in step S224. However, a method other than this may be used.

For example, signature verification of the application program may be used. In a case of using the signature verification of the application program, a new hash value may be generated and notified to the data encryption/decryption function unit.

Note that the signature verification of the application program, and the generation and notification of the hash value can be realized by executing the following steps.

(i) The protected data operation unit 155 retains a signature verification key in advance, and verifies a digital certificate of the application program using the signature verification key.

(ii) After it is verified that the digital certificate of the application program has not been tampered, a hash value of the application program is generated, and the generated hash value and the reference hash value stored in the digital certificate of the application program are compared.

(iii) When the generated hash value and the reference hash value match each other, the protected data operation unit 155 notifies the hash value to the data encryption/decryption function unit 160 via the dynamic tampering detection function unit 153 and the mode switch unit 143.

An RSA algorithm or an elliptic curve cryptosystem algorithm may be used for the verification of the digital certificate of the application which has been digitally signed.

When the verification fails in the above-described (i), (ii), and (iii) as a result of detecting tampering or detecting that the hash values do not match each other, the protected data operation unit 155 performs the same operations as those performed when "Generation of hash value of application program and verification B" in step S224 abnormally terminate. With this structure, the data size to be stored in the protected key table 136 that is retained by the protected data operation unit 155 can be reduced.

(13) In the embodiments above, when registering an application program, a data encryption/decryption key is generated. However, the data encryption/decryption key can be generated at another timing.

For example, it may be generated when the application program requests data encryption/decryption for the first time after power-ON of the information processing apparatus.

The generation of the data encryption/decryption key at the timing when the application program requests data encryption/decryption for the first time after power-ON of the information processing apparatus can be realized by executing "Generation and storage of key" in step S209 in FIG. 9 instead of executing "Key confirmation B" in step S226 and "Read key" in step S227 in FIG. 10.

This structure eliminates the need to store the data encryption/decryption key in the nonvolatile storage unit (not shown) which is protected from unauthorized access, and accordingly, the nonvolatile storage unit which is protected from the unauthorized access can be removed.

(14) In the embodiments above, operations for encrypting data with use of an encryption key and decrypting encrypted data with use of a decryption key have been explained. However, operations other than these may be performed.

For example, Keyed Hash calculations maybe performed. Here, Keyed Hash calculations are information security processing. In a case of Keyed Hash calculations, the encryption/decryption operations in the embodiments above are replaced by the Keyed Hash calculations. The data encryption/decryption keys for the encryption/decryption operations in the embodiments above are replaced by IV (Initial Vector) values of the Keyed Hash calculations. As a result, secure and high-speed operations can be performed without performing data encryption/decryption operations.

Alternatively, a digital signature using a key and verification of a digital signature with use of a key may be performed instead of encryption of data and decryption of encrypted data. Here, the digital signature and the verification of a digital signature are information security processing.

As described above, information security processing using a key, such as, encryption and decryption using a key, a Keyed Hash calculation, a digital signature using a key, verification of a digital signature may be performed.

(15) Part of all of the compositional elements described in the embodiments above may be implemented as software to a realizable extent. In this case, the amount of hardware to be mounted on an integrated circuit can be reduced, further improving the level of integrity.

(16) Each of the above-mentioned apparatuses, specifically, is a computer system including a microprocessor, a ROM, a RAM, a hard disk unit, a display unit, a keyboard, a mouse, and the like. Computer programs are stored in the ROM, RAM, or hard disk unit, and each apparatus achieves its predetermined functions as the microprocessor operates in accordance with the computer programs. Here, each computer program is composed of a plurality of command codes that show instructions with respects to the computer, for achieving the predetermined functions. Each apparatus achieves its functions as the microprocessor operates in accordance with the computer program. In other words, the microprocessor reads commands included in the computer program one by one, decodes the read command, and operates in accordance with the result of the decoding.

It should be noted here that each apparatus is not limited to the computer system which includes all of the microprocessor, ROM, RAM, hard disk unit, display unit, keyboard, mouse, and the like, but can be a computer system which includes part of these.

Additionally, with the microprocessor operating in accordance with instruction codes included in a computer program stored in the RAM or the hard disk unit, it appears as if the computer program and the microprocessor constitute one hardware circuit and it is this hardware circuit that operates.

(17) The compositional elements described in the embodiments above may be composed from one system LSI (Large Scale Integration). The system LSI is a super-multifunctional LSI on which a plurality of compositional units are manufactured integrated on one chip, and is specifically a computer system that includes a microprocessor, a ROM, a RAM, or the like. Computer programs are stored in the RAM. The LSI achieves its functions by the microprocessor operating according to the computer programs.

Each unit of the components constituting the apparatuses above may be individually structured as a single chip, or part or all of the unit may be structured as a single chip. In this case, processing can be executed at a higher speed than when the compositional elements are implemented as software.

(18) Note that a system LSI may be variously described as IC, LSI, super LSI or ultra LSI depending on the level of integration. The system LSI 101 realized at any of these levels of integration is construed as being included in the present invention. Also, LSI circuits whose configurations can be altered after production such as a programmable FPGA (Field Programmable Gate Array) or a reconfigurable processor whose circuit cell connections and settings are configurable may also be used.

Moreover, if a semiconductor technology or related technologies give birth to a new circuit-integrating technology that would replace the LSI, such technologies may be used for integrating the functional blocks. One such possibility is an application of biotechnology.

(19) Part or all of the compositional elements of each apparatus may be composed of a removable IC card or a single module. The IC card or the module is a computer system composed of a microprocessor, a ROM, a RAM, or the like. The IC card or the module may include the aforementioned super-multifunctional LSI. The IC card or the module may achieve its functions by the microprocessor operating according to computer programs. The IC card or the module may be tamper-resistant.

(20) The present invention may be a computer-readable recording medium such as a flexible disk, a hard disk, a CD-ROM, an MO, a DVD, a DVD-ROM, a DVD-RAM, a BD (Blu-ray Disc) or a semiconductor memory, that stores the computer program or the digital signal.

Furthermore, the present invention may be the computer program or the digital signal transmitted on an electric communication network, a wireless or wired communication network, a network of which the Internet is representative, or a data communication.

Also, the present invention may be a computer system including a microprocessor and a memory, whereby the memory stores the computer program, and the microprocessor operates in accordance with the computer program.

Furthermore, by transferring the program or the digital signal to the recording medium, or by transferring the program or the digital signal via a network or the like, the program or the digital signal may be executed by another independent computer system.

(21) The present invention may be any combination of the above-described embodiments and modifications.

[Industrial Applicability]

The data encryption/decryption method pertaining to the present invention checks whether the data encryption/decryption function unit retains the key or not when encrypting/decrypting data, and when the data encryption/decryption function unit retains the key, performs encryption/decryption processing without switching the execution environment. Furthermore, in a case of an unauthorized application program, the key retained by the data encryption/decryption function unit is deleted, thereby performing encrypting/decrypting of data in a secure execution environment until the unauthorized application program no longer exists. Accordingly, the method achieves advantageous effects of preventing key leakage and reducing the number of switching times to the secure execution environment. Thus, the above-described method is especially effective in fields such as devices that perform high-speed data encryption/decryption.

Although the present invention has been fully described byway of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A program execution apparatus that operates with switching between a normal mode and a protective mode, the program execution apparatus comprising:
   a non-transitory memory device storing a program; and
   a processing device that executes the program and causes the program execution apparatus to:
      detect tampering of a program that includes an instruction to execute information security processing which uses a key;
      execute, in the normal mode, the program when the tampering is not detected, and upon detecting the instruction, output a direction to execute the information security processing;
      control, in the normal mode and upon receiving the direction, switching from the normal mode to the protective mode; and
      securely store the key in correspondence with the program and, in the protective mode, read the stored key, output the read key, and control switching from the protective mode to the normal mode, wherein
   said control of the switching from the normal mode to the protective mode receives the key output from said securely storing and executes the information security processing which uses the received key, in the normal mode,
   said control of the switching from the normal mode to the protective mode, in the normal mode, further receives a direction from another program to execute information security processing, calculates a hash value of the another program, judges whether the calculated hash value matches a stored hash value of the program, and when judging negatively, deletes a stored key of the program stored in correspondence with the stored hash value of the program,
   said securely storing further securely stores a maximum use count corresponding to the key and, in the protective mode, outputs the maximum use count, the maximum use count indicating a maximum number of times the key is permitted to be used,
   said control of the switching from the normal mode to the protective mode, in the normal mode, further receives the maximum use count along with the key, stores the received maximum use count, judges whether or not a current use count exceeds the maximum use count, and when judging affirmatively, outputs a direction that instructs new generation, and controls switching to the protective mode, the current use count indicating a number of times the key has been actually used,
   upon receiving the direction that instructs the new generation, said securely storing, in the protective mode, further generates a new key and a new maximum use count, outputs the generated new key and the new maximum use count, and controls switching to the normal mode, and
   said control of the switching from the normal mode to the protective mode, in the normal mode, further receives the new key and the new maximum use count, deletes the stored key and the maximum use count, and stores the received new key and the new maximum use count in correspondence with each other.

2. The program execution apparatus of claim 1, wherein
said control of the switching from the normal mode to the protective mode further stores the received key in the normal mode,
said detecting further detects tampering of the program, and
when the tampering is not detected, said control of the switching from the normal mode to the protective mode further executes, in the normal mode, the information security processing which uses the received key.

3. The program execution apparatus of claim 1, wherein
said control of the switching from the normal mode to the protective mode further stores the received key in the normal mode,
said detecting further detects tampering of the program,
when the tampering is detected, said control of the switching from the normal mode to the protective mode, in the normal mode, further deletes the stored key and controls switching to the protective mode, and
said securely storing further executes the information security processing which uses the stored key, in the protective mode.

4. The program execution apparatus of claim 1, wherein
said control of the switching from the normal mode to the protective mode further stores the received key in the normal mode,
said detecting further detects tampering of the another program that runs in the normal mode,
when the tampering of the another program is detected, said control of the switching from the normal mode to the protective mode, in the normal mode, further deletes the stored key and controls switching to the protective mode, and
said securely storing, in the protective mode, further executes the information security processing which uses the stored key.

5. The program execution apparatus of claim 1, wherein
upon receiving a request to execute the program, said control of the switching from the normal mode to the protective mode, in the normal mode, further outputs a direction to generate the key of the program and controls switching to the protective mode, and
upon receiving the direction to generate the key, said securely storing, in the protective mode, further generates the key of the program and stores the generated key in correspondence with the program.

6. The program execution apparatus of claim 5, wherein
said securely storing, in the protective mode, further generates the hash value of the program and stores the generated hash value and the generated key in correspondence with each other.

7. The program execution apparatus of claim 6, wherein
said securely storing, in the protective mode, further reads the hash value along with the generated key and outputs the read hash value along with the read key, and
said control of the switching from the normal mode to the protective mode, in the normal mode, further receives the output hash value along with the output key and stores the received key in correspondence with the received hash value.

8. The program execution apparatus of claim 1, wherein
upon receiving the request to execute the program, said control of the switching from the normal mode to the protective mode, in the normal mode, further judges whether or not a key corresponding to the program is retained, and when judging negatively, outputs the direction to generate the key of the program, and controls switching to the protective mode, and
upon receiving the direction to generate the key, said securely storing, in the protective mode, further judges whether or not the key corresponding to the program is retained, and when judging affirmatively, reads the key, outputs the read key, and controls switching to the normal mode.

9. The program execution apparatus of claim 1, wherein
said securely storing further securely stores a final time in correspondence with the key, and outputs the final time in the protective mode, the final time indicating an ending time for use of the key,
said control of the switching from the normal mode to the protective mode, in the normal mode, further receives the final time along with the key, stores the received final time, judges whether a current time is past the stored final time, and when judging affirmatively, outputs a direction that instructs new generation, and controls switching to the protective mode,
said securely storing, in the protective mode, upon receiving the direction that instructs the new generation, further generates a new key and a new final time, outputs the generated new key and the new final time, and controls switching to the normal mode, and
said control of the switching from the normal mode to the protective mode in the normal mode, further receives the new key and the new final time, deletes the stored key and the final time, and stores the received new key and the new final time in correspondence with each other.

10. The program execution apparatus of claim 1, wherein the information security processing is one of: encryption, decryption, generation of a digital signature, verification of a digital signature, and generation of a keyed hash value.

11. A control method used by a program execution apparatus that operates with switching between a normal mode and a protective mode, the control method comprising:
detecting, via the program execution apparatus, tampering of a program that includes an instruction to execute information security processing which uses a key;
executing, in the normal mode, the program when the tampering is not detected, and upon detecting the instruction, outputting a direction to execute the information security processing;
controlling, in the normal mode and upon receiving the direction, switching from the normal mode to the protective mode; and
securely storing the key in correspondence with the program, and in the protective mode, reading the stored key, outputting the read key, and controlling switching from the protective mode to the normal mode, wherein
said controlling of the switching from the normal mode to the protective mode receives the key output from said securely storing and executes the information security processing which uses the received key, in the normal mode,
said controlling of the switching from the normal mode to the protective mode, in the normal mode, further receives a direction from another program to execute information security processing, calculates a hash value of the another program, judges whether the calculated hash value matches a stored hash value of the program, and when judging negatively, deletes a stored key of the program stored in correspondence with the stored hash value of the program,
said securely storing securely stores a maximum use count corresponding to the key and, in the protective mode, outputs the maximum use count, the maximum use count indicating a maximum number of times the key is permitted to be used, said controlling of the switching from the normal mode to the protective mode, in the normal mode, further receives the maximum use count along with the key, stores the received maximum use count, judges whether or not a current use count exceeds the maximum use count, and when judging affirmatively, outputs a direction that instructs new generation, and controls switching to the protective mode, the current use count indicating a number of times the key has been actually used, upon receiving the direction that instructs the new generation, said securely storing, in the protective mode, further generates a new key and a new maximum use count, outputs the generated new key and the new maximum use count, and controls switching to the normal mode, and said controlling of the switching from the normal mode to the protective mode, in the normal mode, further receives the new key and the new maximum use count, deletes the stored key and the maximum use count, and stores the received new key and the new maximum use count in correspondence with each other.

12. A non-transitory computer-readable recording medium having a computer control program recorded thereon, the computer control program being used by a program execution apparatus that operates with switching between a normal mode and a protective mode, the control program causing a computer to execute a method comprising:

detecting step of detecting tampering of a program that includes an instruction to execute information security processing which uses a key;

executing, in the normal mode, the program when the tampering is not detected, and upon detecting the instruction, outputting a direction to execute the information security processing;

controlling, in the normal mode and upon receiving the direction, switching from the normal mode to the protective mode; and securely storing the key in correspondence with the program, and in the protective mode, reading the stored key, outputting the read key, and controlling switching from the protective mode to the normal mode, wherein said controlling of the switching from the normal mode to the protective mode receives the key output from said securely storing and executes the information security processing which uses the received key, in the normal mode, said controlling of the switching from the normal mode to the protective mode, in the normal mode, further receives a direction from another program to execute information security processing, calculates a hash value of the another program, judges whether the calculated hash value matches a stored hash value of the program, and when judging negatively, deletes a stored key of the program stored in correspondence with the stored hash value of the program, said securely storing of the switching from the normal mode to the protective mode securely stores a maximum use count corresponding to the key and, in the protective mode, outputs the maximum use count, the maximum use count indicating a maximum number of times the key is permitted to be used, said controlling of the switching from the normal mode to the protective mode, in the normal mode, further receives the maximum use count along with the key, stores the received maximum use count, judges whether or not a current use count exceeds the maximum use count, and when judging affirmatively, outputs a direction that instructs new generation, and controls switching to the protective mode, the current use count indicating a number of times the key has been actually used, upon receiving the direction that instructs the new generation, said securely storing, in the protective mode, further generates a new key and a new maximum use count, outputs the generated new key and the new maximum use count, and controls switching to the normal mode, and said controlling of the switching from the normal mode to the protective mode, in the normal mode, further receives the new key and the new maximum use count, deletes the stored key and the maximum use count, and stores the received new key and the new maximum use count in correspondence with each other.

13. An integrated circuit for executing a program that operates with switching between a normal mode and a protective mode, the integrated circuit comprising:

a non-transitory memory device storing a program; and a processing device that executes the program and causes the integrated circuit to:

detect tampering of a program that includes an instruction to execute information security processing which uses a key;

execute, in the normal mode, the program when the tampering is not detected, and upon detecting the instruction, output a direction to execute the information security processing;

control, in the normal mode and upon receiving the direction, switching from the normal mode to the protective mode; and securely store the key in correspondence with the program and, in the protective mode, read the stored key, output the read key, and control switching from the protective mode to the normal mode, wherein said control of the switching from the normal mode to the protective mode receives the key output from said securely storing and executes the information security processing which uses the received key, in the normal mode, said control of the switching from the normal mode to the protective mode, in the normal mode, further receives a direction from another program to execute information security processing, calculates a hash value of the another program, judges whether the calculated hash value matches a stored hash value of the program, and when judging negatively, deletes a stored key of the program stored in correspondence with the stored hash value of the program, said securely storing further securely stores a maximum use count corresponding to the key and, in the protective mode, outputs the maximum use count, the maximum use count indicating a maximum number of times the key is permitted to be used, said control of the switching from the normal mode to the protective mode, in the normal mode, further receives the maximum use count along with the key, stores the received maximum use count, judges whether or not a current use count exceeds the maximum use count, and when judging affirmatively, outputs a direction that instructs new generation, and controls switching to the protective mode, the current use count indicating a number of times the key has been actually used, upon receiving the direction that instructs the new generation, said securely storing, in the protective mode, further generates a new key and a new maximum use count, outputs the generated new key and the new maximum use count, and controls switching to the normal mode, and said control of the switching from the normal mode to the protective mode, in the normal mode, further receives the new key and the new maximum use count, deletes the stored key and the maximum use count, and stores the received new key and the new maximum use count in correspondence with each other.

* * * * *